(12) United States Patent
Lundgren et al.

(10) Patent No.: US 9,752,474 B2
(45) Date of Patent: *Sep. 5, 2017

(54) FILTER ARRANGEMENTS; COMPONENTS; AND, METHODS

(71) Applicant: Donaldson Company, Inc., Minneapolis, MN (US)

(72) Inventors: Thomas Lundgren, Bloomington, MN (US); Daniel Adamek, Bloomington, MN (US); Wade Mosset, Savage, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 276 days.

This patent is subject to a terminal disclaimer.

(21) Appl. No.: 14/485,896

(22) Filed: Sep. 15, 2014

(65) Prior Publication Data

US 2015/0101292 A1    Apr. 16, 2015

Related U.S. Application Data

(63) Continuation of application No. 13/849,852, filed on Mar. 25, 2013, now Pat. No. 8,834,610, which is a
(Continued)

(51) Int. Cl.
 *B01D 46/00*   (2006.01)
 *F01M 13/04*   (2006.01)
(Continued)

(52) U.S. Cl.
 CPC ......... *F01M 13/04* (2013.01); *B01D 46/0005* (2013.01); *B01D 46/009* (2013.01);
(Continued)

(58) Field of Classification Search
 CPC . F01K 25/06; F01K 27/00; F01K 1/00; F01B 17/022; F01B 1/00; C02F 1/048;
(Continued)

(56) References Cited

U.S. PATENT DOCUMENTS

| | | |
|---|---|---|
| 3,164,141 A | 1/1965 | Jones |
| 4,011,846 A | 3/1977 | Gagliardi |
(Continued)

FOREIGN PATENT DOCUMENTS

| | | |
|---|---|---|
| CN | 2296402 Y | 3/1997 |
| GB | 2 033 247 | 5/1980 |
(Continued)

OTHER PUBLICATIONS

U.S. Appl. No. 60/748,495, filed Dec. 7, 2005, Schrage et al.
(Continued)

*Primary Examiner* — Amber R Orlando
(74) *Attorney, Agent, or Firm* — Merchant & Gould P.C.

(57) ABSTRACT

Filter assemblies and components therefor, are described. In an example arrangement, the filter assembly is configured to be serviced from either the top or the bottom. A rotational indexing arrangement is to ensure appropriate orientation of an internally received filter cartridge, and other components of the arrangement are provided. Methods of assembly, servicing and use are described.

13 Claims, 61 Drawing Sheets

Related U.S. Application Data continuation of application No. 12/157,650, filed on Jun. 12, 2008, now Pat. No. 8,404,029.

(60) Provisional application No. 60/936,006, filed on Jun. 14, 2007, provisional application No. 61/002,503, filed on Sep. 11, 2007, provisional application No. 61/130,380, filed on May 30, 2008.

(51) Int. Cl.

| | | |
|---|---|---|
| *B01D 46/24* | (2006.01) | |
| *C02F 1/00* | (2006.01) | |
| *C02F 1/48* | (2006.01) | |
| *F01B 1/00* | (2006.01) | |
| *F01K 25/06* | (2006.01) | |
| *F01K 27/00* | (2006.01) | |
| *B01D 1/00* | (2006.01) | |
| *B01D 5/00* | (2006.01) | |
| *B01D 17/00* | (2006.01) | |
| *F01B 17/02* | (2006.01) | |
| *F01K 1/00* | (2006.01) | |

(52) U.S. Cl.
CPC ..... *B01D 46/0046* (2013.01); *B01D 46/2403* (2013.01); *C02F 1/00* (2013.01); *C02F 1/48* (2013.01); *F01B 1/00* (2013.01); *F01K 25/06* (2013.01); *F01K 27/00* (2013.01); *B01D 1/00* (2013.01); *B01D 5/00* (2013.01); *B01D 17/00* (2013.01); *B01D 2265/026* (2013.01); *B01D 2279/35* (2013.01); *F01B 17/022* (2013.01); *F01K 1/00* (2013.01); *F01M 2013/0438* (2013.01); *Y10T 29/49826* (2015.01)

(58) Field of Classification Search
CPC .... C02F 1/00; B01D 1/00; B01D 1/28; B01D 5/00; B01D 17/045; B01D 17/00
See application file for complete search history.

(56) References Cited

U.S. PATENT DOCUMENTS

| | | | |
|---|---|---|---|
| 4,233,042 A | 11/1980 | Tao | |
| 4,272,368 A | 6/1981 | Foord et al. | |
| 4,720,292 A | 1/1988 | Engel et al. | |
| 5,487,767 A | 1/1996 | Brown | |
| 5,605,555 A | 2/1997 | Patel et al. | |
| D398,046 S | 9/1998 | Gillingham et al. | |
| 5,853,439 A | 12/1998 | Gieseke et al. | |
| 5,855,783 A | 1/1999 | Shucosky et al. | |
| D425,189 S | 5/2000 | Gillingham et al. | |
| 6,093,231 A | 7/2000 | Read et al. | |
| 6,136,076 A | 10/2000 | Read | |
| 6,143,049 A | 11/2000 | Gieseke et al. | |
| 6,187,073 B1 | 2/2001 | Gieseke et al. | |
| 6,190,432 B1 | 2/2001 | Gieseke et al. | |
| 6,348,084 B1 | 2/2002 | Gieseke et al. | |
| 6,387,162 B1 | 5/2002 | Kosmider et al. | |
| 6,482,247 B2 | 11/2002 | Jaroszczyk et al. | |
| 6,485,535 B1 | 11/2002 | Linnersten et al. | |
| 6,517,598 B2 | 2/2003 | Anderson et al. | |
| 6,530,969 B2 | 3/2003 | Gieseke et al. | |
| 6,572,667 B1 | 6/2003 | Greif et al. | |
| 6,638,332 B1 | 10/2003 | Schmitz et al. | |
| 6,647,973 B1 | 11/2003 | Schueler et al. | |
| 6,652,614 B2 | 11/2003 | Gieseke et al. | |
| 6,706,087 B1 | 3/2004 | Gebler et al. | |
| 6,752,924 B2 | 6/2004 | Gustafson et al. | |
| 6,852,148 B2 | 2/2005 | Gieseke et al. | |
| 6,907,869 B2 | 6/2005 | Burgess et al. | |
| 6,936,084 B2 | 8/2005 | Schlensker et al. | |
| 6,958,083 B1 | 10/2005 | Schmitz et al. | |
| 6,966,940 B2 | 11/2005 | Krisko et al. | |
| 7,070,642 B2 | 7/2006 | Scott et al. | |
| 7,081,145 B2 | 7/2006 | Gieseke et al. | |
| 7,182,804 B2 | 2/2007 | Gieseke et al. | |
| 7,278,259 B2 | 10/2007 | Schmeichel et al. | |
| 7,309,367 B2 | 12/2007 | Heikamp et al. | |
| 7,309,372 B2 | 12/2007 | Kahlbaugh et al. | |
| 7,351,270 B2 | 4/2008 | Engelland et al. | |
| 7,396,375 B2 | 7/2008 | Nepsund et al. | |
| 7,396,376 B2 | 7/2008 | Schrage et al. | |
| 7,520,913 B2 | 4/2009 | Mills et al. | |
| 7,524,349 B2 | 4/2009 | Shrage et al. | |
| 7,531,018 B2 | 5/2009 | Becker et al. | |
| 7,537,631 B2 | 5/2009 | Scott et al. | |
| D601,238 S | 9/2009 | Lundgren et al. | |
| 7,648,546 B2 | 1/2010 | Haberkamp et al. | |
| 7,662,216 B1 | 2/2010 | Terres et al. | |
| RE42,174 E | 3/2011 | Gunderson et al. | |
| 7,905,936 B2 | 3/2011 | Coulonvaux et al. | |
| D636,859 S | 4/2011 | Lundgren et al. | |
| 7,955,502 B2 | 6/2011 | Greco et al. | |
| 7,981,183 B2 | 7/2011 | Nepsund et al. | |
| 8,038,756 B2 | 10/2011 | Iddings et al. | |
| 8,066,791 B2 | 11/2011 | Baseotto et al. | |
| 8,119,002 B2 | 2/2012 | Schiavon et al. | |
| 8,128,724 B2 | 3/2012 | Mills et al. | |
| 8,142,533 B2 | 3/2012 | Gillenberg et al. | |
| 8,147,576 B2 | 4/2012 | Gillenberg et al. | |
| 8,152,876 B2 | 4/2012 | Gillenberg et al. | |
| 8,163,056 B2 | 4/2012 | Coulonvaux et al. | |
| 8,167,142 B2 | 5/2012 | Hacker | |
| 8,177,875 B2 | 5/2012 | Rogers et al. | |
| 8,177,976 B2 | 5/2012 | Formica | |
| 8,182,569 B2 | 5/2012 | Read et al. | |
| 8,216,335 B2 | 7/2012 | Scott et al. | |
| 8,226,786 B2 | 7/2012 | Schrage et al. | |
| 8,273,143 B2 | 9/2012 | Coulonvaux et al. | |
| 8,277,532 B2 | 10/2012 | Reichter et al. | |
| 8,292,984 B2 | 10/2012 | Baseotto et al. | |
| 8,361,181 B2 | 1/2013 | Osendorf et al. | |
| D675,717 S | 2/2013 | Lundgren et al. | |
| 8,404,029 B2 * | 3/2013 | Lundgren .......... | B01D 46/0046 55/385.3 |
| 8,414,675 B2 | 4/2013 | Iddings et al. | |
| 8,499,749 B2 | 8/2013 | Mosset et al. | |
| 8,545,588 B2 | 10/2013 | Iddings et al. | |
| 8,557,007 B2 | 10/2013 | Read | |
| 8,714,142 B2 | 5/2014 | Jacob et al. | |
| 8,741,017 B2 | 6/2014 | Nelson | |
| 8,747,512 B2 | 6/2014 | Mills et al. | |
| 8,758,467 B2 | 6/2014 | Lundgren et al. | |
| 8,834,610 B2 * | 9/2014 | Lundgren .......... | B01D 46/0046 55/320 |
| 8,864,866 B2 | 10/2014 | Osendorf et al. | |
| 9,067,161 B2 | 6/2015 | Campbell et al. | |
| 9,162,174 B2 | 10/2015 | Baseotto | |
| 9,353,658 B2 | 5/2016 | Jacob et al. | |
| 9,387,425 B2 | 7/2016 | Osendorf et al. | |
| 9,440,177 B2 | 9/2016 | Wood et al. | |
| 2002/0040569 A1 | 4/2002 | Reinhold et al. | |
| 2003/0051455 A1 | 3/2003 | Gieseke | |
| 2003/0062301 A1 * | 4/2003 | Merrie ................ | B01D 29/114 210/454 |
| 2004/0035097 A1 | 2/2004 | Schelnsker et al. | |
| 2004/0103787 A1 | 6/2004 | Gieseke | |
| 2005/0166561 A1 | 8/2005 | Schrage et al. | |
| 2005/0211232 A1 | 9/2005 | Dushek et al. | |
| 2005/0252848 A1 * | 11/2005 | Miller ................ | B01D 35/147 210/445 |
| 2006/0086075 A1 * | 4/2006 | Scott ................ | B01D 46/0001 55/498 |
| 2006/0123744 A1 | 6/2006 | Read et al. | |
| 2006/0207948 A1 | 9/2006 | Hacker | |
| 2007/0157589 A1 | 7/2007 | Haberkamp et al. | |
| 2008/0035103 A1 | 2/2008 | Barris et al. | |
| 2008/0110142 A1 | 5/2008 | Nelson et al. | |
| 2008/0245717 A1 | 10/2008 | Heikamp | |
| 2008/0257161 A1 | 10/2008 | Read | |
| 2009/0183717 A1 | 7/2009 | Gillenberg et al. | |
| 2010/0031940 A1 | 2/2010 | Mosset et al. | |

(56) References Cited

U.S. PATENT DOCUMENTS

| | | |
|---|---|---|
| 2010/0064646 A1 | 3/2010 | Smith |
| 2010/0154371 A1 | 6/2010 | Bittle et al. |
| 2010/0218682 A1 | 9/2010 | Hammerschick |
| 2011/0017657 A1 | 1/2011 | Jokschas et al. |
| 2011/0030629 A1 | 2/2011 | Schleiden |
| 2011/0094197 A1 | 4/2011 | Ruhland et al. |
| 2011/0108014 A1 | 5/2011 | Schleiden et al. |
| 2011/0154790 A1 | 6/2011 | Israel et al. |
| 2011/0258975 A1 | 10/2011 | Lundgen et al. |
| 2011/0308212 A1 | 12/2011 | Ruhland et al. |
| 2013/0043181 A1 | 2/2013 | Krull |
| 2014/0033668 A1 | 2/2014 | Kleynen |
| 2014/0102058 A1 | 4/2014 | Kaufmann et al. |
| 2014/0102060 A1 | 4/2014 | Kato et al. |
| 2014/0109885 A1 | 4/2014 | Kalayci et al. |
| 2014/0208702 A1 | 7/2014 | Lundgren et al. |
| 2014/0208703 A1 | 7/2014 | Willems et al. |
| 2014/0215982 A1 | 8/2014 | Wood et al. |
| 2016/0144310 A1 | 5/2016 | Movia et al. |

FOREIGN PATENT DOCUMENTS

| | | | |
|---|---|---|---|
| GB | 2 106 410 A | | 4/1983 |
| JP | 2004136203 A | | 10/2002 |
| WO | WO 99/00587 | | 1/1999 |
| WO | WO 99/47211 | | 9/1999 |
| WO | WO 02/45819 | | 6/2002 |
| WO | WO 02/076575 | | 10/2002 |
| WO | WO 2004/045743 | A1 | 6/2004 |
| WO | WO 2005/063358 | A2 | 7/2005 |
| WO | WO 2005/082488 | | 9/2005 |
| WO | WO 2005/105266 | | 11/2005 |
| WO | WO 2006/050114 | | 5/2006 |
| WO | WO 2006/084282 | | 8/2006 |
| WO | WO 2007/009040 | | 1/2007 |
| WO | WO 2007/053411 | A2 | 5/2007 |
| WO | WO 2008/115985 | | 9/2008 |

OTHER PUBLICATIONS

U.S. Appl. No. 60/677,031, filed May 3, 2005, Shrage et al.
U.S. Appl. No. 60/961,521, filed Jul. 20, 2007, Baseotto et al.
U.S. Appl. No. 60/961,522, Jul. 20, 2007, Baseotto et al.
U.S. Appl. No. 61/126,222, filed Apr. 30, 2008, Baseotto et al.
U.S. Appl. No. 60/963,068, filed Aug. 1, 2007, Coulonvaux et al.
U.S. Appl. No. 60/849,906, filed Oct. 6, 2006, Coulonvaux et al.
U.S. Appl. No. 61/072,162, filed Mar. 27, 2008, Baseotto et al.
U.S. Appl. No. 60/921,536, filed Apr. 3, 2007, Iddings et al.
U.S. Appl. No. 60/604,554, filed Aug. 25, 2004, Scott et al.
Invitation to Pay Additional Fees with Partial International Search mailed Oct. 24, 2008.
Search Report and Written Opinion corresponding to PCT/US2008/066757 which published as WO 2008/157251 mailed May 25, 2009.
Search Report and Written Opinion corresponding to PCT/US2008/057493 which WO 2008/115985 and corresponds to US publication US 2011/0258975 mailed Dec. 29, 2008.
Search Report and Written Opinion corresponding to PCT/US2006/041738 which published as WO 2007/053411 and corresponds to US publication US 2010/0031940 mailed May 3, 2007.
Search Report and Written Opinion corresponding to EP application 12171440.6-1263 mailed Dec. 7, 2012.
Search Report and Written Opinion corresponding to EP application 12171448.9-1263 mailed Dec. 7, 2012.
Pending claims of U.S. Appl. No. 14/518,102 dated Oct. 13, 2016.
Pending claims of U.S. Appl. No. 15/204,104 dated Oct. 13, 2016.
Pending claims of U.S. Appl. No. 14/297,738 dated Oct. 13, 2016.
Pending claims of U.S. Appl. No. 14/273,801 dated Oct. 13, 2016.
Pending claims of U.S. Appl. No. 14/127,081 dated Oct. 13, 2016.
Pending claims of U.S. Appl. No. 15/167,034 dated Oct. 13, 2016.

* cited by examiner

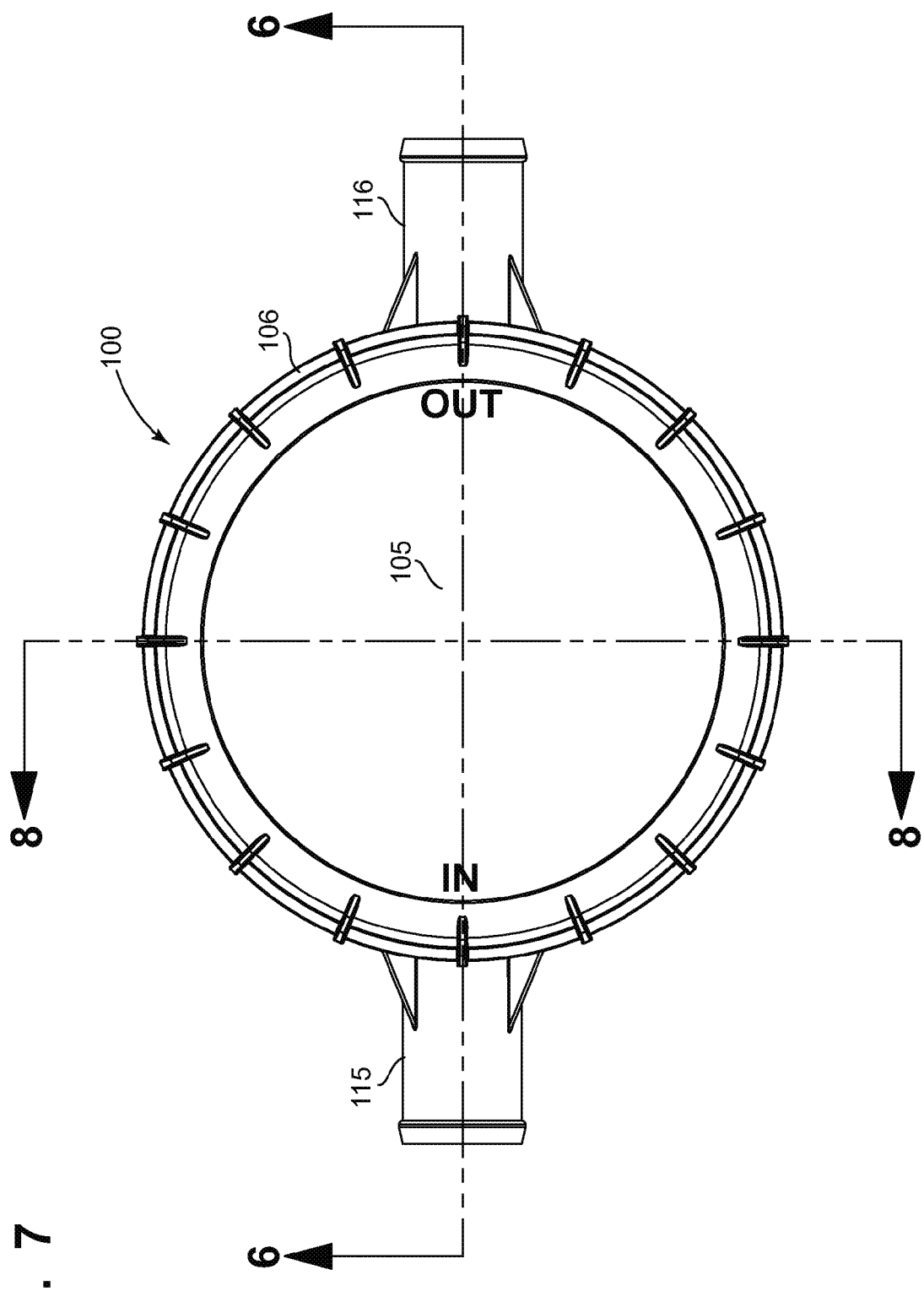

FILTER ARRANGEMENTS; COMPONENTS; AND, METHODS

CROSS REFERENCE TO RELATED APPLICATIONS

The present application is a continuation of U.S. Ser. No. 13/849,852, filed Mar. 25, 2013, which has now issued as U.S. Pat. No. 8,834,610. U.S. Ser. No. 13/849,852 is a continuation of U.S. Ser. No. 12/157,650, filed Jun. 12, 2008, which has issued as U.S. Pat. No. 8,404,029 on Mar. 26, 2013. U.S. Ser. No. 12/157,650 includes disclosures of, with edits, U.S. provisional application 60/936,006, filed Jun. 14, 2007; U.S. Provisional 61/002,503 filed Nov. 9, 2007; and, 61/130,380, filed May 30, 2008. The complete disclosures of U.S. Ser. No. 13/849,852; U.S. Ser. No. 12/157,650; U.S. Ser. No. 60/936,006; U.S. 61/002,503; and, U.S. 61/130,380 are incorporated herein by reference; and, a claim of priority to each of U.S. Ser. No. 13/849,852; U.S. Ser. No. 12/157,650; U.S. 60/936,006; U.S. 61/002,503; and, U.S. 61/130,380 is made, to the extent appropriate.

FIELD OF THE INVENTION

The disclosure relates to filter arrangements. Several alternative embodiments showing crankcase ventilation filter arrangements are described. Features of components; and, methods of assembly, and use and servicing are also described.

BACKGROUND

Engine blowby gases, sometimes referred to as crankcase ventilation gases, comprise engine crankcase off gases with particulate material (typically both solid and liquid) therein. It is desirable to filter these gases, for a reduction in contaminant levels. A variety of arrangements for conducting such filtrations are described, for example, in U.S. Pat. Nos. 5,853,439; 7,081,145; 6,143,049; 6,530,969; 7,182,804; WO 2005/082488, published Sep. 9, 2005; WO 2006/084282, published Aug. 10, 2006; PCT WO 2005/083240, published Sep. 9, 2005; WO 2007/053411, published May 10, 2007; and WO 2006/091594, published Aug. 31, 2006, each of which is incorporated herein by reference, in its entirety.

In general, improvements have been sought, to accommodate different types of arrangements.

SUMMARY

Crankcase ventilation filter assemblies and components therefor are described. The assemblies are used to filter crankcase gasses (blowby gasses) from engine systems, with respect to entrained solid and liquid particles. The assemblies generally include a housing with an air flow inlet, an air flow outlet and a bottom liquid drain.

In example embodiments described, an internally received filter cartridge is used for the filtering of gasses passing through housing. The housing is configured for servicing of the internally received filter cartridge from each of the top and the bottom.

Rotational indexing arrangements are described, to ensure proper rotational orientation of the filter cartridge, whether service is from the top or the bottom. These can include: a housing top-to-housing body rotational indexing arrangement; a filter cartridge-to-housing top rotational indexing arrangement; a housing bottom-to-housing body rotational indexing arrangement; and, a filter cartridge-to-housing bottom rotational indexing arrangement. Further, a filter cartridge-to-guide rotational indexing arrangement is provided to facilitate servicing.

Methods of assembly, servicing and use are also described.

There is no specific requirement that an arrangement include all of the specific features and characterizations described herein, in order to obtain some advantage according to the present disclosure.

BRIEF DESCRIPTION OF THE DRAWINGS

FIG. 7 is a schematic top plan view of the assembly of FIG. 6.

in FIG. 33, the assembly having a modified cover, from the cover of FIG. 32.

DETAILED DESCRIPTION

I. Description from U.S. Provisional Application 60/936,006, Filed Jun. 14, 2007

According to 60/936,006 a crankcase ventilation filter arrangement can be provided as an "all plastic" arrangement. In general, an all plastic arrangement refers to an arrangement that does not contain metal. An "all plastic" design does not necessarily mean that the filtration media is plastic. An example plastic for use in the crankcase ventilation filter arrangement can be provided as glass-filled Nylon 6/6 (polyamide 6/6).

A. A First Description from U.S. Ser. No. 60/936,006

A first embodiment of crankcase ventilation filter arrangement from U.S. Ser. No. 60/936,066 is shown FIG. 1.

Figure 1:
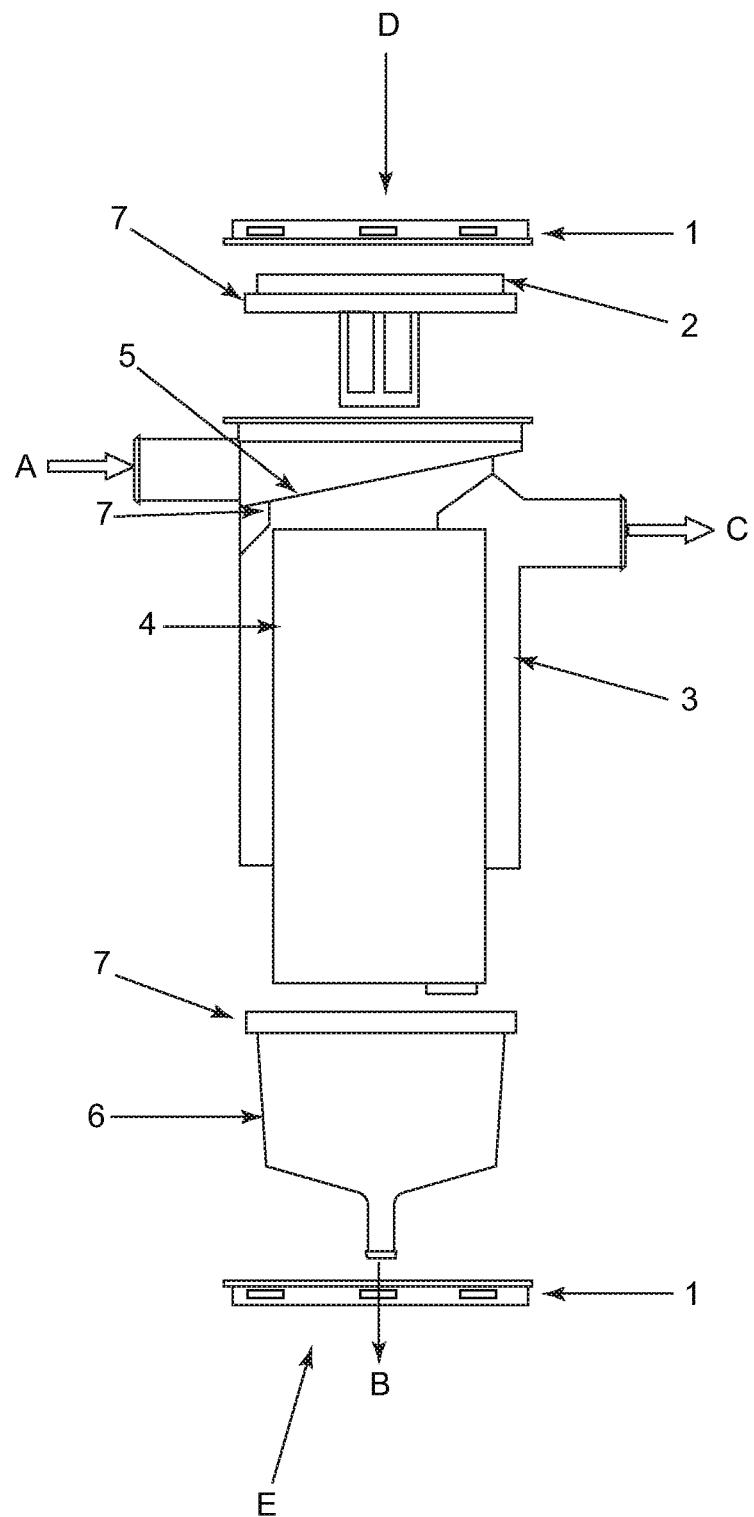
FIG. 1 is an exploded, schematic, partially cross-sectional view of a crankcase ventilation filter arrangement as described in U.S. provisional application 60/936,006, filed Jun. 14, 2007.

In FIG. 1: A=contaminated blowby inlet; B=coalesced oil drain back to sump; C=clean blowby outlet; D=top service access; and, E=bottom service access. Also, in FIG. 1: 1=retainer/locking ring; 2=top cap; 3=body; 4=media; 5=inner liner/core; 6=bottom cap or cup; and, 7=o-ring.

The crankcase ventilation filter arrangement of 60/936,006 includes a main body section 3, a filter element with media 4, a top access cap 2 and a bottom access cup 6. Both the inlet and the outlet tubes (e.g., 25.4 mm [1.0 inch]) are molded into the body 3. This allows for element servicing without having to remove either an inlet or outlet line (duct or hose). No tools are required for servicing the element. An angled surface is also molded into the body which provides the sealing surface for the element. An o-ring 7 is used to accomplish the seal. O-rings are also used to seal both the top access cap 2 and the bottom access cup 6 to the body 3. The contaminated blowby from the crankcase enters the assembly and flows from inside to outside through the media. While flowing through the media, the blowby is filtered and liquid therein is coalesced. The coalesced oil then drains through the bottom of the element and out the system through a drain nipple that is molded into the bottom access cup 6.

The media can be provided as a blend of small glass fibers and large polyester fibers. An example media is available under the name Synteg™ XP from Donaldson Company, Inc. of Bloomington, Minn. 55402. The Synteg™ XP media can be wound on to an inner liner. The more layers of media that are used the higher the efficiency. However, more layers of media also increase the pressure drop of the element. Media that can be used includes media described in U.S. application Ser. No. 11/267,958 that was filed with the United States Patent and Trademark Office on Nov. 4, 2005 and published as US 2006/00907263 on May 11, 2006. The disclosures of U.S. application Ser. No. 11/267,958 and corresponding publication US 2006/00962363 are incorporated herein by reference.

The angled sealing surface molded into the body provides several advantages. The angled surface allows the outlet to be positioned higher on the body than it would normally be. Having the outlet as high as possible reduces the chance that coalesced oil that is draining out the bottom access cup will escape through the outlet due to engine tilting or rolling. The element is held in position in the body by both the top access cap and the bottom access cup. The angled sealing surface also improves the flow characteristics of the blowby to help reduce pressure drop. Not only does the angled surface improve upon the design, it also presents an opportunity to design in unique and patentable features which will help to retain replacement element business.

Removing the top access cap and the bottom access cup is a simple process. A retaining/locking ring is used to attach the top cap and the bottom cup to the body. The top cap, bottom cup and retaining/locking rings are all separate parts. However, the retaining/locking ring is designed to be usable to attach each of the top cap and bottom cup with a snap-fit feature. Once snapped together the parts are securely fastened together, but the retaining/locking ring will still turn independently from the associated top cap or bottom cup. To assemble the top cap and the bottom cup to the body, each is pushed into the body so that the o-ring is fully engaged. Then, each retaining/locking ring is turned approximately ¼ turn clockwise so that channel features that are molded into the ring engage with tabs that are molded into the body on both ends. The tabs are designed to hold the ring from turning and keep either the top access cap or bottom access cup from backing out of the body. Servicing the element from either the top or bottom is performed in the same manner by the retaining ring being turned ¼ turn counter-clockwise so that the ring disengages from the tabs. The top access cap and bottom access cup can then be pulled out perpendicular to the body for access to the element.

The drawing (FIG. 1) does not include mounting provisions. Several options are available and can be determined with end users. For example, mounting can be achieved by a bracket that will be molded into the body or by a separate mounting band.

Figure 3:
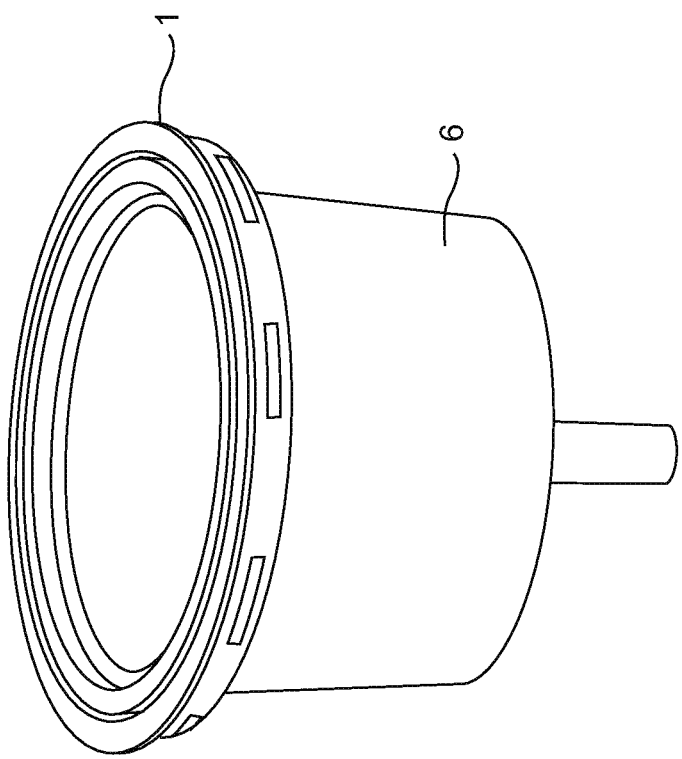
FIG. 3 is a schematic perspective view of a bottom cap or cup component of the assembly of FIG. 1.
Figure 2:
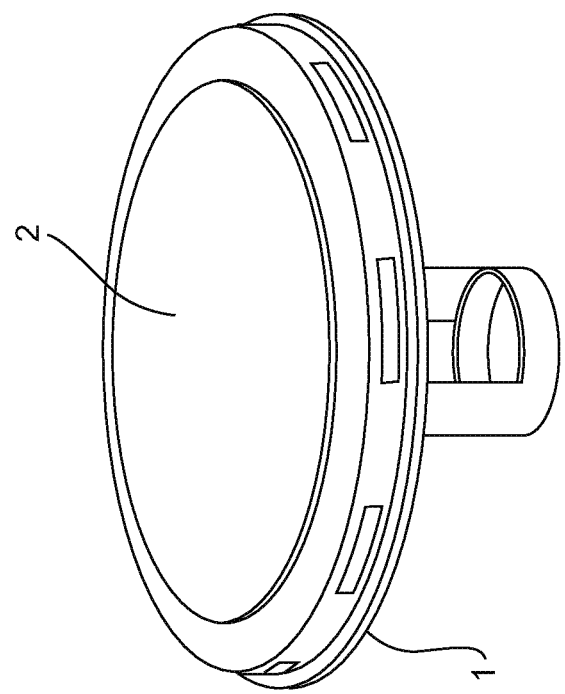
FIG. 2 is schematic, perspective view of a top cap component of the assembly depicted in FIG. 1.

FIGS. 2 and 3 show the retaining/locking ring snapped-in-place to each of the top cap and the bottom cup. In FIG. 2, the retaining ring 1 is shown positioned on the top cap 2. In FIG. 3, a retaining ring 1 is shown on the bottom cup 6.

B. Further Discussion from U.S. 60/936,006

Figure 4:
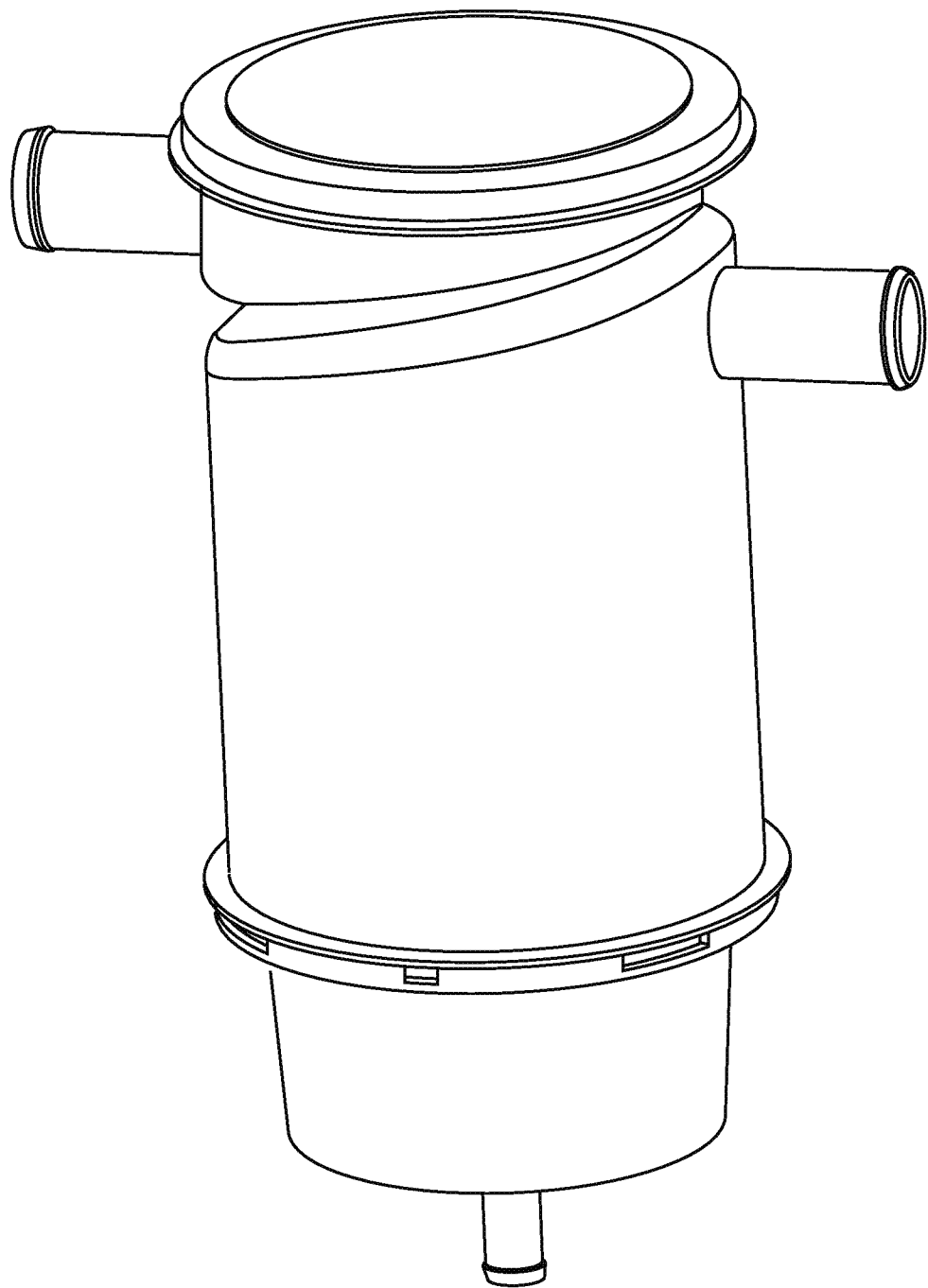
FIG. 4 is a schematic perspective view of the assembly of FIG. 1.

Features of an arrangement of the crankcase ventilation filter arrangement can include:
Plastic injection molded nylon (glass-filled) components to ensure high performance and light weight at reasonable costs;
Inlet & outlet tubes molded into body—no hoses to remove when servicing element;
Quick & easy to service element from either top or bottom;
Retaining/locking ring fastened to both the top access cap and the bottom access cup with snap-fit feature;
Retaining/locking ring spins freely from top cap and bottom cup;
Retaining/locking ring attaches and locks top access cap and bottom access cup to tabs molded into the body;
¼ turn of the retaining/locking ring either locks or releases the top cap and bottom cup;
3 o-rings used for entire system sealing requirements;
Drain nipple molded into bottom access cup; and,
Sealing surface in body to improve performance.
Such an arrangement is depicted in FIG. 4, and in previous figures.

C. Still Further Discussion from U.S. 60/936,006

A larger arrangement from U.S. 60/936,006 utilizes many common components of the type discussed above. Higher blowby flows for certain engines tend to require a larger filter size. However, the body and the element can be the only components that are different from the previously described arrangements. This arrangement or system can use the same top access cap, bottom access cup, retaining/locking ring, and o-rings as the previously described arrangement or system. For example, the body diameter can be the same and the length can be increased by 55.0 mm [2.17 inch] and the inlet and outlet tubes can be increased from 25.4 mm [1.0 inch] to 31.75 mm [1.25 inch]. The element length can be increased by 55.0 mm [2.17 inch]. While new injection mold tooling can be required for the longer body and element for certain engines, the existing tools for the other parts can be utilized. The operation and servicing of this arrangement or system is the same as the first arrangement. Also, like the first arrangement, the mounting options can be varied. The illustration of FIG. 5 demonstrates the differences between the first arrangement and the arrangement.

Figure 5:
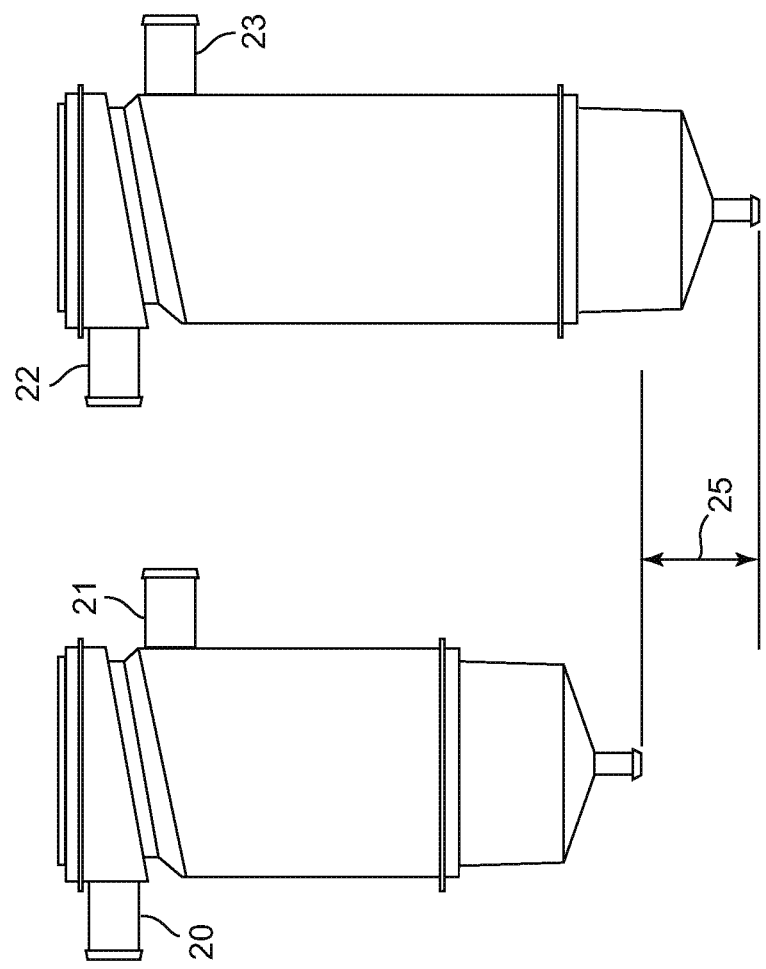
FIG. 5 is schematic side elevational view providing a comparative between the assembly of FIG. 1, and an alternate assembly.

Referring to FIG. 5, at 20 is shown a 25.4 mm (1 inch) inlet, of the previously described arrangement. At 21 is shown a 25.4 mm (1 inch) outlet for the previous arrangement. At 22 is shown an inlet, in this instance 31.75 mm, of the now described longer arrangement. At 23 is shown an outlet, in this instance 31.75 mm (1.25 inch). The difference in height between the two arrangements is indicated at 25, and can be 55.0 mm (2.17 inch).

II. An Example Crankcase Ventilation Filter Assembly and Components from U.S. Provisional 61/002,503, Filed Nov. 9, 2007, FIGS. 6-26

Figure 6:
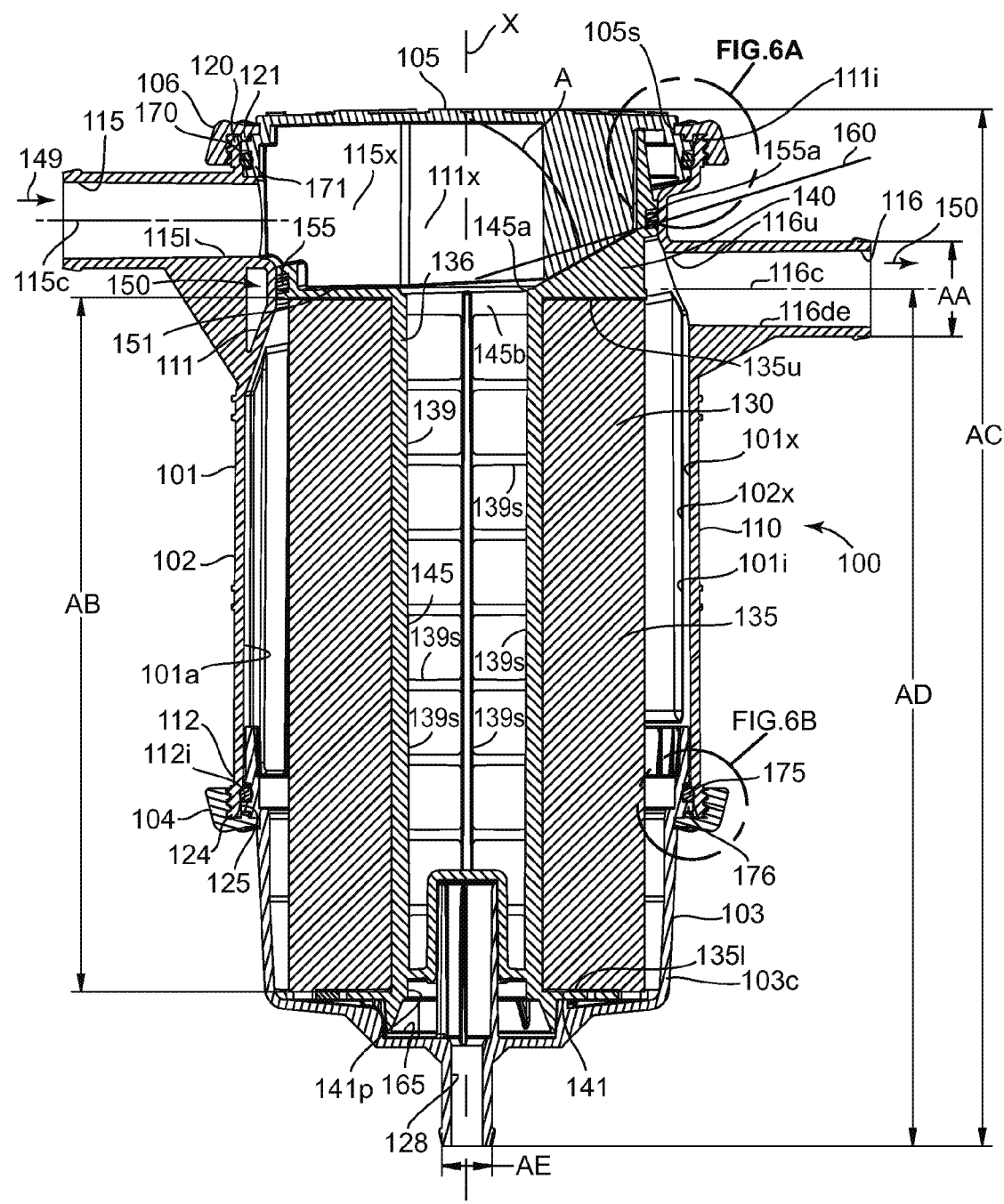
FIG. 6 is a schematic cross-sectional view of an alternate embodiment of a crankcase ventilation filter assembly according to U.S. 61/002,503, filed Nov. 9, 2007.

Many of the principles referenced in U.S. application Ser. No. 60/936,006 and described above with respect to FIGS. 1-5, are included in an example crankcase ventilation filter assembly and components depicted in FIGS. 6-26; from U.S. Provisional 61/002,503. The reference numeral 100, FIG. 6, generally indicates the example assembly, in schematic, cross-sectional, view. Referring to FIG. 6, assembly 100 comprises a housing 101. The housing 101 comprises: a main or central body or body section 102; a bottom cover 103, in this example comprising a cup 103c secured in place by locking ring 104; and, a top, cover or cap 105, in this example secured in place by a second locking ring 106. The locking rings 104, 106 can be identical to one another.

Still referring to FIG. 6, body 102 includes a side wall 110 having an upper region 111 and a lower region 112. The body 102 includes, a gas flow inlet arrangement 115 and a gas flow outlet arrangement 116, each extending through the sidewall 110 of body 110. (Thus, the housing 101 includes a gas flow inlet arrangement 115 and a gas flow outlet arrangement 116). For the particular assembly 100 depicted, a center line 115c of the inlet 115 extends generally above a center line 116c for the outlet arrangement 116. Further, for the example shown, the inlet arrangement 115 and the outlet arrangement 116 are positioned generally 180° around the sidewall 110, from one another. This is viewable, for example, in FIG. 7, a top, plan view of the assembly 100; the view of FIG. 6 being taken along line 6-6, FIG. 7. In addition, in the particular example body 102 depicted, a lowermost portion 115l of the inlet arrangement 115 is positioned, in use: lower than an uppermost portion 116u of the outlet arrangement 116; and, above a lowermost portion 116l of the outlet arrangement 116. This, in general, corresponds to having the outlet arrangement 116 as high as reasonably possible on the body 102, for advantages previously discussed.

Figure 16:
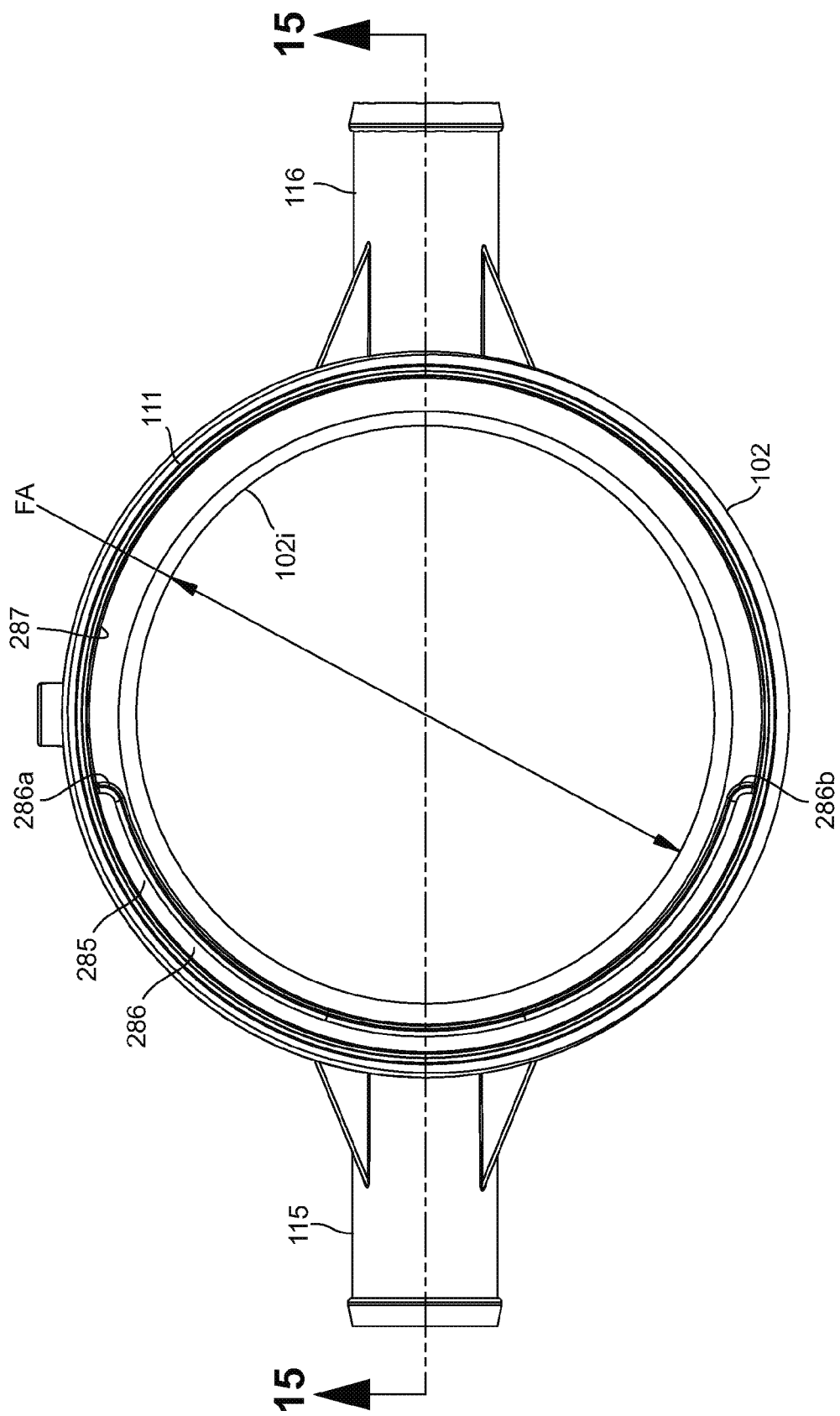
FIG. 16 is a schematic top plan view of the housing body component of FIG. 15.

In FIG. 16, the assembly 100 is depicted oriented as it would be typically for use, with cap 105 oriented above bottom cover 103. Herein, "top", "bottom", "above", "below", "upper", "lower" and similar terms of orientation, are meant to refer to the assembly 100 characterized, and components thereof, in the normal orientation of use, i.e. the orientation of FIG. 6.

Referring again to FIG. 6, at a location above inlet arrangement 115, the upper region 111 includes an upper end 120, with an opening 121. The upper, open, end 120 (i.e. opening 121) is sufficiently large to allow for service passage therethrough of an interiorly positioned crankcase ventilation filter element or cartridge 130, as described below.

Upper end 120 is closed by cap 105, secured in place by locking ring 106, in a manner described below.

Lower region 112 includes an end 124 defining an opening 125 sufficiently large to allow service passage therethrough of cartridge 130. Opening 125 is closed by bottom cover 105, in the example depicted, secured in place by ring 104.

From the above description, then, it can be seen that the housing body 102, and thus the overall housing 101, is configured to allow for service access to an internally received filter cartridge 130, from either or both of top end 111 and a bottom end 112. Alternately stated, for the example arrangement depicted, filter cartridge 130 can be installed or removed from the housing 101 through either one of the two opposite ends 111, 112. Thus, assembly 100 can be installed in a variety of equipment including: equipment configured for servicing from the top; and, alternatively, equipment configured for servicing from the bottom. Herein, the term "service passage", and variants thereof, is meant to refer to passage of cartridge 130 into and out of interior 101i of housing 101. This ability to service from either the top or the bottom is analogous to the assembly depicted and described in connection with FIG. 1.

Bottom cover 103 includes lower liquid drain 128 therein, for draining of collected liquid, as discussed below. This is analogous to the assembly of FIG. 1.

In general, housing 101 defines interior 101i in which is operably received a removable and replaceable (serviceable) filter cartridge 130. The filter cartridge 130 is a service component. When the filtration assembly 100 is used to filter crankcase blowby gases (i.e. crankcase ventilation gases) in various equipment, in due course filter cartridge 130 may be sufficiently occluded, to warrant refurbishment or replacement. When such is the case, the filter cartridge 130 can be removed from interior 101, either: by removal of top 105 with passage of the filter cartridge 130 through opening 121; or, by removal of filter cartridge 130 through opening 125 after removal of bottom cover 103. During servicing, the filter cartridge 130 is typically either removed and refurbished or is replaced with another filter cartridge, typically a new filter cartridge analogous to cartridge 130.

Referring to FIG. 6, crankcase ventilation filter cartridge 130 generally comprises media 135 supported on a media support 136. The media support 136, for the example shown, includes central core member 139 extending between first end member 140 and second, opposite, end member 141. The media 135 is generally wrapped around central core member 139, at a location between end members 140, 141, to define an open filter interior 145. Core member 139 is typically permeable, allowing for gas flow therethrough, permeability being provided by apertures 139a.

In general terms, media 135 can be characterized as having an upper end 135u and a lower end 135l. The upper end 135u is adjacent, and overlapped by, end member 140; and, lower end 135l is adjacent to, and overlapped by, end member 141. Thus, the end members 140, 141 are first and second, opposite, end members, positioned with the media 135 and tubular support 139 extending therebetween.

Still referring to FIG. 6, it is noted that end member 140 is an open end member and includes central aperture 145a therethrough, in gas flow communication with open filter region 145. Depending downwardly from central aperture 145a is closed lip 145b. Further, open tubular section 139 includes spaced ribs 139r extending longitudinally therealong, for strength.

On the other hand, as is described in detail below, end member 141 is a closed end member; i.e. gas flow can not extend therethrough into direct flow with interior 145.

Referring to FIG. 6, operation is generally as follows: crankcase ventilation gases (or engine blowby gases) are directed into assembly 100 through air flow inlet arrangement 115, in the direction of arrow 149. These gases are then directed into upper inlet region 111x of housing 101, above filter cartridge 130. The gases pass downwardly through aperture 145a into filter interior 145, surrounded by core or support member 139. The gases can then pass through the apertures 139a, into the media 135. Within the media 135, liquid particles contained within the gases will begin to coalesce. Also, solid particulate will become entrapped within the media 135. The gases, once filtered by the media 135, are generally directed into air flow annulus 101a, surrounding media 135. These gases are then passed into outlet arrangement 116 and thus outwardly from assembly 100 in the general direction of arrow 150. (This is analogous to operation of the assembly of FIG. 1). In a "closed" crankcase ventilation system, the gases can then be directed, for example, into a combustion air inlet assembly for the engine involved. In an "open" system, the filtered gases can be vented to the atmosphere.

Liquid coalesced within the cartridge media 135 will generally drain downwardly, eventually into lower central volume 165 of bottom cover 103, and outwardly from assembly 100 through lower drain 128. (This is also analogous to operation of the assembly of FIG. 1).

The equipment in which assembly 100 is installed can be configured for a servicing of assembly 100 from a top. Such servicing would generally be as follows. Ring 106 would be rotated, until disengagement from upper end 120 occurs. Ring 106 and cap 105 could then be removed exposing opening 121. The service provider could then access cartridge 130 for removal. A new cartridge could be installed in reverse operation. It is noted that this top servicing does not require disattachment of lines secured to inlet arrangement 115, outlet arrangement 116 or bottom drain 128.

If the equipment in which the crankcase ventilation filter assembly 100 installed is configured for servicing from the bottom, servicing would be as follows. Locking ring 104 would be rotated sufficiently for separation of bottom cover 103 and ring 104 from end 112. The filter cartridge 130 could then be removed through bottom opening 125. The follow-up servicing would typically involve either: installing a new cartridge 130 in the cup 103, and then assembling housing 101 by attaching the bottom cover 103 with ring 104 to end 112; or, installing the cartridge 130 in body 102, and then attaching bottom 103. It is noted that a bottom servicing operation as described would not require disattachment of lines from inlet arrangement 115 or outlet arrangement 116. Further, a drain line attached to drain 128 would not need to disconnected, in a typical servicing operation of this type.

It is noted that assembly 100 can be mounted within the equipment to which it used, by a mounting band or bracket on central body section 102. Such a mounting band or bracket would not need to be loosened or disconnected, during a typical servicing operation from either the top or the bottom.

Referring still to FIG. 6, it is necessary and desirable to isolate inlet arrangement 115 and upper unfiltered gas region 111x, from clean gas annulus 101a and outlet arrangement 116, to inhibit unfiltered gases entering inlet 115 from exiting outlet 116. This is generally provided, by a housing seal arrangement mounted on filter cartridge 130. In FIG. 6, the housing seal arrangement is indicated generally at 150. The housing seal arrangement 150 generally comprises a housing seal member 155 which seals to a housing seal surface 151 of interior wall 101x of the housing 101; the sealing being to an interior wall portion at body 102. The seal surface 151 of the housing 101, to which the seal arrangement 150 seals, generally is positioned to: pass over, i.e. above, the outlet arrangement 116 and, to pass below, i.e. under, housing inlet arrangement 11 Similarly, seal member 155 passes over outlet arrangement 116 and under inlet arrangement 115.

For the particular example seal arrangement 150 depicted: the seal member 155 defines an outer perimeter, angled non-orthogonally and non-parallel (in alignment with a plane generally designated at 160), to a central axis X of the cartridge 130 and housing 101; and, also, angled (non-orthogonally and non-parallel) to a plane perpendicular to the central axis X. For the example depicted, an acute angle between the plane 160 of the seal member 155 and the central axis X is indicated generally at A. This angle A is typically at least 60° and usually not more than 86°, typically angle A is within the range of 65° to 85°, inclusive. Herein, when it is said that the "seal member 155 defines an outer perimeter, angled in alignment with an axis or a plane", it is meant that the seal member 155 defines an outer perimeter for sealing, through which the "plane" of alignment can be drawn. Of course, the seal surface of the seal member 155, is directed radially outwardly, in the example depicted.

It is noted that the seal member 155, for the example depicted, can comprise an o-ring 155a. The outer perimeter of the seal member 155 can be configured as an ellipse. In some instances, as an alternative, the outer perimeter of the seal member 155 can be configured as a circle. Indeed, a variety of configurations for the outer perimeter of the seal member 155 can be used. As a result of optionally using an angled plane 160 for seal member 155, advantages as discussed in Section I above are obtained.

Figure 8:
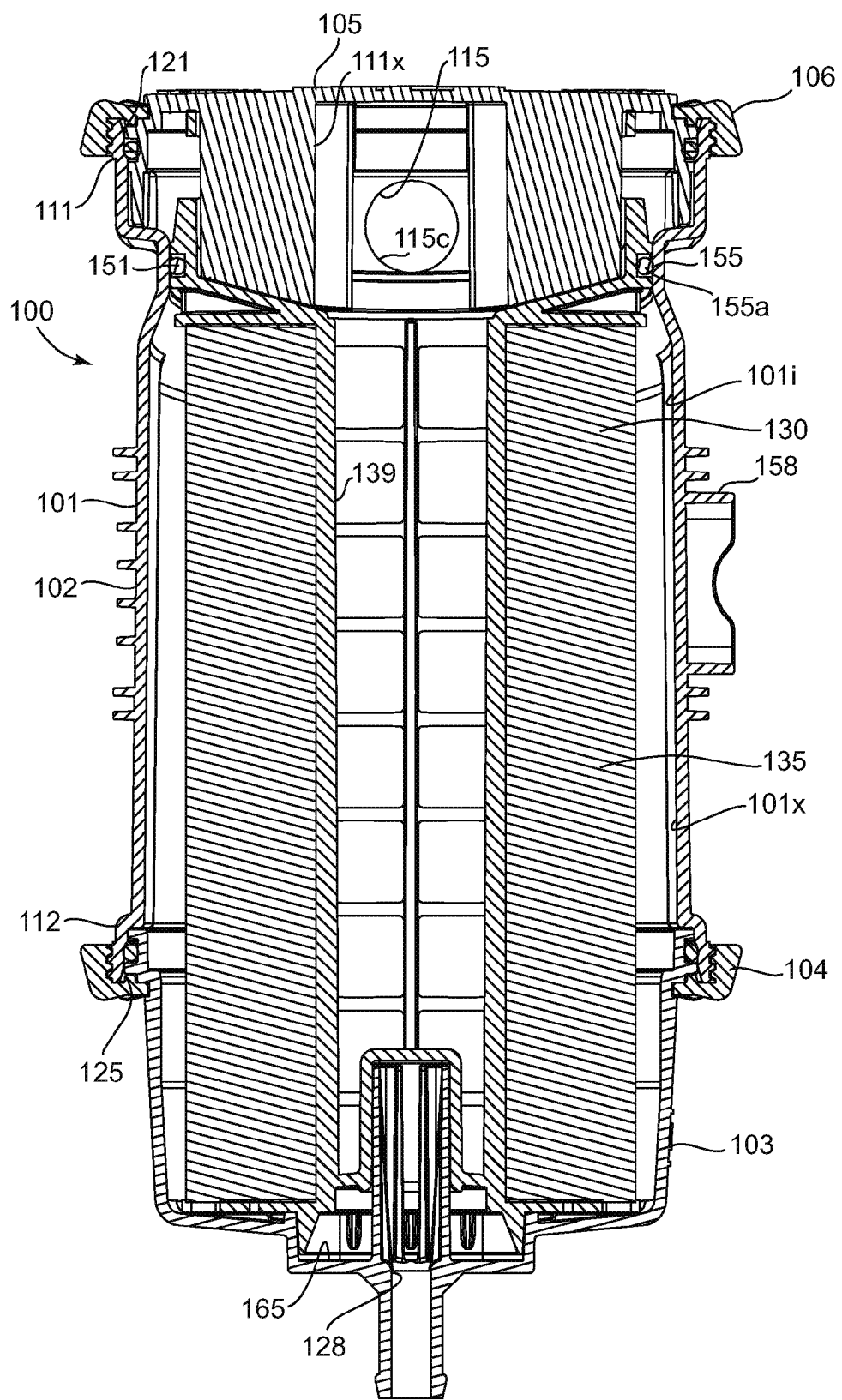
FIG. 8 is a schematic cross-sectional view taken along line 8-8, FIG. 7.

Attention is now directed to FIG. 8, a cross-sectional view taken perpendicular to the cross-sectional view of FIG. 6; i.e. FIG. 8 is taken generally along line 8-8, FIG. 7. Referring to FIG. 8: inlet arrangement 115 is viewable. For the example assembly 100 depicted, where the inlet arrangement 115 passes through body 102, a circular definition 115c is provided. In the example assembly 100 shown, a circular definition would also be provided by the outlet arrangement 116, FIG. 6, as it passes through body 102.

Also in FIG. 8, filter cartridge 130 with seal member 155 thereon is viewable, seal member 155 being sealed against seal surface 151.

In FIG. 8, mounting arrangement 158 is viewable. The mounting arrangement 158, for the particular example shown, can comprise a mounting pad molded to, for example molded as part of, the housing body 102. The mounting pad 158 can be provided with a receiver for a mounting bolt or similar connection arrangement, secured to assembly 100 within equipment for which it is to be used. To facilitate this, the mounting pad arrangement 158 can be provided with one or more metal receivers, or similar connectors, for bolts, embedded in plastic from which body 102 is formed. When such is the case, assembly 100 would not be entirely non-metal.

Figure 9:
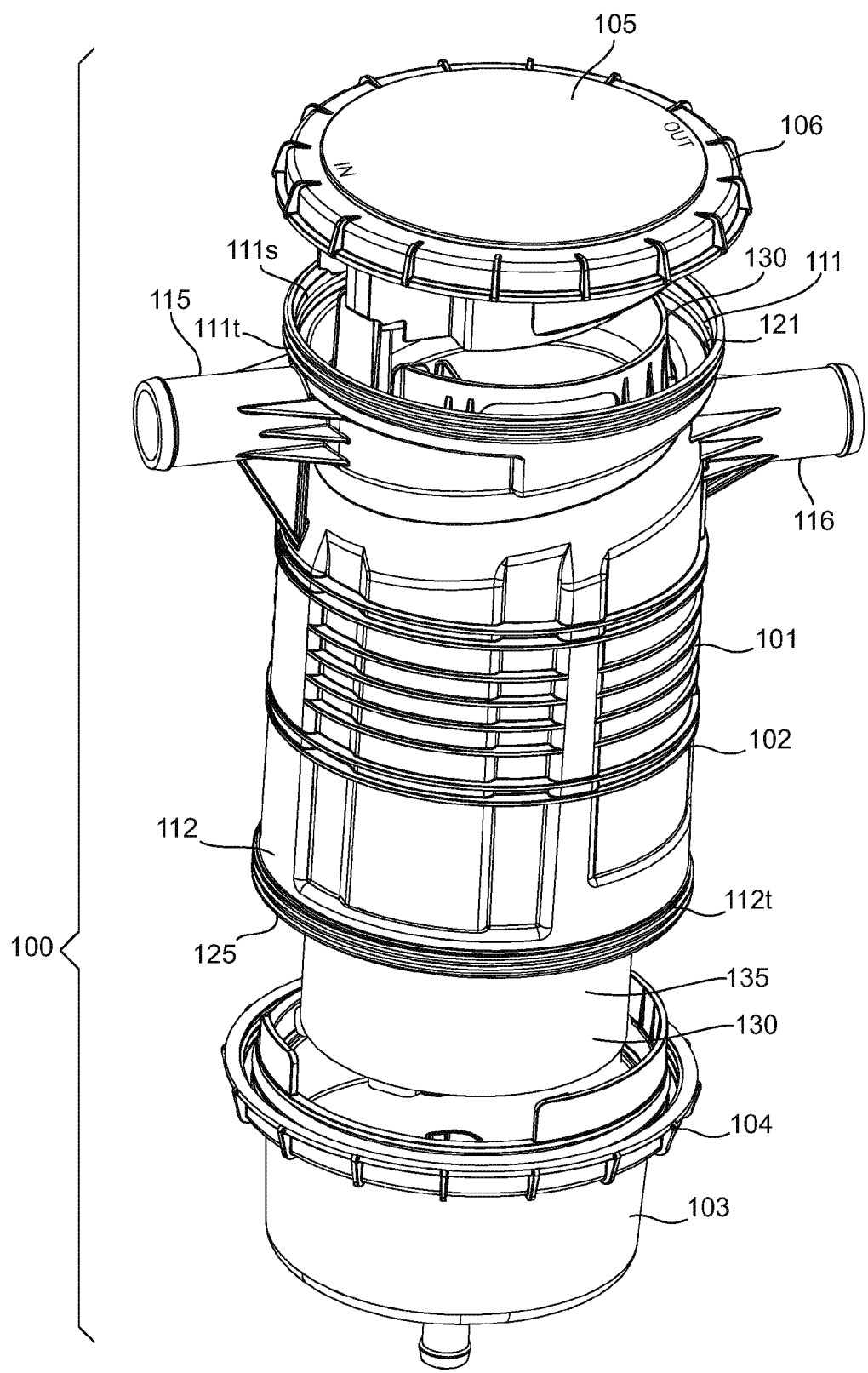
FIG. 9 is a schematic, exploded, top perspective view of the crankcase ventilation filter assembly of FIGS. 6-8.

Attention is now directed to FIG. 9. In FIG. 9, an exploded, perspective view of assembly 100 is depicted. It can be seen that ring 106 is mounted on end 111 of housing body 102 by threaded engagement with threads 111t around opening 121. It can also be seen that bottom cover 103 is secured to end 112, by ring 104 in threaded engagement with threads 112t, at end 112. Portions of internally received cartridge 130 are also viewable.

Referring back to FIG. 6, it is noted that a seal member 170 is positioned around depending portion 171 of top 105. Seal member 170 is positioned to engage surface 111i, FIG. 9, for sealing. Also, ring 106 engages flange 105f; in top 105, FIG. 6.

Still referring to FIG. 6, seal member 175 is depicted mounted on an upwardly projecting region 176 of bottom cover 103. Seal member 175 is oriented to seal against internal region 112*i* of end 112, FIG. 9. Seal members 170, 175 can comprise o-rings, analogously to those described above in Section I.

Figure 6A:
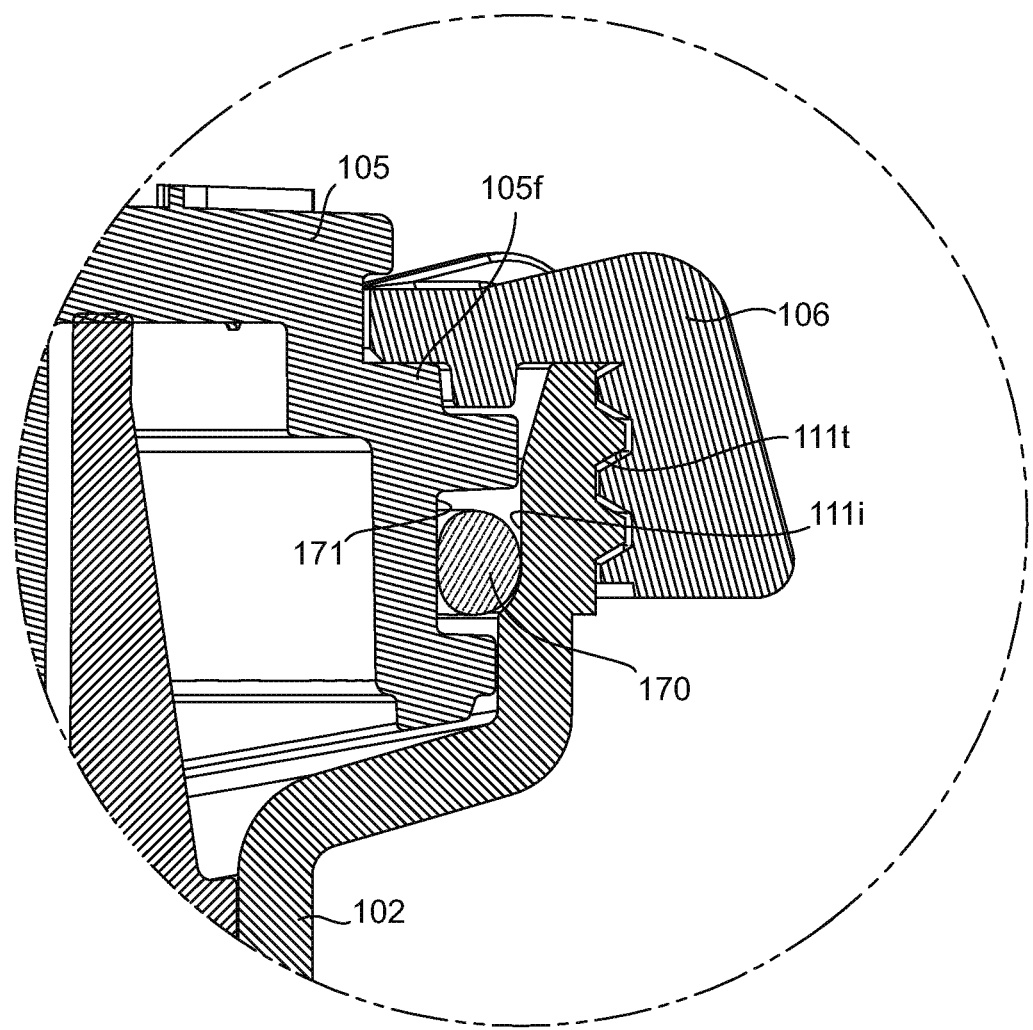
FIG. 6A is an enlarged, schematic, fragmentary view of a first portion of FIG. 6.

FIG. 6A is an enlarged, fragmentary view of a portion of FIG. 6, in the region of seal member 170. The seal member 170 can be seen positioned on depending rim portion 171 of top 105, and sealed against seal surface 111*i*.

Figure 6B:
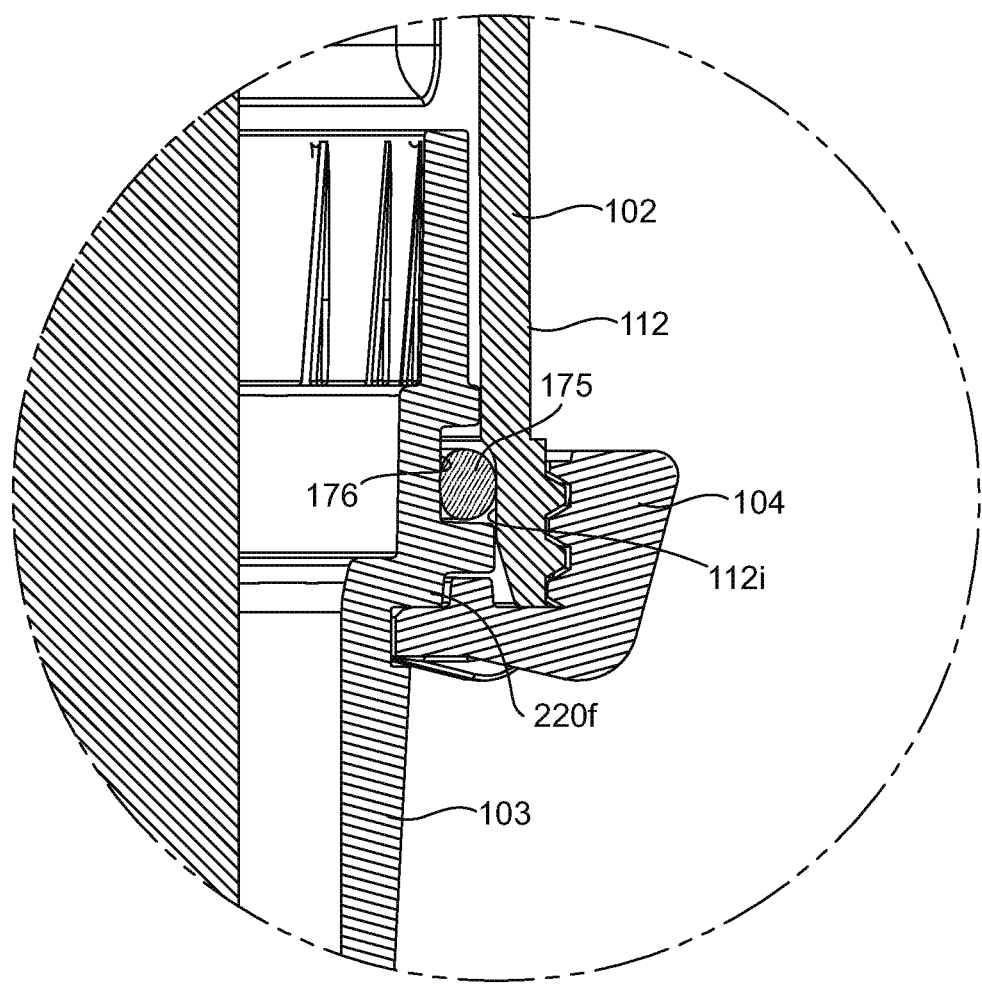
FIG. 6B is an enlarged, schematic, fragmentary view of a second portion of FIG. 6.

FIG. 6B is an enlarged, fragmentary view of a portion of FIG. 6, in the region of seal member 175. Here, seal member 175 is mounted on region 176 of bottom cover 105, sealed against internal region 112*i* of end 112.

Figure 10:
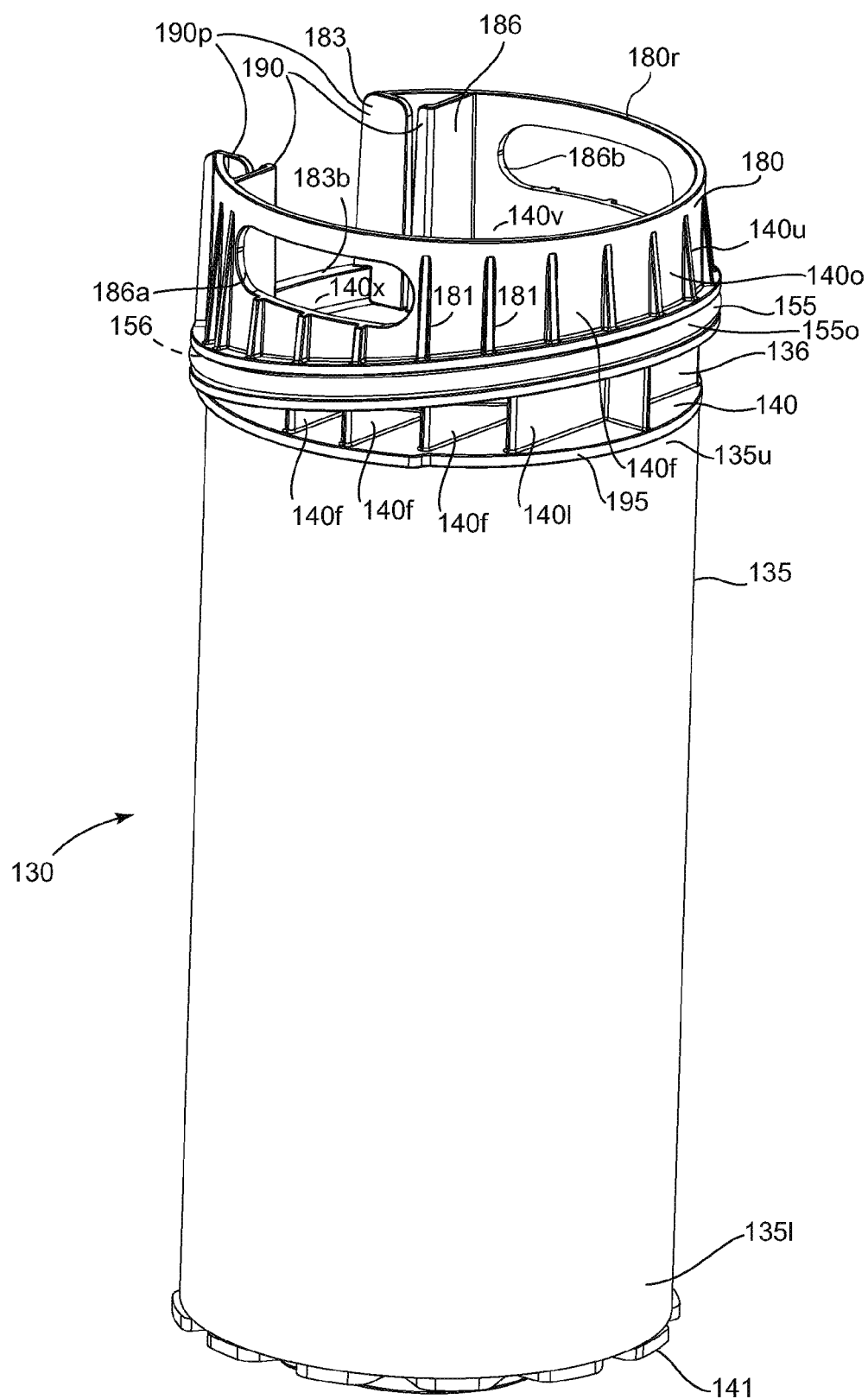
FIG. 10 is schematic top perspective view of a filter cartridge usable in the assembly of FIG. 6-9.

In FIG. 10, top perspective view of cartridge 130 is depicted. The cartridge 130 includes media 135 mounted on a support 136. The support 136 includes a first (top) end member 140; and, a second, opposite (bottom) end member 141. As explained in connection with FIG. 6, extending between the end members 140, 141 is provided a central support 139 (not viewable in FIG. 6) around which the media 135 is mounted.

Referring to FIG. 10, a first end member 140, which comprises an upper or top end member in the cartridge 130 when installed, includes a plurality of features. For example, seal member 155, in the example shown comprising an o-ring 155*o*, is mounted on a seal support 156, extending peripherally around first end member 140. Seal member 155 is positioned to form a seal with seal surface 151 as previously discussed, in connection with FIG. 6. Also, seal member 155 is positioned with no portion thereof surrounding media 135. This is, seal 155 is entirely positioned above end 135*u* of media 135.

Referring to FIG. 10, seal member 155 can be viewed as separating end flange member 140*f* (of member 140) into upper 140*u* and lower 140*l* regions.

Referring still to FIG. 10, the upper region 140*u* comprises a plurality of features. First, the upper region 140*u* comprises a c-shaped upwardly projecting flange 180. The flange 180 includes strengthening ribs 181 therein. The flange 180 is c-shaped and includes a gap 183 therein. The gap 183 is oriented to allow inlet flow from inlet 115 to enter a volume 140*v*, above media 135, and partially surrounded by flange 180. This allows gas flow from inlet 115 to eventually reach aperture 145*a*, FIG. 6, through end member 140. Gap 183 is generally sized to extend over an arc of at least 30°, typically no more than 80°; and usually an amount within the range of 40-70°, inclusive.

Still referring to FIG. 10, it can be seen that seal member 155 is mounted to extend underneath gap 183, and to extend above a lowermost portion 183*b* of gap 183, in extension across an opposite side 140*o* of end member 140; i.e. across flange 180. Flange 180 can be perceived as defining an upper rim or rail 180*r*, having an arcuate definition. Flange 180, in a typical example, will project to a location at least 30 mm above media 135*u*, usually an amount within the range of 30-70 mm.

Still referring to FIG. 10, upper flange 180 includes a handle arrangement 186 thereon. The particular handle arrangement 186 depicted, comprises first and second handle apertures 186*a*, 186*b*, oppositely (radially) positioned through flange 180, below upper edge or rail 180*r*. The apertures 186*a*, 186*b* are each sized to accommodate a portion of a human hand extending therethrough, to facilitate handling (servicing) of cartridge 130. For a typical arrangement, a radial (arcuate) extension of each handle aperture 186*a*, 186*b*, is typically at least 30°, usually at least 40°.

It is also noted, referring to FIG. 10, that flange 180 includes a first member 190 of a filter cartridge-to-housing top (or housing top-to-filter cartridge) rotational indexing arrangement as described further below. The filter cartridge-to-housing top rotational indexing arrangement generally ensures that the cartridge 130 is appropriately, rotationally, positioned within housing 101, for seal member 155 to properly engage seal surface 151; and, for gap 183 to be aligned with inlet arrangement 115, for proper gas flow. Herein, the term "operably engaged" is sometimes used to refer to single, selected, upper orientation of various separable components. Thus, as a result of the filter cartridge-to-housing top rotational indexing arrangement, the cartridge is positioned to operably engage housing top, and thus a remainder of the assembly 100.

Still referring to FIG. 10, region 140*l* of first upper end piece 140, includes a plurality of strengthening fins 140*f* thereon. The fins 140*f* generally extend between seal support 156 and end cover 195 adjacent the media 135. In some instances, the media 135 may be potted to end cover 195, to inhibit gas flow therebetween. However, in some instances, depending lip 145*b*, FIG. 6, depending downwardly from aperture 145*a* will be sufficient, to inhibit undesirable levels of bypass flow between media end 135*u* and the cover 195. In some instances the media 135 will be adhered to lip 140*b*. A similar effect to lip 145*b* can be provided at end 135*l* by lip 141*p*, FIG. 6.

Still referring to FIG. 10, wall 140*x*, extending across gap 183 adjacent end 195, not only provides support across gap 183 for seal 155, it also inhibits liquid in interior 140*v* from draining in a direction other than into and through aperture 145*a*, FIG. 6.

Figure 11:
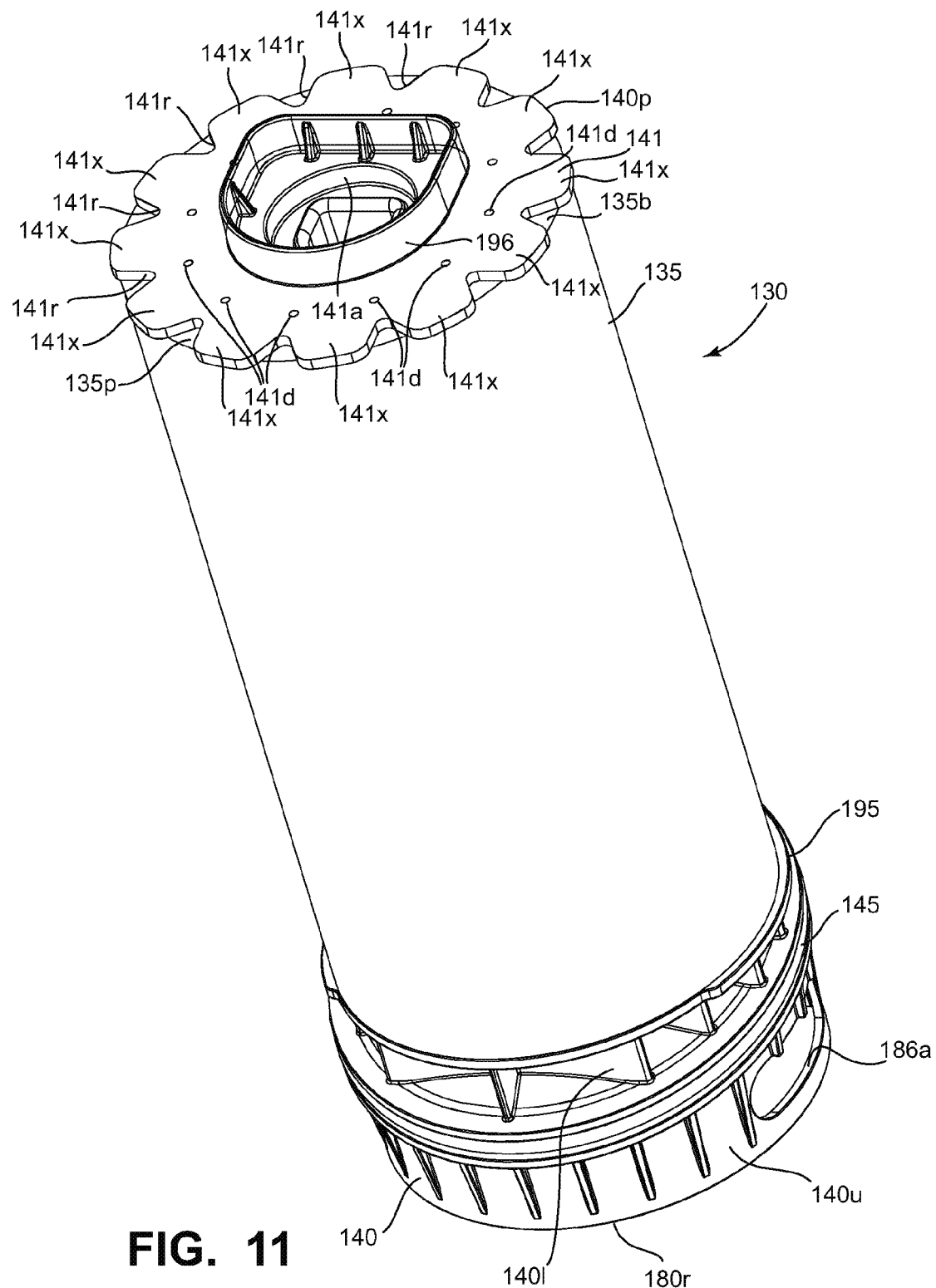
FIG. 11 is a schematic bottom perspective view of the filter cartridge of FIG. 10.

Attention is now directed to FIG. 11, a bottom perspective view of cartridge 130. Here, end member 141 can be examined. The end member 141 includes an outer periphery or perimeter 141*p* having a plurality of outwardly projecting, spaced, petals or projections 141*x* threat. Between adjacent projections 141*x* are positioned recesses 141*r*, which extend partly across (underneath) a bottom end 135*b*, FIG. 6, of the media 135. Liquid collected within the media 135 can drain directly downwardly from bottom end 135*b* through the recesses 141*r*.

Also, positioned part way across end member 141 from outer periphery 140*p* to aperture 141*a* are positioned a plurality of spaced drain apertures 141*d*. Drain apertures 141*d* are positioned in drain flow overlap with bottom end 135*b* of media 135. The apertures 141*d* are typically positioned at least 20% across media bottom end 135*b* (FIG. 6) from each of outer media perimeter 135*p* and central aperture 141*a*. The apertures 141*d* facilitate liquid drainage directly downwardly from bottom end 135*b* of media 135. Such a bottom drain arrangement is also described in WO 2007/053411, published May 10, 2007, incorporated herein by reference.

Referring again to FIG. 11, end member 141 defines central aperture 141*a*. The aperture 141*a* accommodates a portion of the guide arrangement for installation of the cartridge 130, discussed below. Again, aperture 141*a* does not create a gas flow communication between interior 145 of the media 135, in a region exterior of bottom end member 141. The reason for this is that projecting inwardly from aperture 141*a* is a recess or guide arrangement, which is closed, as discussed below.

Still referring to FIG. 11, end member 141 further includes a first member 196 of a filter cartridge-to-housing bottom (or housing bottom-to-filter cartridge) rotational indexing arrangement further discussed below. The filter cartridge-to-housing bottom rotational indexing arrangement provides for rotational indexing between bottom cover 103 and cartridge 130, during installation, to facilitate orientation of cartridge 130 in a proper (operable) rotational position.

Figure 12:
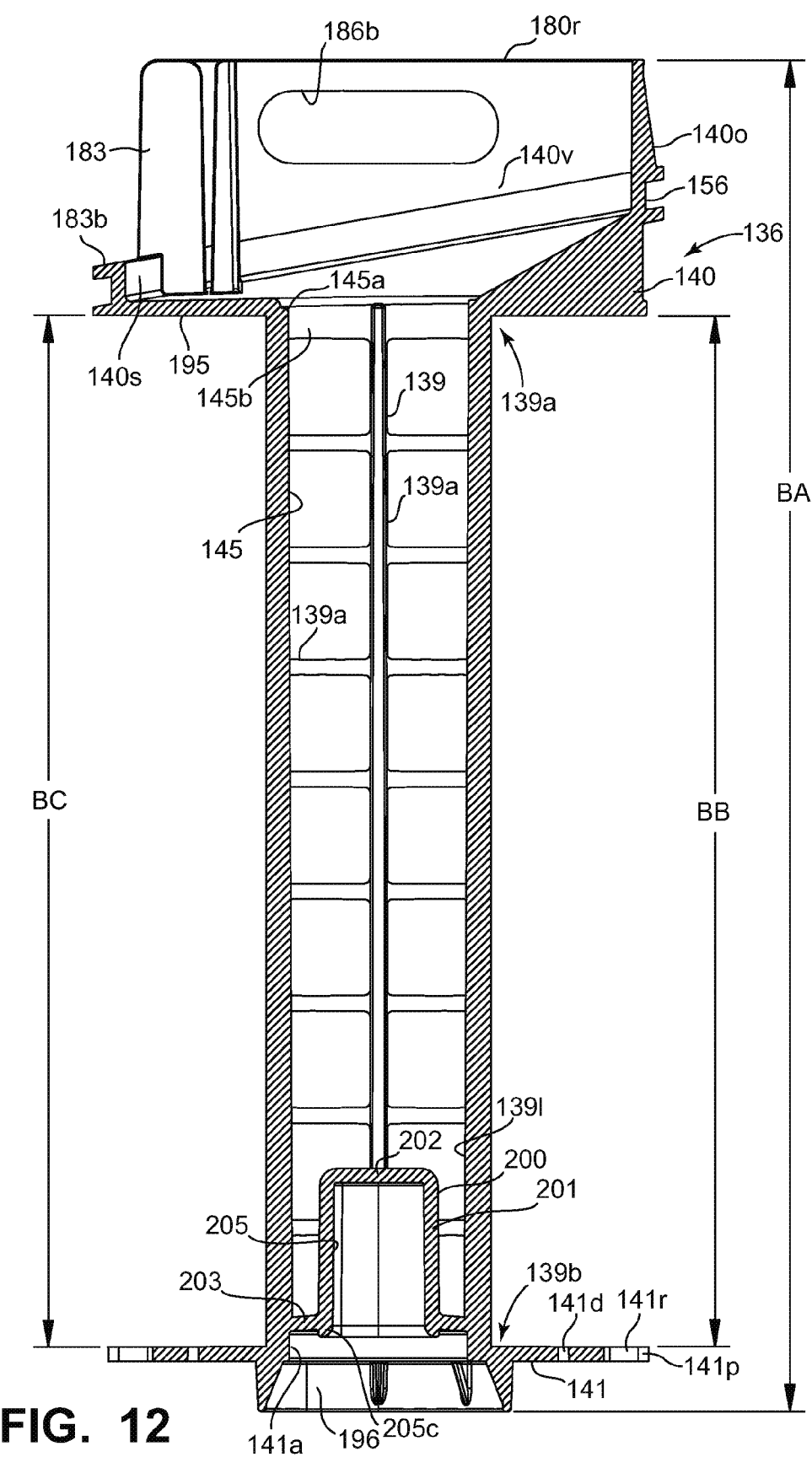
FIG. 12 is a schematic cross-sectional view of a support member used as a component in the filter cartridge of FIGS. 10 and 11.

Attention is now directed to FIG. 12. FIG. 12 is a cross-sectional view of cartridge support 136. End member 140 is viewable with handle aperture 186b therein. Slanted support 156 is viewable for supporting seal member 155, FIG. 6. Central media support 139 with apertures 139a therethrough, can be inspected.

Referring to FIG. 12, support 139 can be viewed as having an upper end 139u and a lower bottom end 139b. In general, end member 140 is positioned at upper end 139u, and end member 141 is positioned at lower end 139b. For the particular example support 136 depicted, end member 140, support 139 and end member 141 are integral with one another, the support 136 comprising a single, molded, integral piece; typically a plastic piece. Alternatives are possible.

As generally indicated previously, end member 140 is an open end member, having central aperture 145a therethrough. End member 141, on the other hand, is closed, since central aperture 141a is closed by enclosure 200. That is, gas flow in filter cartridge interior 145 can not be accessed through end member 141.

In particular, and referring to FIG. 12, extending across an interior 139i defined by support 139, adjacent end 139b is provided end closure 200. End closure 200, for the example shown, comprises a side wall 201, and closed upper (inner) end 202, and a rim 203. Rim 203 mounts the side wall 201 to an end 139b of support 139.

End closure 200, then, for the example depicted, defines a receiving space 205 isolated from interior 139i of support 139, by the end closure 200. The receiving space 205 includes an open end 205e into which a guide member, as discussed below, can be projected upon extension through aperture 141a. In general terms, receiving space 205 comprises a central receiving recess 206 in end member 141.

End member 141, then, is closed, with respect to communication to interior 139, by closure 200.

Figure 13:
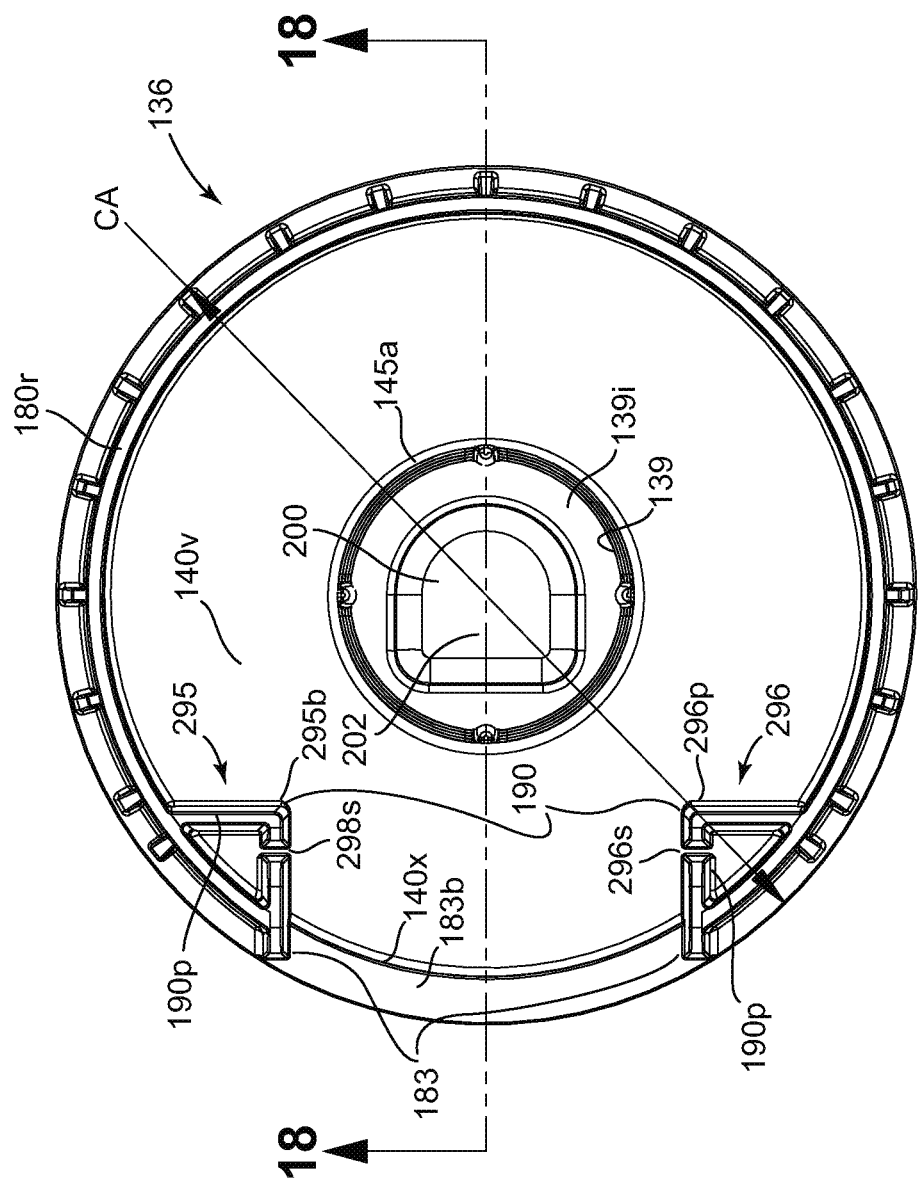
FIG. 13 is a schematic top plan view of the component of FIG. 12.

In FIG. 13, a top plan view of support 136 is provided. End closure 200 within interior 139i of support 139 is viewable, the view being directed toward end 202.

Also viewable in FIG. 13 are: gap 183; and, first member 190 of the filter cartridge-to-housing top (cover) rotational indexing arrangement, discussed further below.

Figure 14:
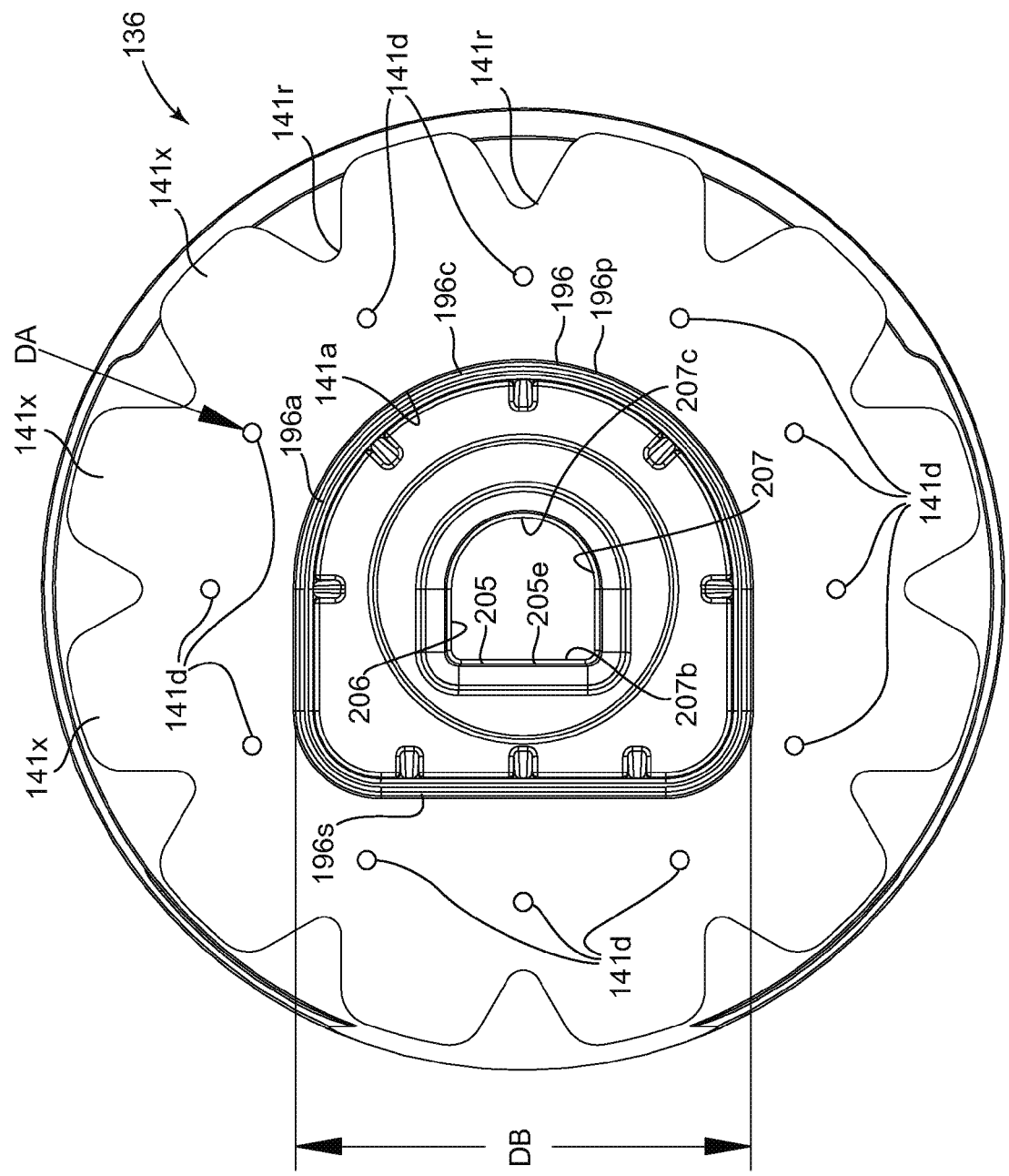
FIG. 14 is a schematic bottom plan view of the component of FIG. 12.

Attention is now directed to FIG. 14, a bottom plan view of support 136. Receiver space 205 is viewable. Receiver space 205 includes open end 205e.

Also viewable in FIG. 14 is the first member 196 of the filter cartridge-to-housing bottom (cover) rotational indexing arrangement, discussed below.

In FIGS. 15-17A, views of housing body 102 are provided. FIG. 16 is generally a top plan view, and inlet arrangement 115 and outlet arrangement 116 are viewable, as well as interior 102i. The view of FIG. 16 is generally toward top end 111. In FIG. 16, it can be seen that for the example shown, the inlet arrangement 115 and outlet arrangement 116 are oriented 180° apart from one another, around an exterior of housing body 102.

Figure 15:
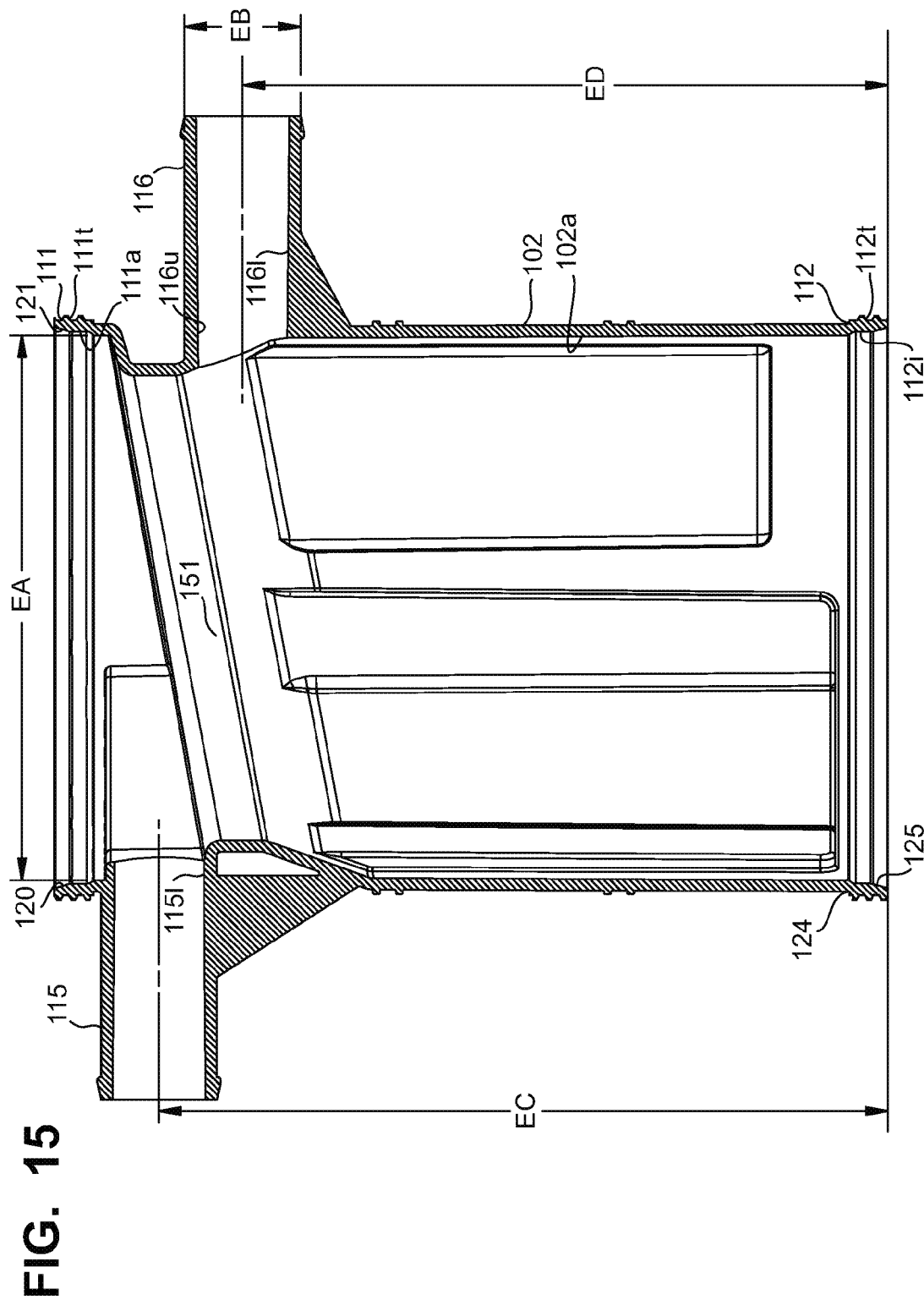
FIG. 15 is a schematic cross-sectional view a housing body component of the assembly of FIGS. 6-9.

FIG. 15 is generally a cross-section taken along 15-15, FIG. 16. Upper end 111 is viewable with outer threads 111t. Lower end 112 is viewable with outer threads 112t. Seal surface 151 is viewable. Also viewable is seal region 111i for seal member 170 FIG. 6A; and, seal region 112i for seal member 175 FIG. 6B.

Figure 17:
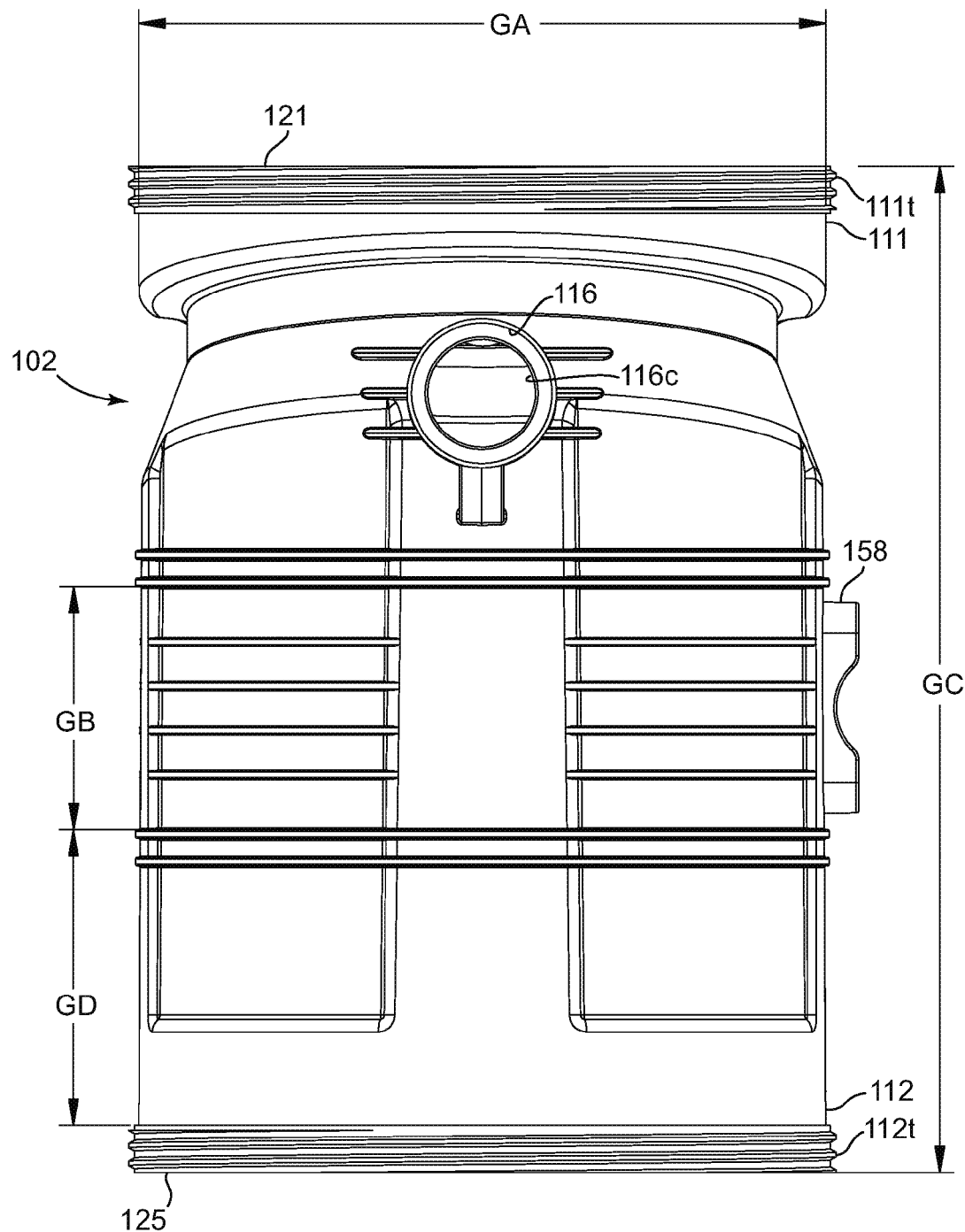
FIG. 17 is schematic side elevational view of the housing body component depicted in FIGS. 15 and 16, taken in the general direction of an outlet arrangement thereon.

Referring to FIG. 17, an exterior view of housing body 102 is provided, taken generally toward outlet arrangement 116. The outlet arrangement 116 can be seen to have a circular internal cross-sectional shape 116c, for the example depicted.

Figure 17A:
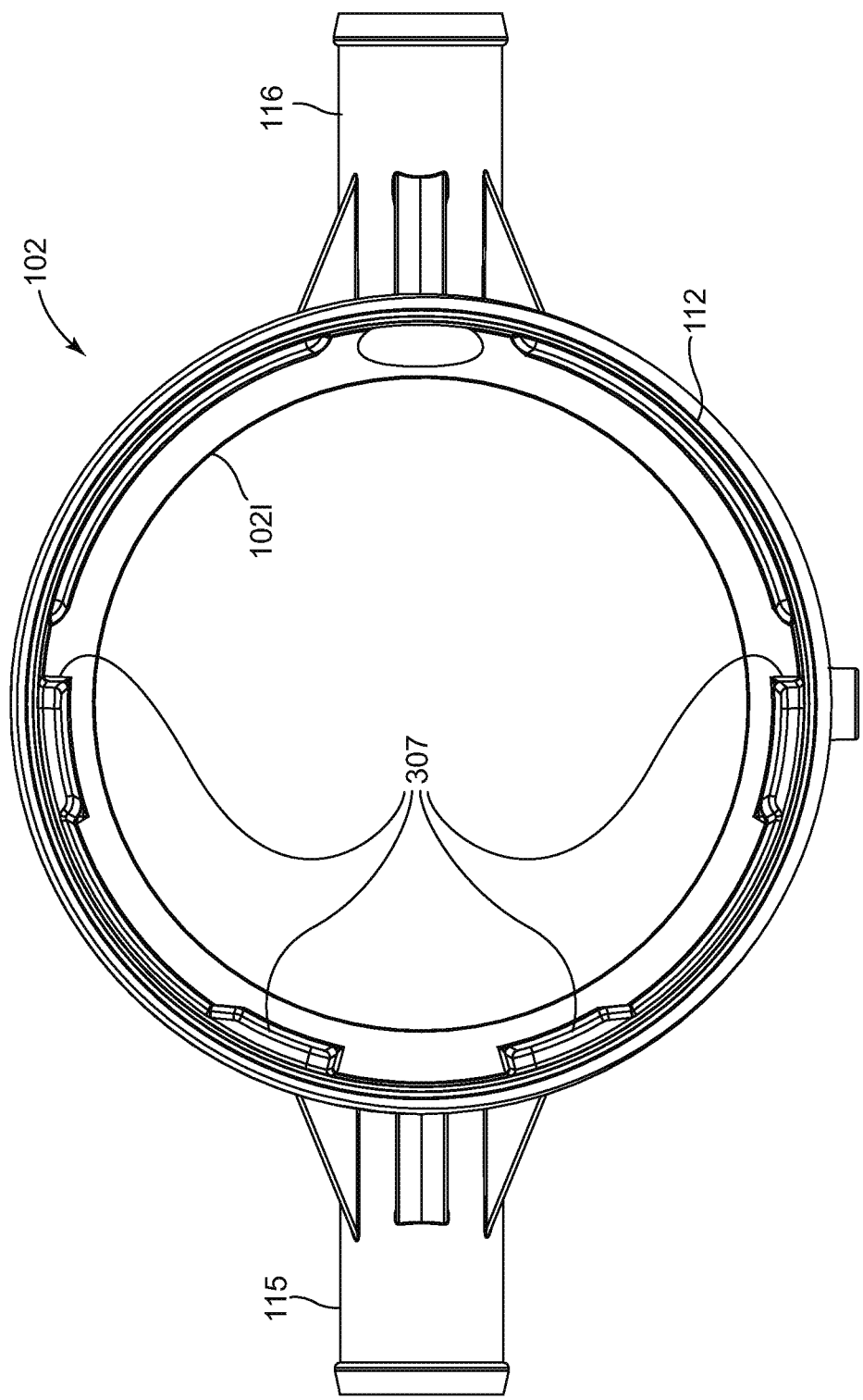
FIG. 17A is a schematic bottom plan view of the housing body component of FIG. 15.

FIG. 17A is a bottom plan view of housing body 102. Here, again, inlet arrangement 115 and outlet arrangement 116 can be seen spaced 180° apart from one another around the housing body 102.

Figure 18:
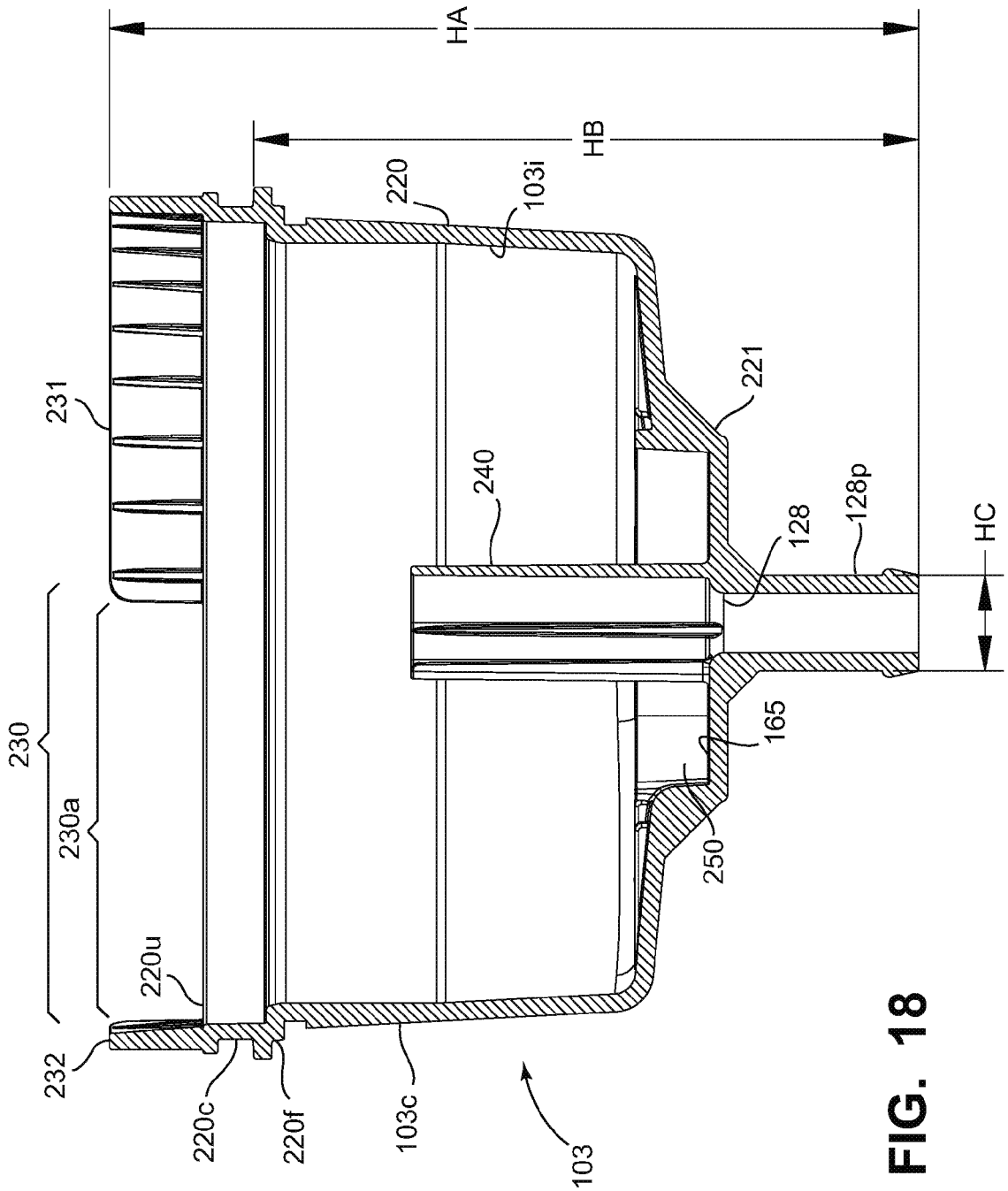
FIG. 18 is a schematic cross-sectional view of a bottom cover component of the assembly of FIGS. 6-9.
Figure 19:
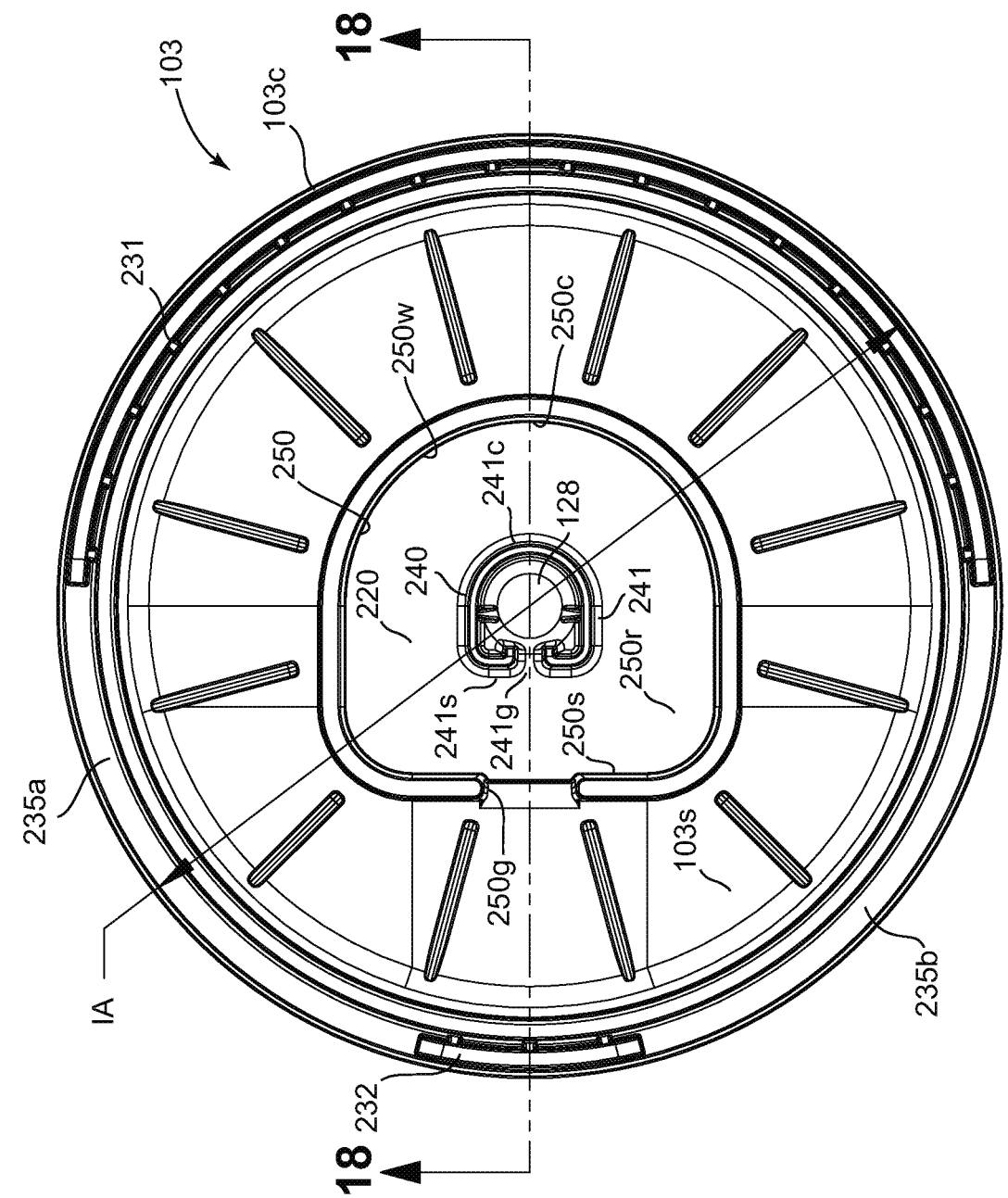
FIG. 19 is a schematic top plan view of the bottom cover component of FIG. 18.

Attention is now directed to FIGS. 18 and 19, in which bottom cover 103 is viewable. Referring to FIG. 18, (a cross-section taken along 18-18, FIG. 19, a top plan view), bottom cover 103 in the example shown is configured as a bottom cup 103c having side wall 220, bottom 221 and a lower drain 128. Lower drain 128 is in liquid flow communication with an interior 103i defined by the bottom cup 103c. Lower drain 128 includes, projecting downwardly therefrom, liquid flow ejection tube 128p by which liquid collected within interior 103i can be drained from assembly 100.

Wall 220 includes an upper region 220u with an outwardly directed flange 220f thereon, for engagement by locking ring 104, FIG. 6B. Recess 220r above flange 220f provides a seat for seal member 175 FIG. 6. Seal member 175, again, can comprise an o-ring.

Referring to FIG. 18, positioned above recess 220r is provided a first member 230 of a housing bottom cover or cup-to-housing body (or housing body-to-housing body) rotational indexing arrangement. The first member 230, for the arrangement depicted, comprises a projection arrangement 230a, extending upwardly from the remainder of bottom cup 103c. The projection arrangement 230a comprises, in the example shown, first and second, spaced, arcuate flanges or projections 231, 232. In the example depicted, FIG. 19, the first projection 231 extends over an arc of at least about 120°, typically 160°-180°, and usually not more than 200°; and, the second projection 232 extends over an arc of at least about 15°, typically at least 20°, and usually not more than 45°. In the example depicted, an arcuate extension of projection 231 is about 170-175° and; an arcuate extension of flange 232 is about 25-30°.

Still referring to FIG. 19, projections 231, 232 are viewable spaced from one another, by gaps 235a, 235b, each gap 235a, 235b having an arcuate extension. For the example shown, the gaps 235a, 235b none the same arcuate extension, although alternatives are possible.

The housing bottom-to-housing body rotational indexing arrangement, ensures that the bottom cover 103 can only be secured to the housing body 102 in a selected, operable, rotational orientation, in the example shown only a single, selected, rotational orientation is possible. The manner in which this is used to facilitate filter cartridge 130 installation and servicing, is discussed below.

The assembly 100 further includes a filter cartridge-to-guide (or guide-to-filter cartridge) rotational indexing arrangement. This rotational indexing arrangement helps ensure that as the filter cartridge 130 is lowered toward the bottom cover 103, or the bottom cover 103 is pushed toward the cartridge 130, the two are oriented in a preferred rotational arrangement relative to one another, so that a filter cartridge-to-bottom cover (or bottom cover-to-filter cartridge) rotational indexing arrangement discussed below, is readily engaged. The filter cartridge-to-guide rotational indexing arrangement is generally as follows. Referring to FIG. 18, it is noted that the bottom cover 103 includes central projection or guide 240 extending upwardly from bottom 221, within cup interior 103i. The projection or guide 240 is sized to project through aperture 141a, in end member 141 (FIG. 12) and into receiver space 205, i.e. into recess 206. The projection 240 provides a guide facilitating installation.

Referring to FIG. 19, a top plan view of bottom cover 103, it is noted that guide 240 has an outer perimeter 241 which is non-circular in top view or cross-section. For the particular example shown, the outer perimeter 241 is generally D-shaped, with a straight side 241s and an opposite, curved side 241c. Through straight side 241s is provided a drain gap 241g. The drain gap 241g allows for liquid flow from bottom region 220i into drain aperture 128.

The asymmetric shape of perimeter 241 i.e. non-circular, can be chosen to allow for only one, operable, rotational orientation of cartridge 130, relative to the guide 240, when guide 240 is inserted through aperture 141a into receiver 206. This is done by providing not only an asymmetric shape to perimeter 241, but also an interior shape to receiver 206 that only accepts guide 241 in a single relative rotational orientation. To accommodate this, for the example shown, receiver 206 is provided with an interior also having a cross-section of D-shape. Referring to FIG. 14, receiver 206, FIG. 14 can be seen as having an inner D-shape cross-sectional definition to inner wall 207 with a straight side 207s and an opposite curved side 207c.

It can be seen, then, that receiver space 205 can receive guide 240 only when the filter cartridge 130 is in a single, selected, operable, rotational orientation relative to the guide 240.

A variety of alternate, matching, or mating shapes for the guide 240 and the receiver 206 can be selected. In general, what is desired is a rotational orientation arrangement ensuring that the filter cartridge 130 must be in a single, selected, operable orientation for insertion of the guide 240. In general, together, the guide 240 and receiver 206 comprise a filter cartridge-to-guide (or guide-to-filter cartridge) rotational indexing arrangement. The filter cartridge-to-guide rotational indexing arrangement helps ensure that as the cartridge 130 is inserted toward the bottom cover 103 (or when the bottom cover 103 is inserted toward the cartridge 130), the two are oriented or in a selected rotational arrangement relative to one another, to facilitate engagement of the filter cartridge-to-bottom cover (or bottom cover-to-filter cartridge) rotational indexing arrangement.

Referring now to the filter cartridge-to-housing bottom (or housing bottom-to-filter cartridge) rotational indexing arrangement, attention is directed first to FIG. 11. As characterized previously, member 196, FIG. 11, is a first member of the filter cartridge-to-housing bottom (cover) rotational indexing arrangement. Referring to FIG. 14 a bottom plan view of support 136, member 196 is viewable. Member 196 generally comprises a projection 196a defining a perimeter 196p which is non-circular. For the particular example depicted, projection 196, FIG. 14, is generally D-shaped, with a straight side 196s and an opposite, curved side 196c. For the example depicted, projection 196 is continuous around its perimeter; i.e. it has no gap therethrough.

Attention is now directed to FIG. 18, a cross-sectional view of bottom cover 103 as discussed previously. Bottom cover 103 includes lower central recess 250 therein. Recess 250 is sized and configured, as discussed further below, to receive projecting therein projection member 196, FIG. 11.

Referring to FIG. 19, a top plan view of bottom cover 103, receiver 250 is seen as defined by inner surface 250w. The perimeter wall 250 is generally non-circular and asymmetric (rotationally). For the example shown, the perimeter wall 250w has a D-shape, with a straight side 250s and an opposite, curved side 250c. The wall 250w, in particular the straight side 250s, includes a drain gap 250g therein. The drain gap 250g allows for drainage of liquid on surface 103s, into region 250r, and thus through gap 241g and into drain 128.

Together, projection 196 and receiver 250 are sized and shaped to only be able to fully engage one another, when the cartridge 130 is at a single, selected, operable rotation relative to the cover 103. Thus, together, the projection 196 and receiver 250 define a filter cartridge-to-housing housing bottom (cover) (or bottom (cover)-to-filter cartridge) rotational indexing arrangement. It is noted that projection 196 will only extend into receiver 250 an amount that still allows gap 250g to be open, below projection 196, to allow drainage.

It is noted that engagement between the projection 196 and the receiver 250, is facilitated by the filter cartridge-to-guide rotational indexing arrangement, previously referenced. That is, as the filter cartridge 130 is lowered toward the bottom cover 103, (or the bottom cover 103 is installed toward the filter cartridge 130,) the guide 240 entering the receiver 206 helps to generate the initial selected rotational orientation of the cartridge 130 relative to the cover 103, to facilitate final engagement of the filter cartridge-to-bottom rotational indexing arrangement.

Figure 20:
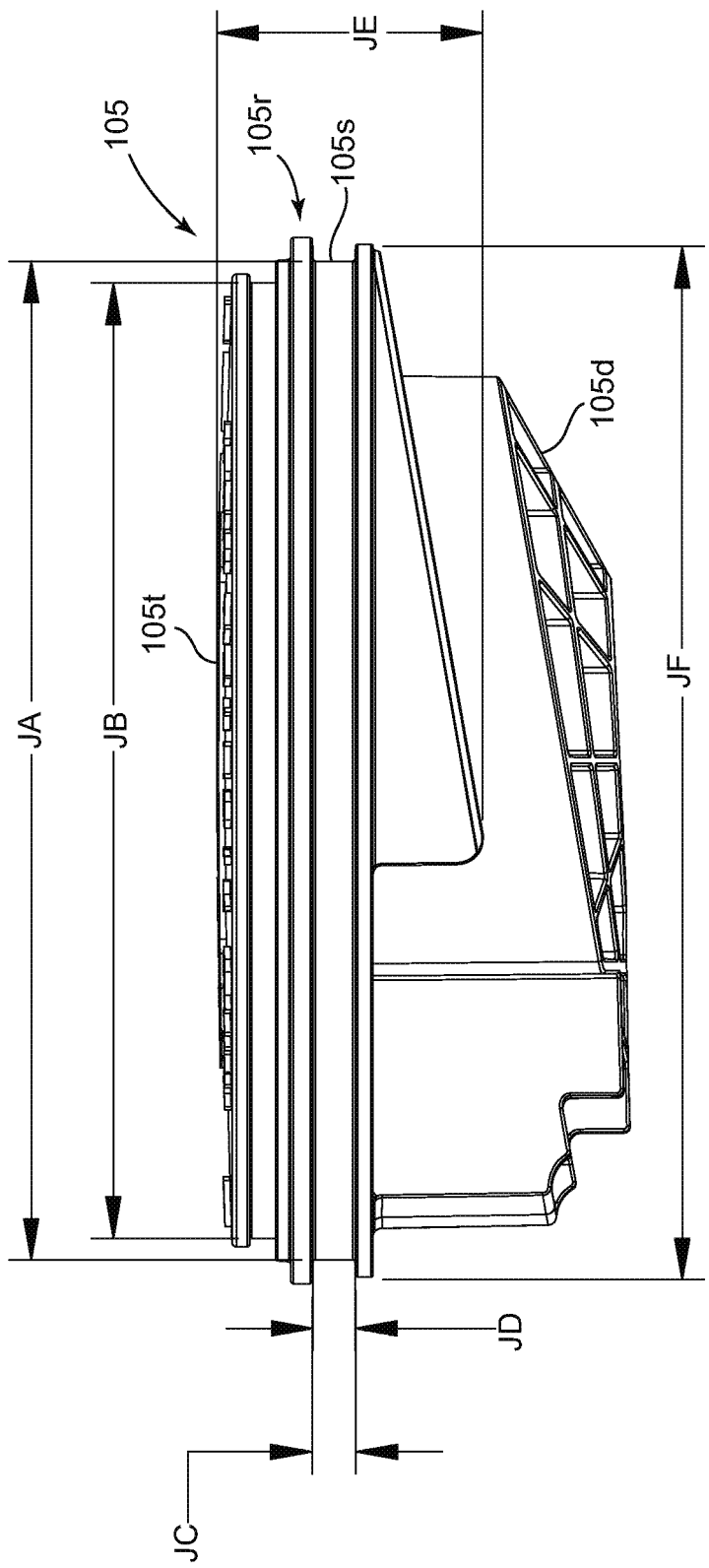
FIG. 20 is a schematic side elevational view of a top or cap member of the assembly of FIGS. 6-9.

Attention is now directed to cap or top 105, FIGS. 20-23. FIG. 20 is a side elevational view of cap 105. Top 105 includes cover or top end 105t; and, rim 105r with recess 105s therein, for receipt of seal member 170, FIG. 6. Further, cap or top 105 includes lower or depending section 105d.

Figure 21:
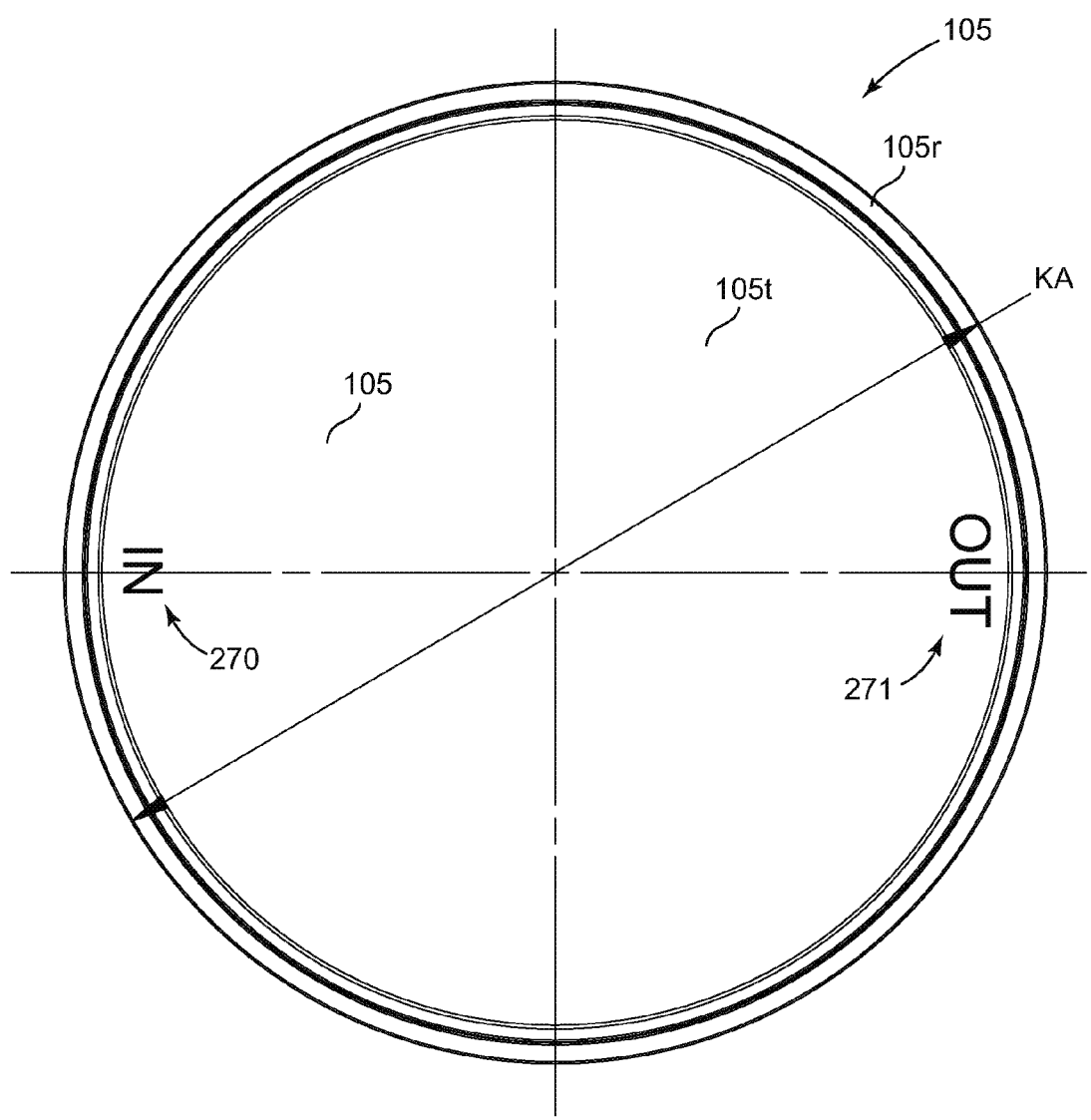
FIG. 21 is a schematic top plan view of the top cap member of FIG. 20.

Referring to FIG. 21, a top plan view of cap or top 105 is provided. The cap or top 105 should be such as to be oriented on the housing body 101 in a single, operable, orientation, indicated in FIG. 21 by the indicia "IN" at 270, which should be oriented over inlet arrangement 115, and in indicia "OUT" at 271, which should be oriented over outlet arrangement 116, when cap 105 is properly installed.

Figure 23:
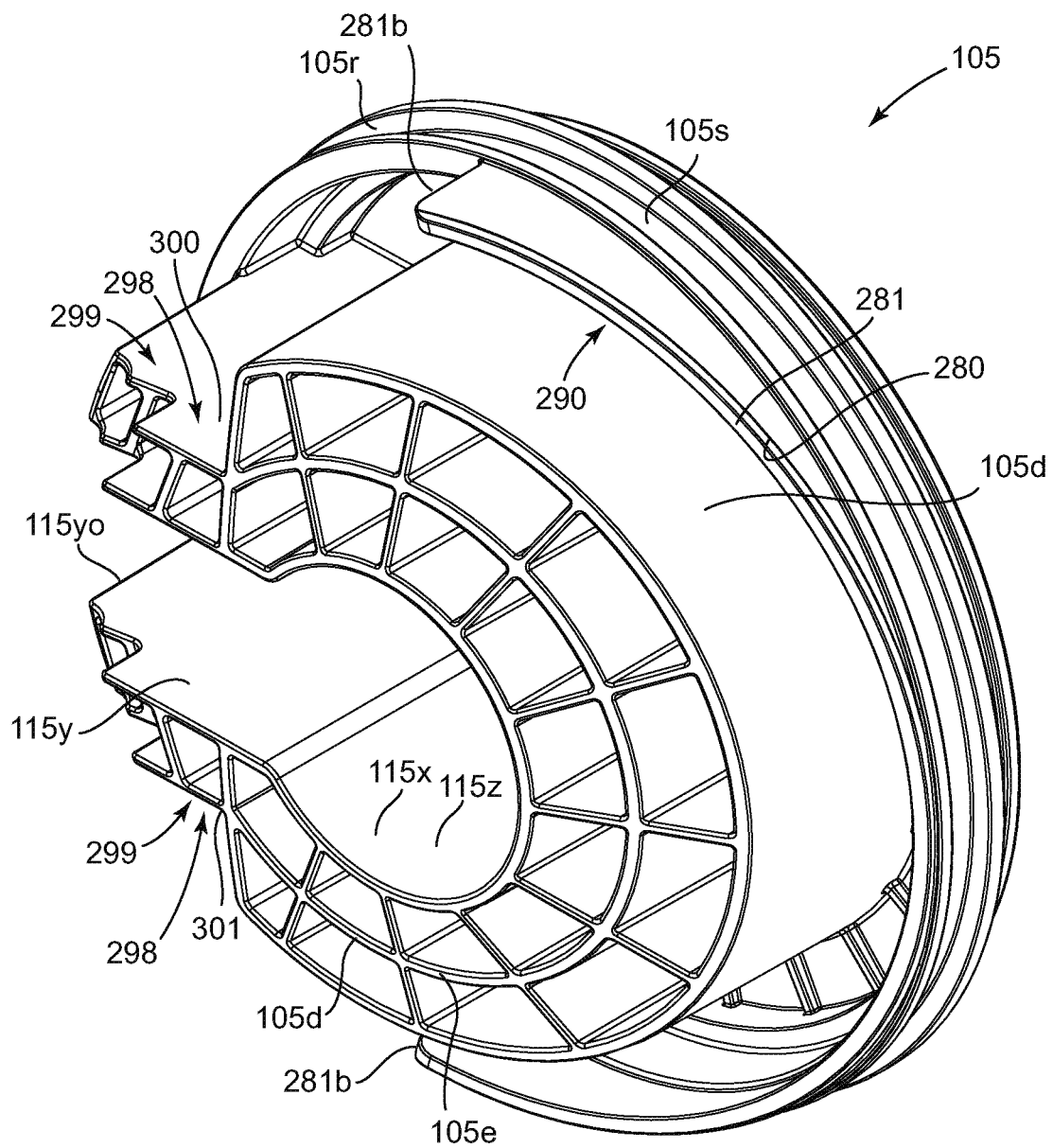
FIG. 23 is schematic bottom perspective view of the top or cap member of FIG. 20.

Attention is directed to FIG. 23, a bottom perspective view of top 105. Depending portion 105d defines interior 115x having gas flow channel 115y and central gas-receiving space 115z. Channel 115y is sized and oriented to align with inlet arrangement 115, when cap 105 is properly installed. Thus, channel 115y includes end 155yo which will be directed toward, and in gas flow receiving alignment with, inlet 115 in use. Region 115z is sized and oriented above aperture 145a in cartridge 130, to direct gasses into interior 145 of cartridge 130, when the cap 105 is properly installed. Projection arrangement 105d is sized and organized to ensure that an overall cross-sectional size of channel 115y and region 115z are such that air entering housing 101 through inlet arrangement 115 does not expand to an undesirable extent, before it is directed through aperture 145a into filter cartridge interior 145. This facilitates gas flow. Rib arrangement 105e facilitates taking up volume and avoiding inlet gas expansion, without adding a substantial amount of weight, to end piece 105.

Figure 22:
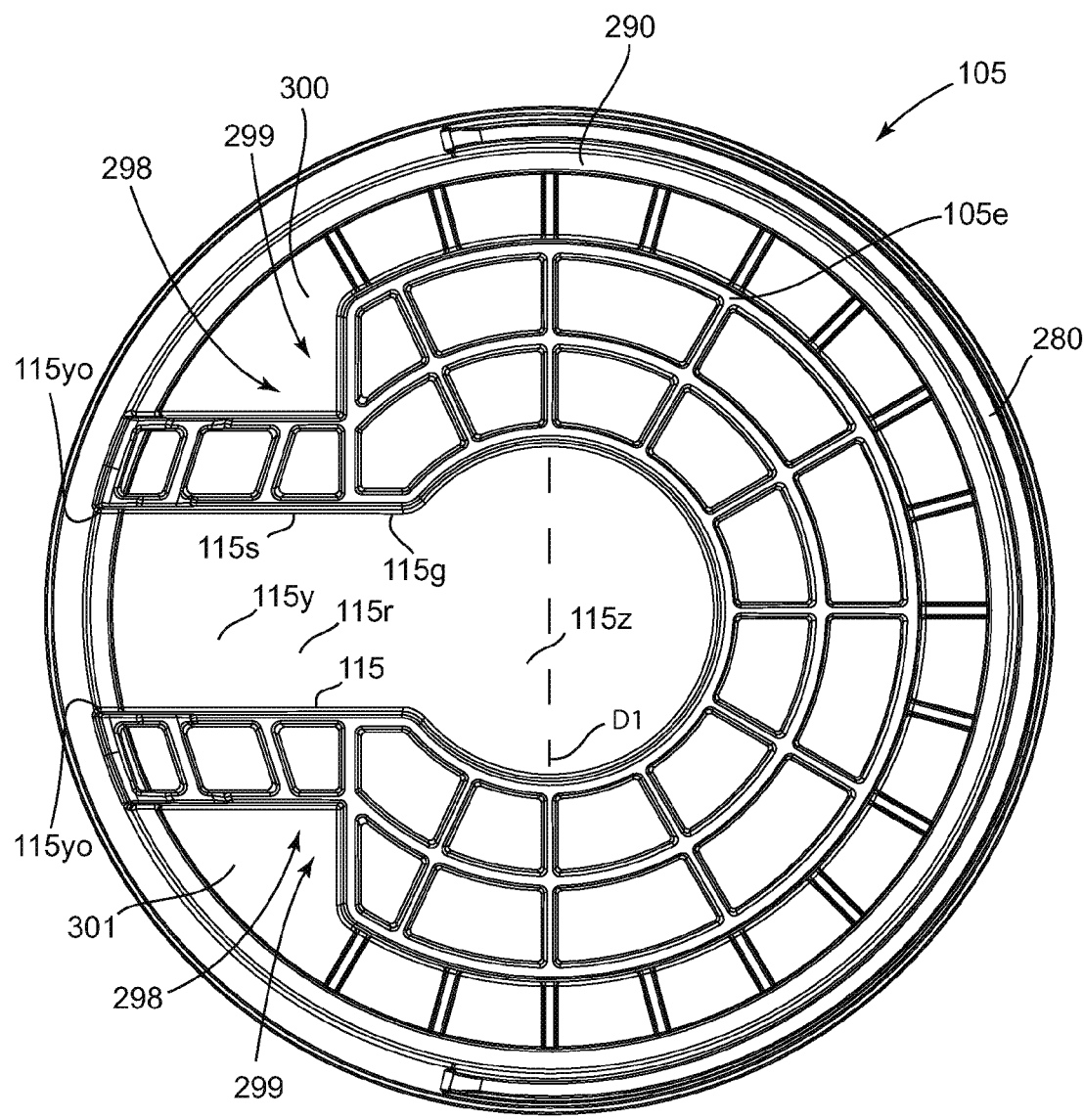
FIG. 22 is a schematic bottom plan view of the top or cap member of FIG. 20.

In general terms, interior 115x is defined by depending portion 105d as follows. Referring to FIG. 22, a bottom plan view of cover 105, channel 115y, extending from outer end 115yo to inner central region 115z, generally has a first cross-sectional shape. For the example shown, the first cross-sectional shape, FIG. 22, is generally a "boxed u," comprising three sides of a rectangle or square, indicated at 115q, 115r, 115s respectively. A perimeter definition defined by three-sides 115q, 115r, 115s together, will be characterize herein as a channel cross-sectional area $X_c$. A cross-sectional area of the inlet arrangement 115, FIG. 8 at interior edge surface 102i of the housing body 102, will generally be characterized as having an inlet cross-sectional area Xi. Typically, channel 115y and inlet 115 are chosen such that a ratio of Xc/Xi is at least 1, typically with in the range of 1-1.5 and usually within the range of 1.1-1.4, inclusive. Alternately stated, typically the cross-sectional area of channel 115y is at least 100%, typically a 110% and usually 110-140%, preferably no more than 150%, of a cross-sectional area of channel 115. This ensures good gas flow transfer from inlet 115 to region 115z.

Attention is now directed to region 115z, FIG. 22. Region 115z, but for gap 115g, generally defines a circular region. Preferably the circular region 115z has a dimension ($D_1$) thereacross, which is about the same size as a dimension ($D_2$) of aperture 145a, FIG. 13. Preferably $D_1$ is no smaller than the diameter $D_2$ of aperture 145a and typically, a ratio of $D_1/D_2$ is within the range of 1-1.4, inclusive.

A housing top (cover)-to-housing body (or housing body-to-housing top (cover)) rotational indexing arrangement, is needed to ensure that channel 115y is appropriately oriented relative to inlet arrangement 115. A first member of this rotational indexing arrangement is indicated in FIG. 23, at 280. The first member 280 comprises flange 281 on cover 105, spaced radially outwardly from projection 105d. For the particular example, the projection 281 is arcuate, extending between opposite ends 281a, 281b. The example arcuate flange 281 generally extends over an arc of at least 180°, usually not more than 250° and typically an amount within the range of 180-240°, inclusive. The example flange 281 depicted, extends over an arc of approximately 205°.

Referring now to FIG. 16, a top plan view of body 102, a second member of the top (cover)-to-housing body rotational indexing arrangement is depicted at 285. Member 285 generally comprises an arcuate projection 286 extending between ends 286a, 286b. The particular arcuate extension 286 depicted extends over an arc of at least 120°, typically at least 130°, and usually within the range of 130-180°. The example arcuate projection 286 depicted, extends over an arc of approximately 155°. The projection 286 leaves receiver region or space 287, in body 102.

Flange 281 can only be inserted within housing body 102, if top 105 is operably oriented so that flange 281 will not engage flange 286 as the top 105 is lowered. Alternately stated, the top-to-housing body rotational indexing arrangement is such that projection 280 on top 105 can only be received within housing body 102, if the top 105 is appropriately, operably, rotationally, indexed; and, only one rotational orientation is possible.

Referring to FIG. 23, receiver space 290 is provided between flange 281 and projection 105d. This receiver space 290 is appropriate to receive a portion of upper flange 140, on cartridge 130, FIG. 10, projecting therein during installation.

As previously indicated, rotational indexing between the cartridge 130 and top 105 is preferred and is provided by a filter cartridge-to-housing top (or housing top-to-filter cartridge) rotational indexing arrangement. Referring to FIG. 10, the first member of the filter cartridge-to-housing top rotational indexing arrangement is indicated at 190. First member 190 is a form of a projection arrangement 190p. Referring to FIG. 13, the example projection arrangement 190p generally includes first and second spaced projections 295, 296. For the example shown, each projection 295, 296 is generally defined by an angular perimeter projection toward a central portion of end member 140, in the instance shown a right angle perimeter 295p, 296p, each having a gap 295g, 296g respectively therein.

Referring to FIG. 23, a second member of the cartridge-to-cap rotational indexing arrangement is indicated at 298. Member 298 comprises receiver arrangement 299. For the example shown, the receiver arrangement 299 comprises two, spaced, receivers 300, 301. The receivers 300, 301 are biased to receive projecting therein, projections 295, 296 respectively. The receivers 300, 301 are on opposite sides of, and are spaced from, channel 115y.

In general terms, the cover 105 can only operably engage the cartridge 130 in a single, rotational orientation; i.e. that in which cartridge 130 is oriented with projection arrangement 190 received within receiver arrangement 298. This will help ensure that the gap 183 of the cartridge 130 is aligned with inlet arrangement 115, to allow gas flow therethrough. It will also ensure that the seal member 155 is appropriately oriented to the seal surface 151, since cover 105 is also rotationally indexed to the housing body 102.

The assembly 100 also includes a housing bottom (cover)-to-housing body rotational indexing arrangement. Referring to FIG. 18, first member of that arrangement is indicated generally at 230. Referring to FIG. 17a, a bottom plan view of housing body 102, a second member is indicated generally at 307. In particular, end 112 of housing body 102 is defined with an interior portion having appropriate projections and spaces, to only allow projection arrangement 230 to extend therein, in a single, selected, operable, rotational orientation between bottom cup 103c (or cover 103) and housing body 102.

In general terms, then, the crankcase ventilation filter assembly 100 includes the following rotational indexing arrangements: a housing bottom-to-housing body rotational indexing arrangement; the example shown involving projection arrangement 230 on housing bottom 103 and a receiver area with an end 112 housing body 102; a housing top-to-housing body rotational indexing arrangement, for the example shown comprising flange 280 on housing top 105 and an appropriate receiver arrangement defined in top end 111 of housing body 102, for only receiving the top 105 in a single, selected, operable, rotational orientation relative to the body 102; a filter cartridge-to-housing top rotational indexing arrangement, in the example shown comprising projection arrangement 190p on the cartridge 130 oriented to only be engaged with the top 102, when a single, selected, operable rotational orientation between the two is obtained with projection arrangement 190p received in receiver arrangement 299; a filter cartridge-to-housing bottom rotational indexing arrangement, for the example shown comprising projection 196 on a lower end of cartridge 130, projecting away from the media 135, engagable with receiver 250, in the housing bottom 103, only in a single, selected, operable rotational orientation, and such that liquid drainage through gap 250g can still occur. Further, a filter cartridge-to-guide rotational indexing arrangement involving receiver 206 and guide 240, allowing for only a single rotational orientation between the two, facilitates relative movement between the cartridge 130 and the housing bottom 103, during servicing and installation.

In general, the various rotational indexing arrangements ensure: that the cartridge 130 is rotated to a proper sealing orientation to receive gas flow from inlet 115 through gap 183; that housing cover 105 is appropriately oriented relative to the housing body 102 and cartridge 130 to ensure gas flow through channel 115y into recess 115z; and, that the cartridge 130 is in an appropriate orientation whether the servicing is from the top or bottom.

Consider for example a top servicing. The top 105 would be removed from the remainder of the assembly 100, allowing access to the cartridge 130. The cartridge 130 would be removed. When the new cartridge 130 (or a refurbished cartridge 130) is installed, the cartridge 130 is lowered into housing body 102, with bottom end piece 141 directed downwardly. Eventually, the cartridge 130 will slide over guide 240, FIG. 18, with the guide 240 received within receiver 206. The cartridge 130 would need to be rotated to a selected rotation orientation, for this engagement to readily occur. As the cartridge 130 is furthered lowered, eventually projection 196 engages receiver 250 ensuring a single, operable, rotational orientation of the cartridge 130. This means the cartridge 130 is now appropriately sealed at the location between the cartridge seal member 155 and the seal surface 151; and, that gap 183 is appropriately positioned.

The cap 105 is now installed. The housing cover-to-housing rotational indexing arrangement (and also the filter cartridge-to-cap rotational indexing arrangement) ensure that the cap 105 is installed such that channel 115$y$ is aligned with inlet 115.

Now consider servicing from the bottom. Here, cup 103 is separated from the housing body 101. Cartridge 130 is removed. A new or refurbished cartridge 130 is installed. The cartridge 130 is either: pushed up into interior of housing body 102; or, cartridge 130 is engaged with a cup 103 and then the combination of the cartridge 130 and cup 103 is installed on the housing body 102.

Consider first the process in which the cartridge 130 is pushed up into the housing body 102, before the cup 103 is reinstalled. The cartridge 130 would be installed with a first end piece 140 first inserted into the housing body 102. As the cartridge 130 is pushed upwardly, the cartridge 130 would be rotated to allow the projection arrangement 190$p$ to be received within the receiver arrangement 299. This would again ensure that the cartridge 130 is in the single, appropriate, operable rotation for engagement of the seal arrangement 155 on the cartridge 130, and the seal surface 151 on the housing body 102; and with gap 183 appropriately positioned. The cup 103 would then be installed, with the cartridge-to-guide rotational indexing arrangement facilitating proper orientation of the cup, to eventually position the cartridge-to-bottom cover rotational indexing arrangement as appropriate.

The housing bottom-to-housing body rotational indexing arrangement also ensures appropriate rotational orientation, and further ensures that the cup 103 is in appropriate position for insertion of the cartridge 130, from the top.

In general terms, then, the housing cover-to-housing body and housing bottom-to-housing body rotational indexing arrangements ensure that each of the cup (or bottom) and top are appropriately oriented when installed, so that servicing from an opposite end is possible. Also, each ensures that when the filter cartridge is indexed thereto, it is appropriately oriented for closure of the housing, by the top or bottom. The rotational indexing arrangements further ensure that gas flow channels are appropriately oriented relative to one another.

In the alternative servicing approach from the bottom, in which the cartridge 130 is first attached to the cup 103, the rotational indexing arrangement involving the projection 196 on the cartridge 130 the receiver 250 on the cup 103, will ensure that the cartridge 130 and cup 102, an in appropriate rotational orientation.

Ring 350; discussed below, being configured to be used as locking ring 104 or 106, can rotate independently of the housing member (top 105 or bottom 103) around which is positioned. This allows for a secure closure, through threaded engagement, without requiring the top 105 or bottom 103 to be rotated out of its single, selected, operable rotational orientation.

Figure 24:
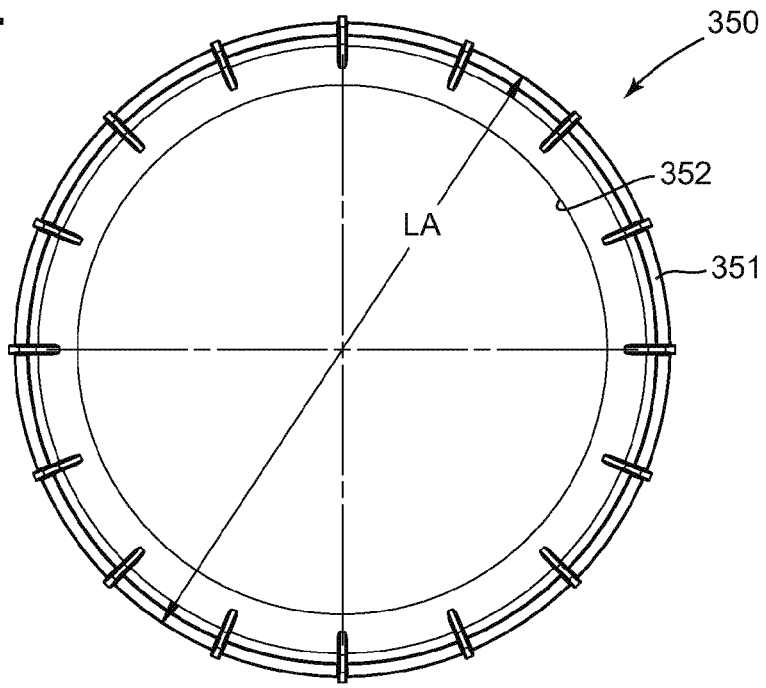
FIG. 24 is a schematic top perspective view of a locking ring component of the assembly of FIGS. 6-9.
Figure 25:
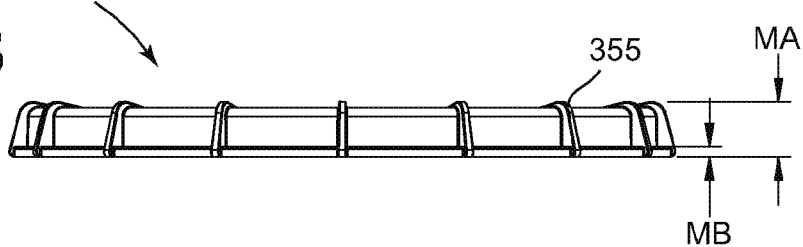
FIG. 25 is a schematic side elevational view of the locking ring component of FIG. 24.
Figure 26:
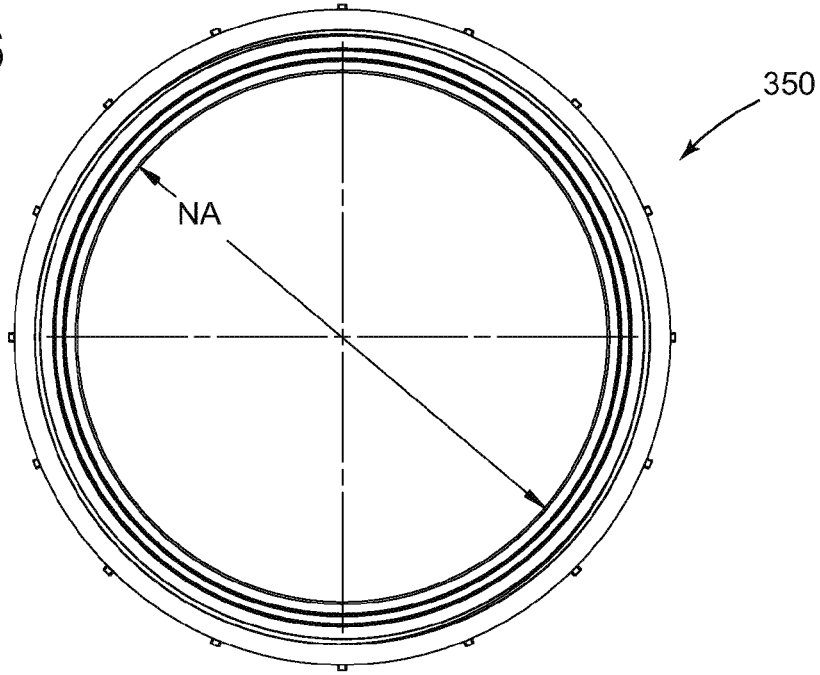
FIG. 26 is a schematic bottom plan view of the locking ring component of FIG. 24.

Attention is now directed to FIGS. 24-26. In FIGS. 24-26, locking ring 350 is depicted, usable as either or both of rings 104, 106. Referring to FIG. 24, a top plan view is provided. The ring 350 has a outer perimeter 351 and an inner aperture 352. The aperture 352 is sized to fit over, i.e. around, either an outer perimeter of a part of top 105, or an outer perimeter of part of bottom 103. This allows the ring 350 to rotate, with the top 105 (or bottom 103), remaining in its indexed orientation.

Referring to FIG. 25, a side elevational view is provided. Spaced ribs 355 provide strength, and also facilitate for gripping.

Referring to FIG. 26, a bottom plan view is depicted.

It is noted that a variety of specific features and combinations of features have been described and depicted. There is no specific requirement that an arrangement include all of the features characterized herein, in order to obtain some benefit according to the present disclosure.

III. Example Dimensions; Usable Materials

A. Example Dimensions

In FIGS. 6-26, some example dimensions, for an example system, are indicated. Of course, variations from the example dimensions are possible, with development of alternate applications of the arrangements described herein. The example arrangement 100 depicted, the dimensions are as follows: In FIG. 6, AA=25.4 mm; AB=185 mm; AC=276.3 mm; AD=228.5 mm; and, AE=13.3 mm; in FIG. 12, BA=241 mm; BD=183.7 mm; and, BC=184 mm; in FIG. 13, CA=101.5 mm; in FIG. 14, DB=47.9 mm; and, DA=1.9 mm diameter; in FIG. 15, EA=119.1 mm; EB=25.4 mm; EC=159.2 mm; and, ED=140.9 mm; in FIG. 16, FA=101.6 mm; in FIG. 17, GA=124.1 mm; GB=44 mm; GC=182 mm; and, GD=53.5 mm; in FIG. 18, HA=111.7 mm; HB=91.8 mm; and, HC=13.3 mm; in FIG. 19, IA=118.4 mm; in FIG. 20, JA=115 mm; JB=110 mm; JC=5 mm; JD=4.8 mm; JE=30.6 mm; and, JF=119 mm; in FIG. 21, KA=120.4 mm; in FIG. 24, LA=136.8 mm; in FIG. 25, MA=11.6 mm and MB=2.3 mm; and, in FIG. 26, NA=110.5 mm.

In a typical arrangement, projection 180, FIG. 10, will extend upwardly to rail 180$r$ a distance above upper end 135$u$ of media 135 of at least 30 mm, typically at least 35 mm, and usually not more than 70 mm.

B. Example Materials for the Media 135

The media 135 can generally be in accord with the descriptions in WO 2007/053411, published May 10, 2007; WO 2006/084282, published Aug. 10, 2006; or, WO 2005/083240, published Sep. 9, 2005; each of which is incorporated herein by reference in its entirety; although variations are possible. Such media is fibrous, and has good coalescing and drainage properties, as well as good gas flow and filtering properties. Spiracle XP media, previously identified, can be used.

IV. Further Example Embodiments, FIGS. 27-74

Figure 27:
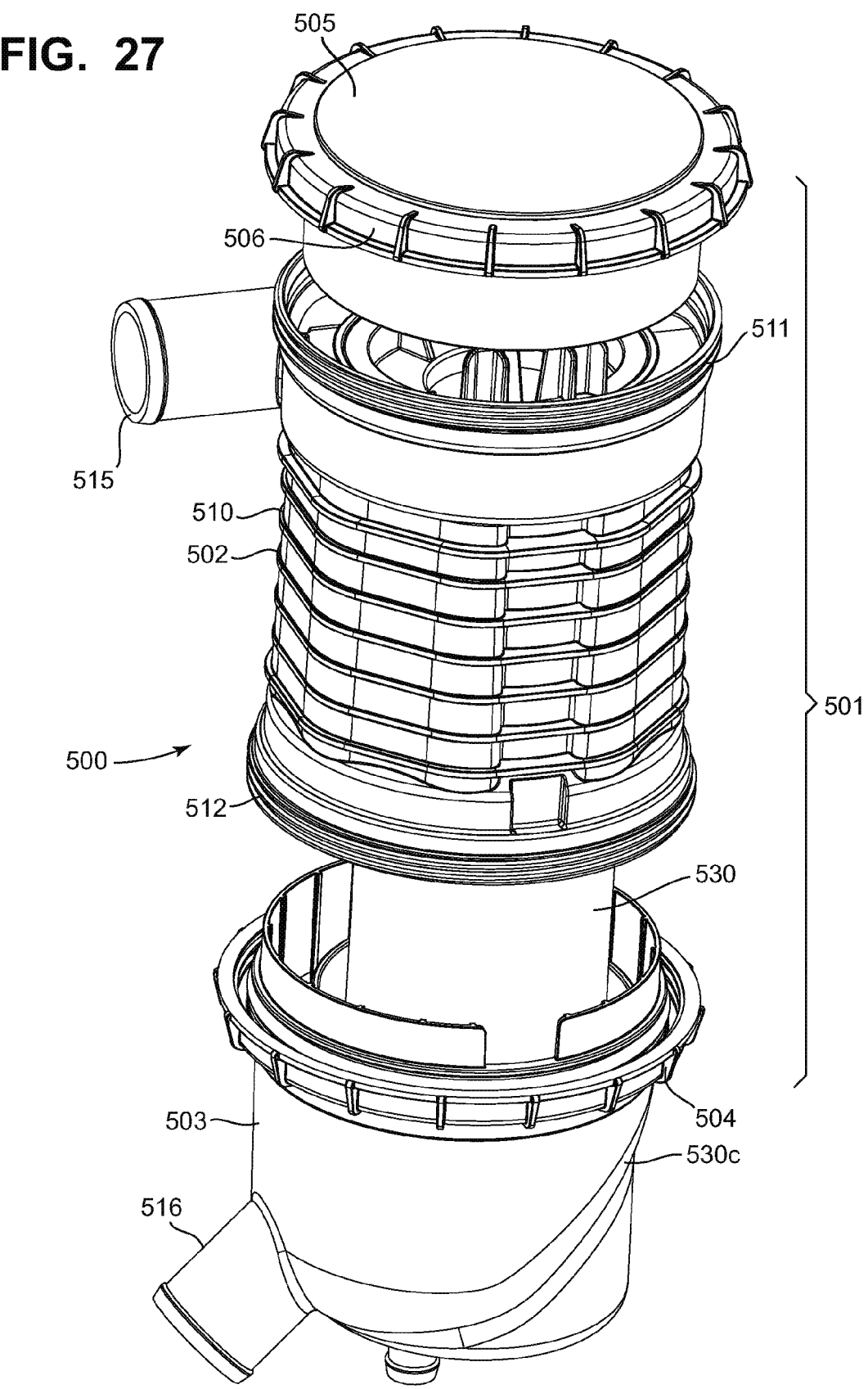
FIG. 27 is a schematic exploded, top perspective view of a second alternate embodiment of a crankcase ventilation filter assembly according to the present disclosure.

Reference numeral 500, FIG. 27 generally indicates another example crankcase ventilation filter assembly in schematic exploded, perspective, view. Referring to FIG. 27, assembly 500 comprises a housing 501. The housing 501 comprises: a housing body or central body section 502; a bottom cover 503, in this example comprising a cup 503c secured in place by locking ring 504; and, a housing top or cap 505, in this example secured in place by a second locking ring 506. The locking rings 504, 506 can be identical to one another.

Still referring to FIG. 27, housing central body section 502 includes a sidewall 510 having an upper region 511 and lower region 512. In general, the housing 501 includes: a gas flow inlet arrangement 515 and gas flow outlet arrangement 516. For the specific example assembly 500 depicted, the gas flow inlet arrangement 515 is positioned on the housing central body section 502; and, the gas flow outlet arrangement 516 is positioned on the bottom cover 503.

In FIG. 27, the assembly 500 is depicted oriented (except exploded) as it would typically be for use, with cap 505 oriented above bottom cover 503. Herein, "top", "bottom", "above", "below", "upper", "lower", and similar terms of orientation are meant to refer to the assembly 500 characterized, and components thereof, in a normal orientation of use; i.e. the general orientation of FIG. 27 (but not exploded as shown in FIG. 29).

Figure 28:
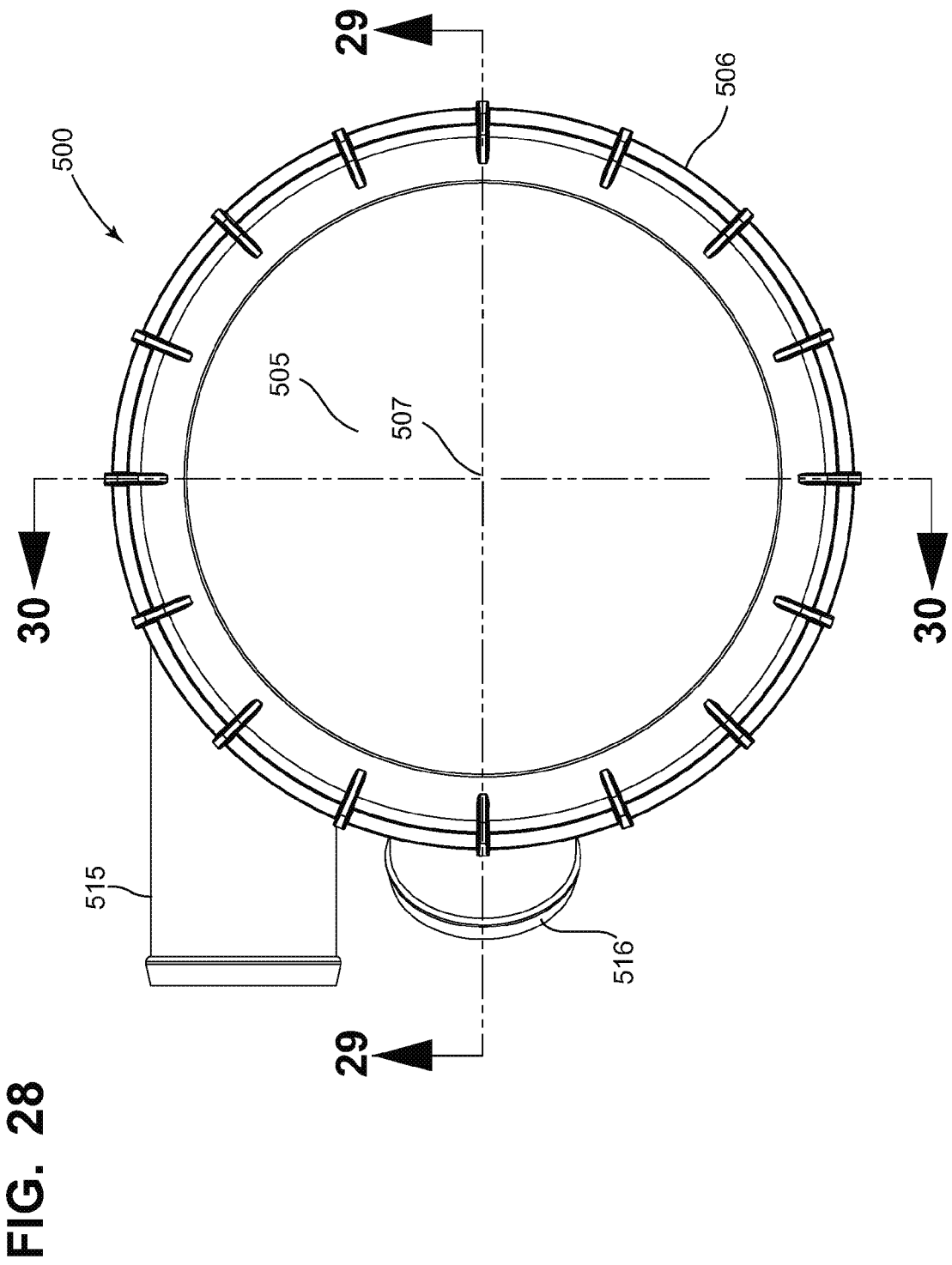
FIG. 28 is a schematic top plan view of the assembly of FIG. 27.

In FIG. 28, a top plan view of assembly 500 is depicted, not exploded. For the example assembly 500 depicted, it is noted that inlet arrangement 515 and outlet arrangement 516 are generally positioned directed outwardly away from center axis 507 in the same general direction, i.e. toward the left of FIG. 28. Alternate engagements are possible, as will be described below.

Further, in reference to FIG. 28, it can be seen that inlet arrangement 515 is generally a tangential inlet; i.e. it is not directed toward center axis 507, but rather is directed tangentially into an inside of housing central body section 502.

Figure 29:
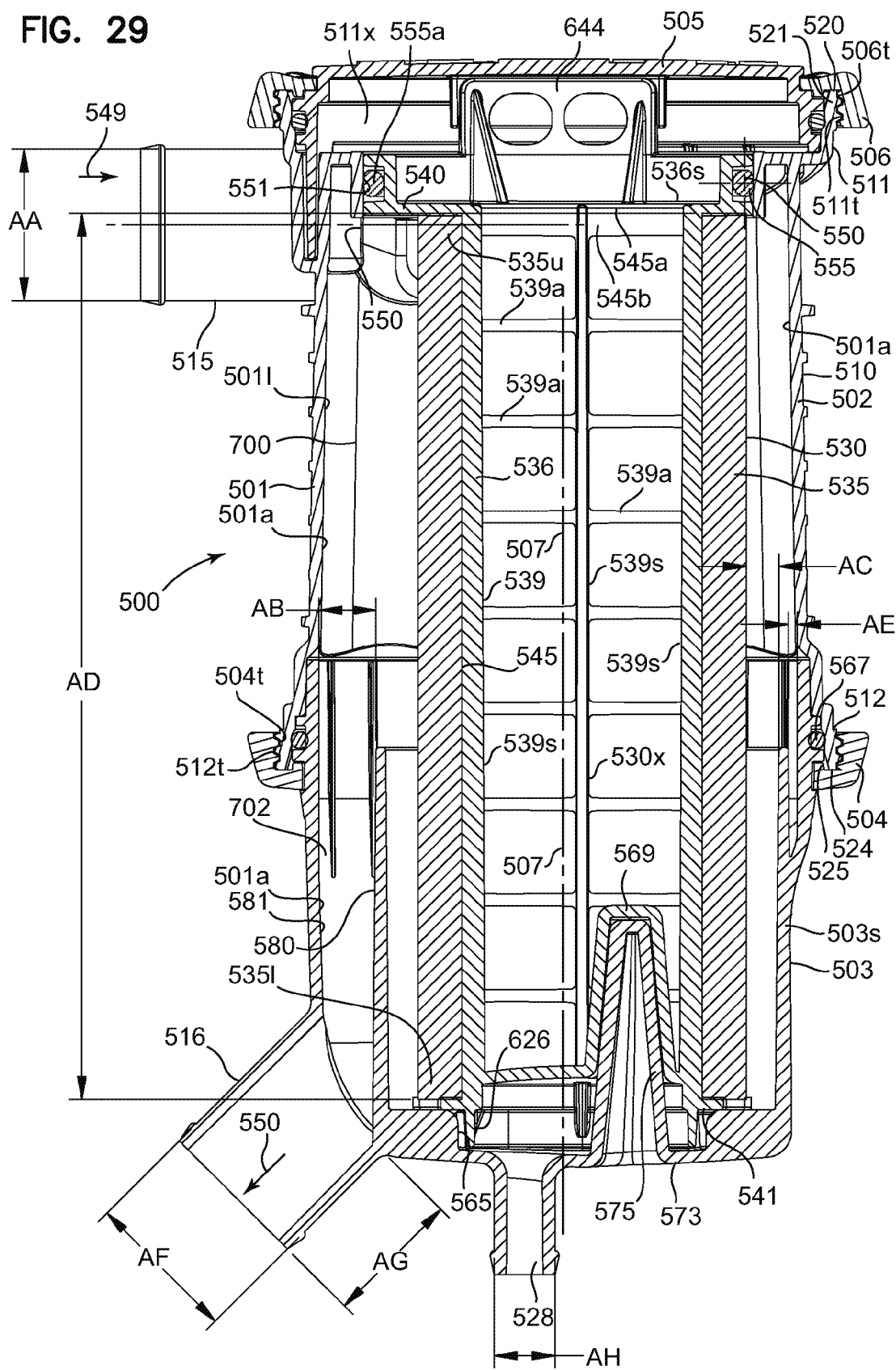
FIG. 29 is a schematic, cross-sectional view taken along line 29-29, FIG. 28.

Attention is now directed to FIG. 29, a schematic cross-sectional view taken generally along line 29-29, FIG. 28.

Referring to FIG. 29, in the cross-sectional view indicated, axis 507, extends through an approximate radial center of the housing central body section 502, cap 505 and bottom cover 503 as shown.

Referring again to FIG. 29, and in particular to housing central body section 502, (upper) end 511 includes upper rim or tip 520 defining an opening 521. The upper, open, end 520 (i.e. opening 521) is sufficiently large for service passage therethrough of an internally positioned crankcase ventilation filter cartridge 530, as described below.

Upper end 520 is closed by cap 505, which is secured in place by locking ring 506. A threaded engagement between locking ring 506 and end 511 can be used, as shown, comprising threads 511t, (on end 511) and threads 506t, (on ring 506).

Lower region 512 includes an end 524 defining an opening 525 sufficiently large to allow service passage therethrough of cartridge 530. Opening 525 is closed by bottom cover 505, which, in the example shown, is secured in place by ring 504. For the particular example depicted, a threaded engagement is provided including threads 504t (on ring 504) engaging threads 512t, (on end 512).

From the above description, and features viewable in the referenced FIG. 29, it can be seen that the housing central body section 502, as with previously described embodiments, is configured to allow for service access to an internally received filter cartridge 530 from either or both of top end 511 and bottom end 512.

Bottom cover 503 includes a lower liquid drain 528 therein, for draining of collected liquid (typically oil). This is analogous to previously described assemblies.

In general, housing 501 defines an interior 501i, in which is operably received removable and replaceable (serviceable) filter cartridge 530. (By "operably" received, it is meant that the cartridge 530 is properly positioned for use). The filter cartridge 530, then, as in previously described embodiments, is a service component. Filter cartridge 530 can be removed from interior 501 either: by removal of top 505 with passage filter cartridge 530 through opening 521; or, by removal of filter cartridge 530 through opening 525 after removal of bottom cover 503. (Installation can be a reverse process).

Referring still to FIG. 29, crankcase ventilation filter cartridge 530 generally comprises media 535 supported on a media support 536. The media support 536, for the example shown, includes a permeable tubular filter support or central core member 539 extending between (first), upper, end member 540 and (second) opposite, lower, end member 541. The media 535 is generally wrapped around central core member 539, at a location between end members 540, 541, to define an open filter interior 545. Core member 539 is typically permeable, allowing for gas flow therethrough, permeability being provided by apertures 539a. The media will typically define a generally circular outer perimeter, although alternatives are possible In general terms, media 535 can be characterized as having a first (upper) end 535u and a second, opposite, lower end 535l. The upper end 535u is adjacent, and overlapped by, end member 540; and the lower end 535l is adjacent to, and overlapped by, end member 541. Thus, the end members 540, 541 are first and second, opposite, end members.

Still referring to FIG. 29, it is noted that end member 540 is an open end member and includes a central aperture 545a therethrough, in gas flow communication with open filter interior filter 545. Depending downwardly from central aperture 545a is closed lip 545b. Further, open tubular section 539 includes spaced ribs 539r extending longitundally therealong, for strength.

On the other hand, as described in detail below, end member 541 is a closed end member; i.e. gas flow cannot extend therethrough in direct flow (not passing through media 535) to or from interior 545.

Referring to FIG. 29, operation is generally as follows: crankcase ventilation gases (or engine blowby gases) are directed into assembly 500 through air flow inlet arrangement 115, in the general direction of arrow 549. These gases are then directed into an upper inlet region 511x housing 501, above cartridge 530. The gases pass downwardly through aperture 545a into interior 545, surrounded by core or support members 539. The gases can then pass through the apertures 539a into the media 535. Within the media 535, liquid particles contained within the gases will begin to coalesce. Also, solid particulate will become entrapped within the media 535. Gases, once filtered by the media 535, are generally directed into air flow annulus 501a, surrounding media 535 and contained by side wall 510 of the body 502 and side wall 503s of housing bottom cover 503. The gas is then passed into outlet arrangement 516 and thus outwardly from assembly 500 in the general direction of arrow 550. (This is analogous to operation of the previously described assemblies, but for the specific location of the outlet arrangement 516.) In a "closed" crankcase ventilation system, the gases can then be directed, for example, into a combustion air inlet assembly for the engine involved. In an "open" system, the filter gases can be vented to the atmosphere.

Liquid that coalesces within the media 535 will generally drain downwardly, eventually to lower central volume 565 of bottom cover 503, and outwardly from assembly 500 through lower drain 528. (This too is analogous to the operation of previously described assemblies.)

Equipment in which assembly 500 is installed can be configured for servicing of assembly 500 from a top. Such servicing would generally be as follows. Ring 506 would be rotated, until disengagement from upper end 520 occurs. Ring 506 and cap 505 would then be removed exposing opening 521. The service provider could then access cartridge 530 for removal. A new cartridge could be installed in a reverse operation. It is noted that this top servicing does not require disattachment of lines secured to inlet arrangement 515, outlet arrangement 516, or bottom drain 528.

If the equipment in which crankcase ventilation filter assembly 500 is installed is configured for servicing the bottom, servicing would be as follows. Locking ring 504 would be rotated sufficiently for separation of bottom cover 503 and ring 504 from end 512. The filter cartridge 530 would then be removed through the bottom opening 525. Follow-up servicing would typically involve engaging a new cartridge 530 with the bottom cover 503, then assembling the housing 501 by attaching the bottom cover 503 with ring 504 to end 512. Alternatively, in some instances the cartridge 530 could be installed in central body section 502, and then bottom cover 503 could be attached.

Whether or not the bottom servicing operation described would require disattachment of lines from outlet arrangement 116 or drain 528, would be determined by line flexibility and the geometry of the system. It is anticipated that typically separation of the bottom cover 503 from the housing central body section 502 can be conducted without disattachment of such lines, if flexible.

It is noted that assembly 500 can be mounted on any equipment with which it is to be used, by a mounting band or bracket on central body section 502. A bracket analogous to the one described herein for a previous embodiment, for example, could be used, although alternatives are possible. Typically the mounting band or bracket would be configured and positioned so that it would not need to be loosened or disconnected, during a typical servicing operation from either the top or the bottom.

Still referring to FIG. 29, it is necessary and desirable to isolate inlet arrangement 515, and upper unfiltered gas region 511*x*, from clean gas annulus 501*a* and outlet arrangement 516, to inhibit unfiltered gases entering inlet 515 from exiting outlet arrangement 516. This is generally provided by a housing seal arrangement mounted on filter cartridge 530. In FIG. 29, the housing seal arrangement is indicated generally at 550. The housing seal arrangement 550 generally comprises a housing seal member 555, that seals to housing seal surface 551 in housing 501. The particular housing seal surface 551 depicted, comprises an inward, downwardly directed, flange in housing central body section 502.

For the particular example seal arrangement 550 depicted, the seal member 555 is configured to form an outwardly directed radial seal; i.e., a seal with seal force in a direction generally perpendicular to central axis 507. Alternatives are possible. The particular seal member 555 depicted, is shown as an o-ring 555*a*, although alternatives are possible. As will be seen from further descriptions below, the particular outer perimeter defined by the seal member 535 depicted, is non-circular, typically an ellipse. Alternatives are possible, including a circular definition. However an elliptical shape is advantageous, as it will only allow for two possible rotational orientations between the cartridge 530 and the housing central body section 502, and thus acts as a cartridge-to-housing body (or housing body-to-cartridge) rotational indexing arrangement. (It is noted that the perimeter of the cartridge portion on which the seal member is positioned is also typically non-circular, for example, elliptical).

It is noted that the particular example cartridge 530, FIG. 29, includes a seal member 555 positioned in a plane generally orthogonal central axis 507, as opposed to a plane slanted at an acute angle thereto, as with the arrangement of FIG. 6. Of course alternatives are possible, including a slant like FIG. 6. However, the orthogonal positioning is advantageous, with respect to certain additional features discussed below.

Some example dimensions are provided in FIG. 29 as follows: AA=31.8 mm; AB=11.9 mm; AC=6.7 mm; AD=185 mm; AE=1.9 mm; AF=31.8 mm; AG=28.4 mm; and, AH=12.7 mm.

Figure 30:
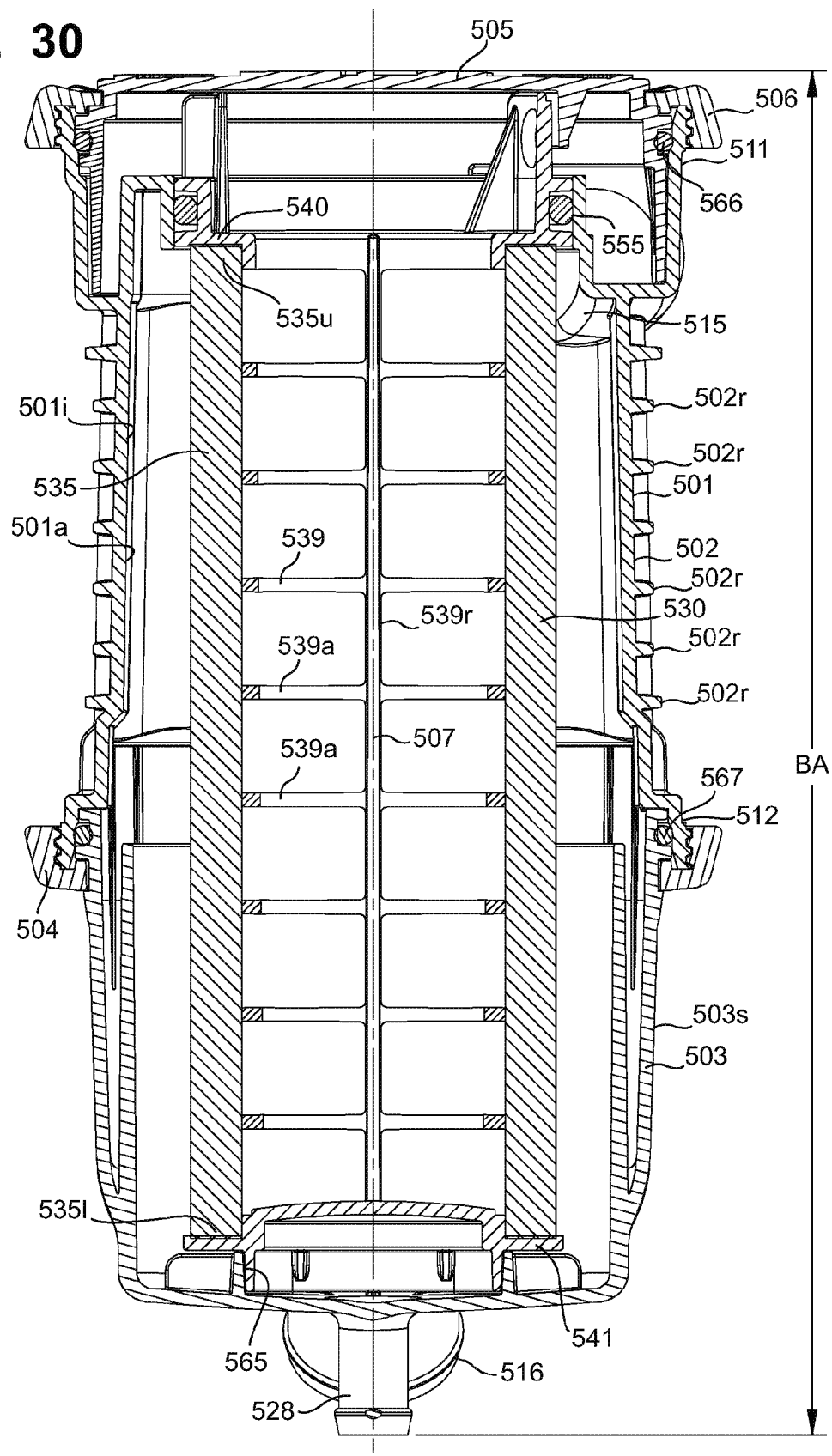
FIG. 30 is a schematic, cross-sectional view taken along line 30-30, FIG. 28.

Attention is now directed to FIG. 30, a cross-sectional view taken generally perpendicular to the cross-sectional view of FIG. 29; i.e., FIG. 30 is taken generally along line 30-30, of FIG. 28. Example features previously characterized, are identified with like numerals. It is noted that unlike the view of FIG. 29, housing center line axis 507 in the view of FIG. 30, is generally positioned centrally with respect to both the cartridge 530 and the housing 501. For the view of FIG. 29, central axis 507 of the housing is generally offset from a center line of the media 535 of the cartridge 530. This is due to a generally circular cross-sectional shape for the media 530, along with the elliptical shape of seal member 555, and an offset positioning of the media 530 for the cartridge 530 relative to a center of the elliptical seal 550.

Still referring to FIG. 30, o-ring 566, positioned to provide a seal between a portion cover 505 and end 511 is viewable. Also o-ring 567 is positioned to provide a seal between bottom cover 503 and a portion of end 512 is viewable.

Outer ribs 502*r* in central housing body section 502, provide for strength.

In FIG. 30, an example dimension is provided as follows: BA=253.8 mm.

Figure 39:
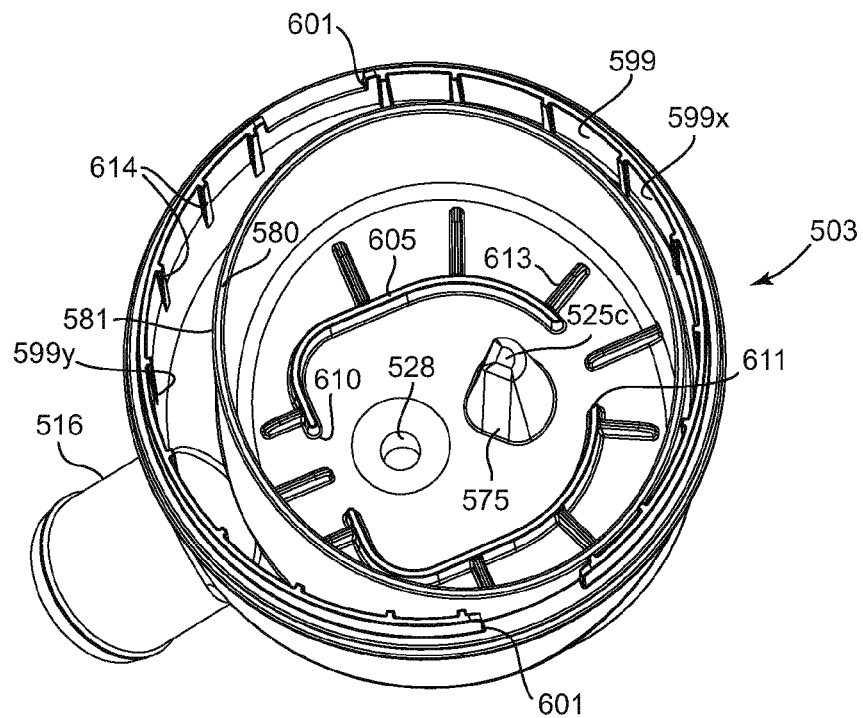
FIG. 39 is schematic top perspective view the housing body component of FIG. 37.

Attention is now directed to FIG. 39. FIG. 39 is an exploded perspective view of assembly 500. Attention is particularly directed to bottom end piece, member or closure 541 of cartridge 530. Bottom end piece or member 541 includes a central closure member 568 closing open interior 545 at lower end 535*l* of media 535. Closure member 568 includes, therein, receiver member 569. Receiver member 569 projects interiorly of region 545, and defines a receiver volume 570, on an opposite side of member 568 from open interior 545. Receiver member 569 generally projects interiorly of media 535 at least 5% and typically at least 10% (often an amount within the range of 10-30%, inclusive) of a distance from end 535*l* of the media 535, toward end 535*u* of the media 535.

In general, receiver member 569 defines a receiver volume 570, for projection therein a guide member of housing bottom cover 503.

Figure 31:
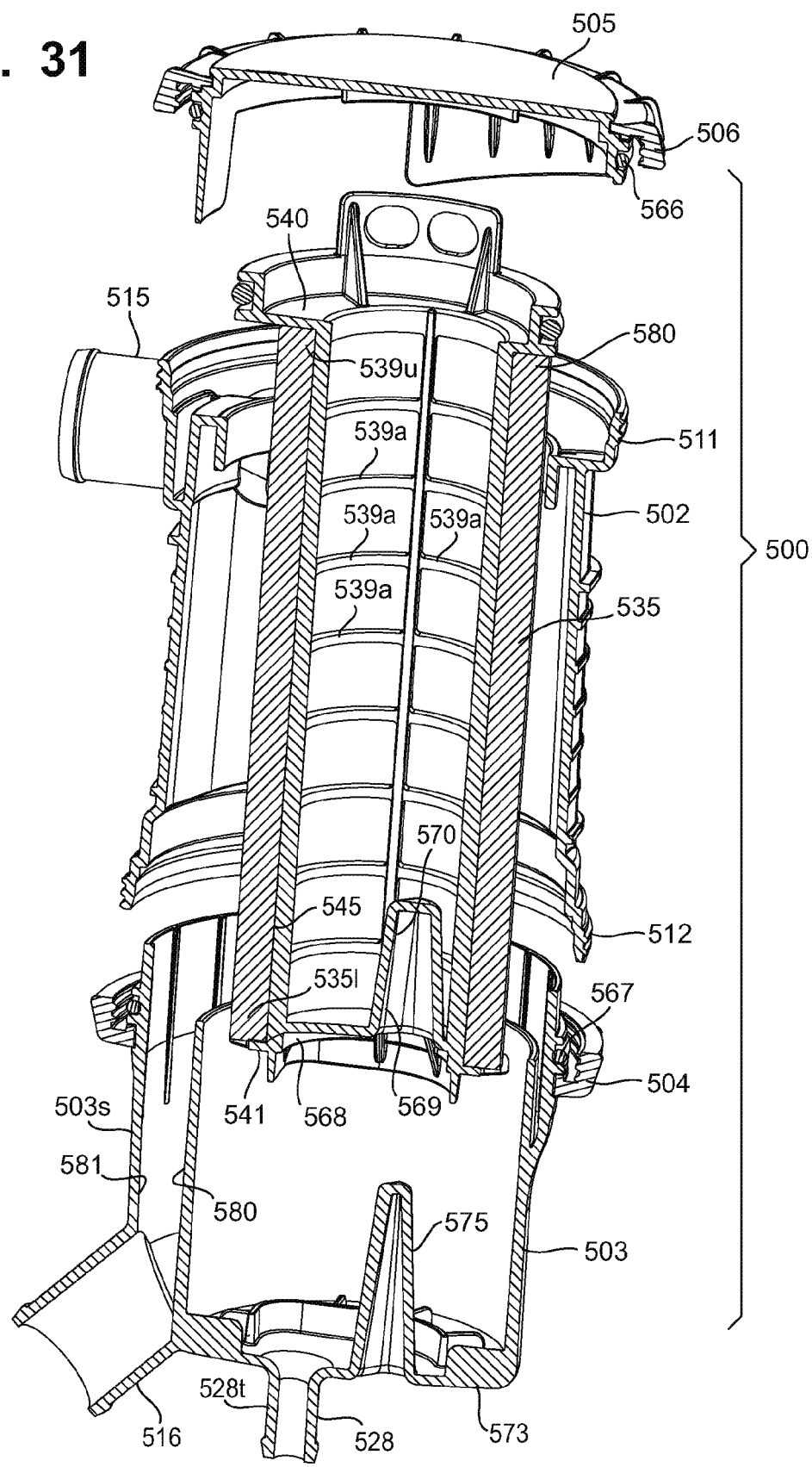
FIG. 31 is schematic, exploded cross-sectional view of the assembly of FIG. 27.

Still referring to FIG. 31, housing body cover 503 includes a sidewall 503*s* and bottom 573. Bottom drain 528 extends through bottom 573, and includes drain tube 528*t*.

Bottom 573 includes, projecting upwardly therefrom, guide member 575. Guide member 575 is sized and shaped to receive receiver volume 570 positioned thereover, as cartridge 530, FIG. 31, is lowered into bottom cover 503. The guide member 575 and receiver member 569 operate, then, as a cartridge-to-bottom cover or bottom cover-to-cartridge guide member arrangement for assisting the cartridge 530 to slide downwardly into an appropriate orientation relative to the bottom cover, (or the bottom cover 503 to move upwardly into cartridge 530) when the cartridge 530 is installed.

Referring back to FIG. 29, it is noted that receiver member 569 is positioned offset from a center line 530x of core member 539 and media 535, within cartridge 530. This eccentric positioning of receiver member 569 provides advantageous results. It generally relates to: ensuring that the cartridge 530 has only one rotational orientation which it can be engaged with bottom cover 503; and, ensuring that member 569 and projection 575 interfere with drain 528. Guide member 575, as shown in FIG. 29, is also eccentrically positioned, with respect to each of: a center line 507 for bottom cover 503; and, a center line 530x for the media 535.

Still referring to FIG. 29, it is noted that positioned within annulus 501a, partially surrounding media 535 within housing 501, in bottom cover 503, is positioned a shield member 580 projecting upwardly from bottom 573. The shield member 580 is positioned to separate outlet arrangement 516, from a region immediately surrounding media 535. Gap 581 (when provided between shield 580 and sidewall 503s), provides for a number advantageous results including: assistance in separating oil drainage to drain 528, from outlet arrangement 516; assistance in direction of outlet gas flow to outlet 516; and, to help ensure that any moisture collected (condensed) on the internal surfaces of housing 501 will tend to drain to outlet 516 rather than to drain aperture 528.

Figure 32:
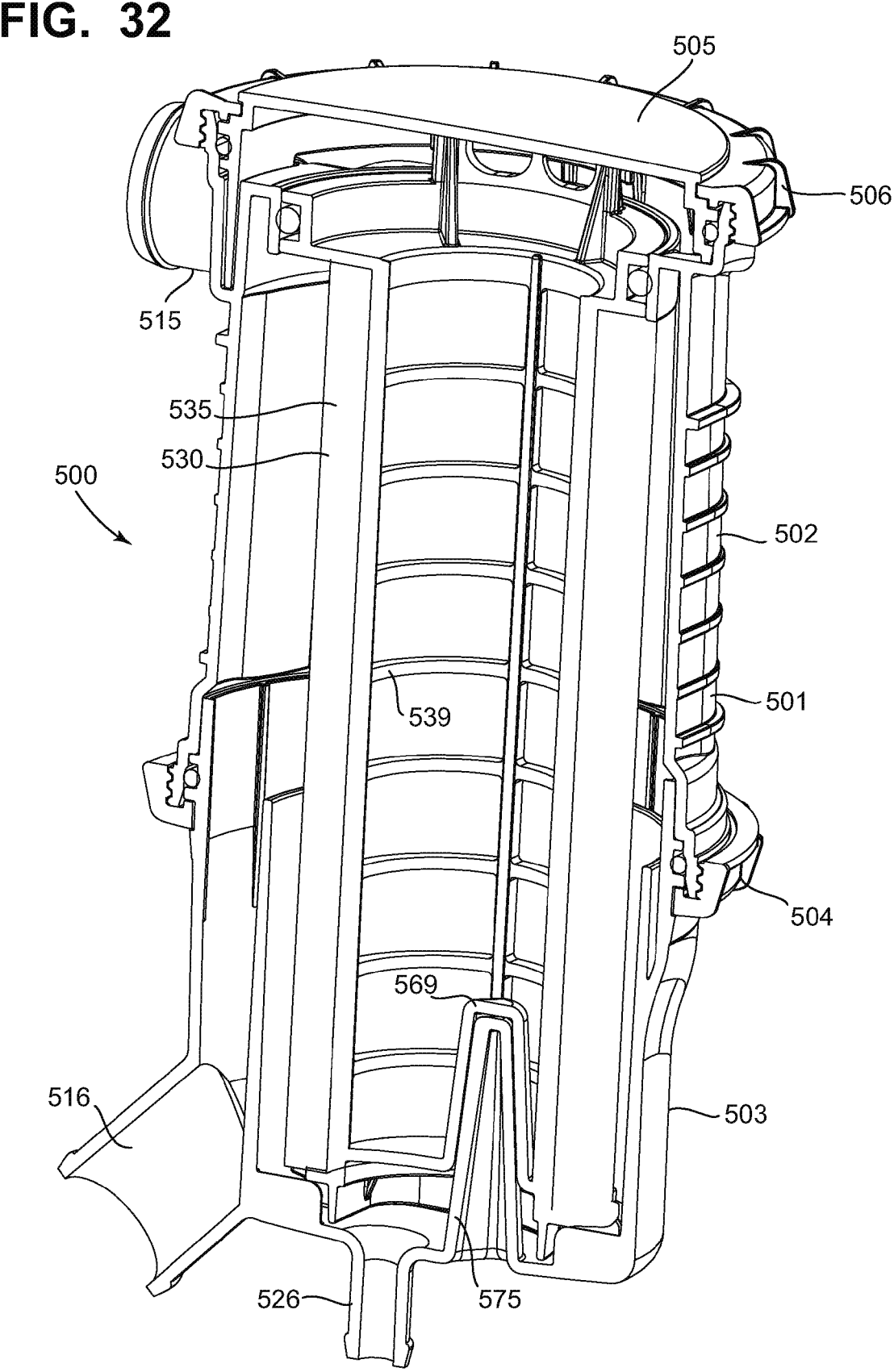
FIG. 32 is an schematic cross-sectional view of the assembly of FIG. 27.

Attention is now directed to FIG. 32. FIG. 32 is a perspective view generally analogous to FIG. 31, except it is a non-exploded view. Attention is particularly directed to the relative orientation of inlet arrangement 515 and outlet arrangement 516. It is noted that they are generally directed in the same direction, i.e. off to the left, relative to a remainder of the housing 501.

Figure 33:
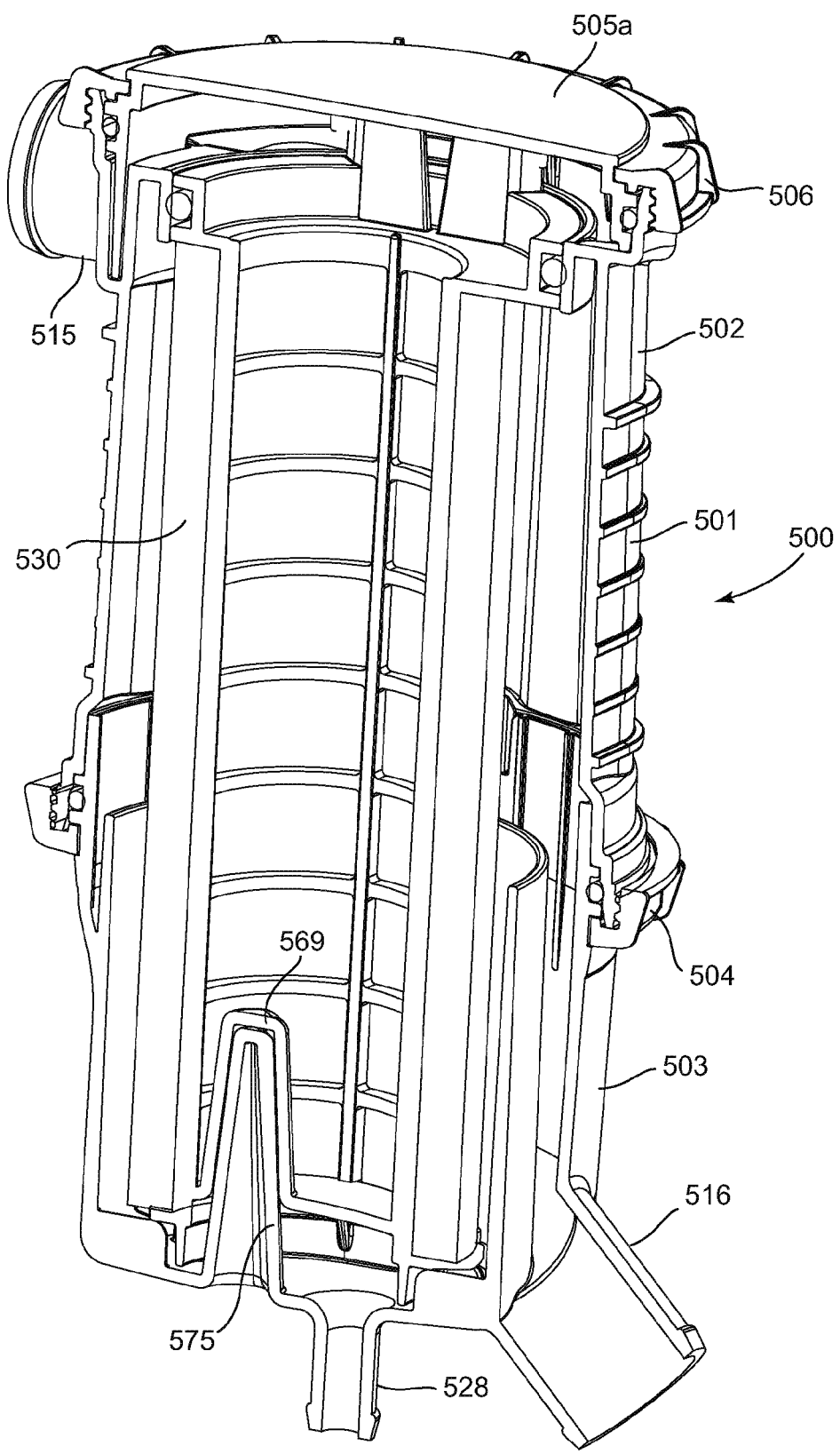
FIG. 33 is a schematic, cross-sectional view analogous to FIG. 32, except depicting a alternate configuration for bottom cover member of the assembly.

In FIG. 33, assembly 500 is shown, but in an alternate relative orientation of componentry. In particular, FIG. 33 is a view analogous to FIG. 32, and the housing central body section 502 is shown in the same rotational orientation. However, the bottom cover 503 and the internally received filter cartridge 530 are rotated 180° relative to the positions of FIG. 32. This allows for the inlet arrangement 515 and outlet arrangement 516 to be oriented generally directed in opposite directions. An advantage of the assembly 500, is that it is indexed such that the bottom cover 503 can be positioned on the housing body 502 only in each of two separate orientations, to allow for the affect discussed above in connection with comparing FIGS. 32 and 33. The cartridge 530 is configured so that it can be sealed in place, in either one of the two orientations; the cartridge 530 being configured to only be engagable with bottom cover 503 in a single rotational orientation. It is noted that a difference between the assembly 500, FIG. 32 and the assembly 500, FIG. 33, is that top cover 505a, FIG. 33, is a modified top cover to provide for a desired engagement with cartridge 530 and housing body 502, when the bottom cover 503 and cartridge 530 are in the rotational orientation of FIG. 33. (Of course, an indexing arrangement between the bottom cover 503 and the central body section 502 can be developed to allow for more than two (for example, three or four) rotational orientations).

Alternately stated, for the example embodiment depicted, a single given entire assembly 500 cannot be orientated in each of the two orientations of FIGS. 32 and 33. A single given entire assembly can only be oriented in one. However, by merely replacing the cover 505/505a and using the same rings 504, 506, housing body 502, bottom cover 503 and cartridge 530, two orientations can be accomplished. The advantage to the two allowable orientations is that the assembly can be manufactured for use with a variety of different equipment line orientations, with minimal change of assembly parts (the covers 505/505a).

Figure 34:
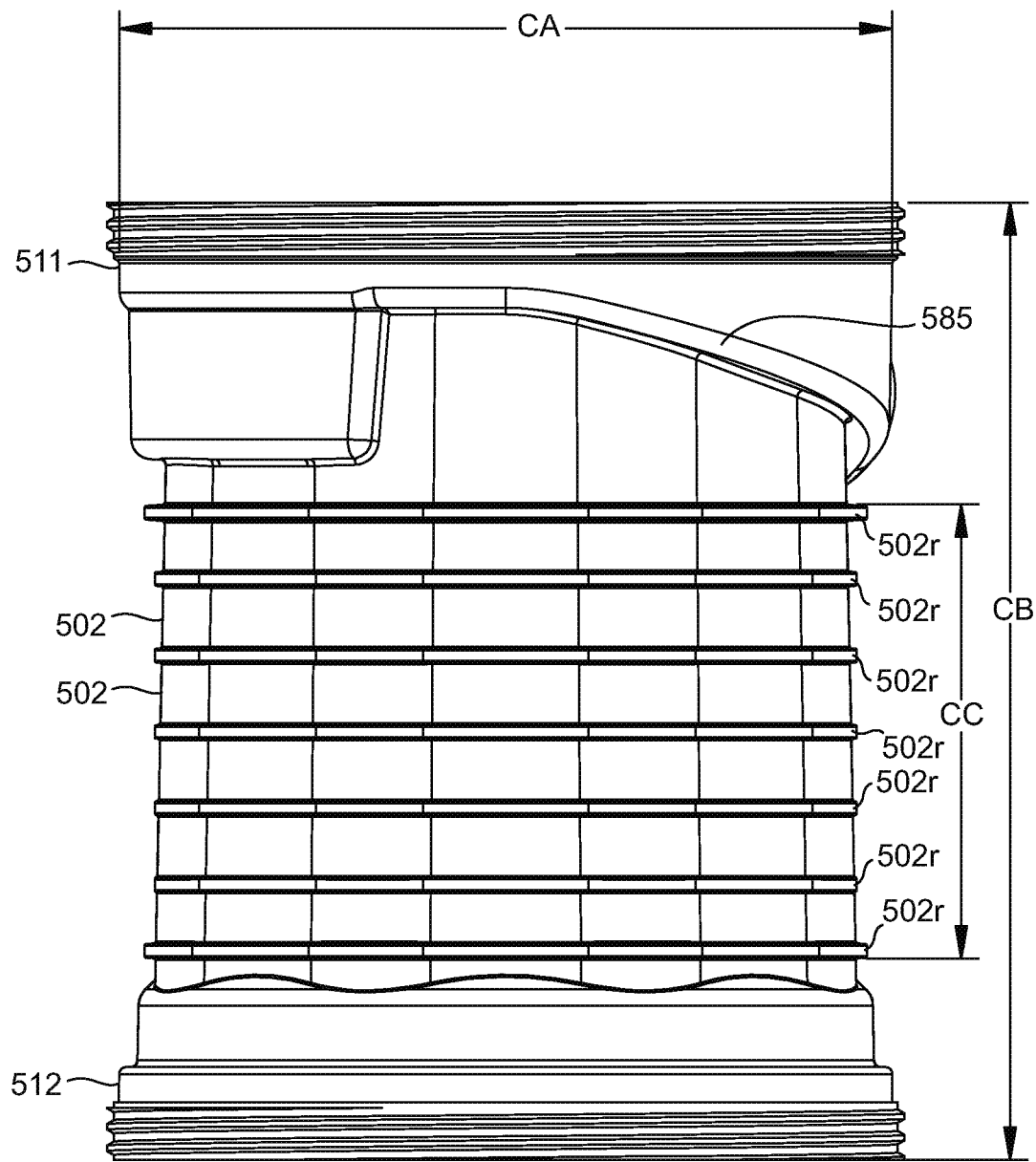
FIG. 34 is schematic, enlarged, side elevational view of a housing body member of the assembly of FIG. 27.
Figure 35:
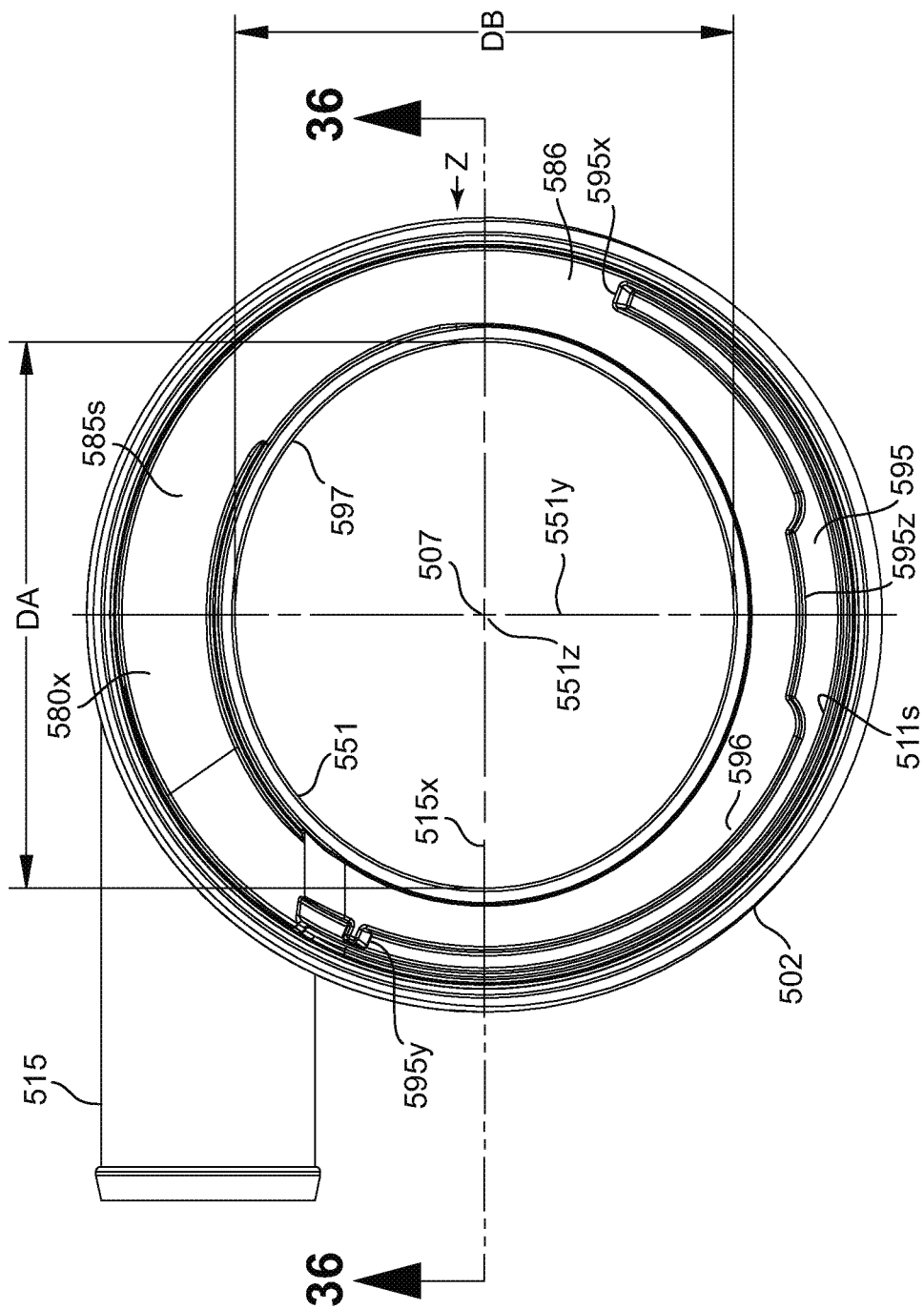
FIG. 35 is a schematic top plan view of the housing body member of FIG. 34.
Figure 36:
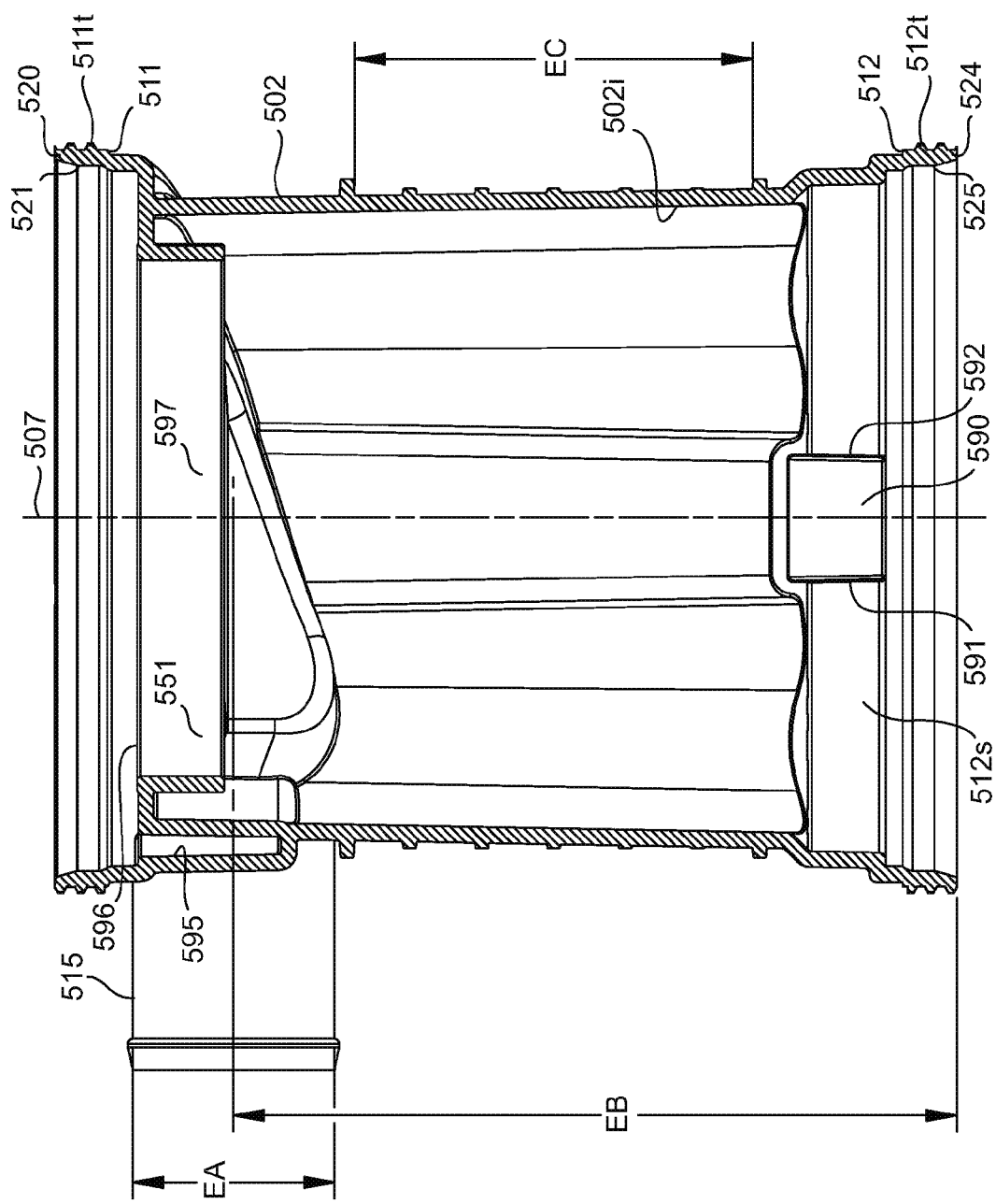
FIG. 36 is schematic cross-sectional view taken generally along line 36-36, FIG. 35.

Attention is now directed to FIGS. 34-36, in which features of the housing body (housing central body section) 502 are viewable. Referring first to FIG. 34, housing central body section 502 is shown in side elevational view. Again, the housing central body section includes sidewall 510 having an upper end region 511 and a lower end region 512. In FIG. 34, adjacent upper region 511, the sidewall 502 shows ramp region 585 therein. The ramp region 585, as viewable in FIG. 34, shows sidewall features of an internally positioned air flow ramp that extends upwardly from the inlet arrangement 515. This will be understood better by reference to FIG. 35. as discussed below.

Still referring to FIG. 34, example dimensions are provided as follows:

CA=114.6 mm; CB=142 mm; and, CC=67.4 mm.

Attention is now directed to FIG. 35, a top plan view of housing central body section 502. Inlet arrangement 515 can be seen. Also viewable in FIG. 35 at 507, is the cross-section point for central axis 507. (That is, axis 507 is shown coming toward the viewer in FIG. 35). Referring to FIG. 35, internal surface 585s of ramp 585 is viewable. Surface 585 generally extends, helically, upward in extension from engagement with inlet arrangement 515 around central axis 507 to an uppermost region indicated at approximately 586. The helical, upwardly directed (curved) ramp surface 583x helps direct gas flow to inlet 515 in a circular pattern and also upwardly to a location above a selected portion of cartridge 530, FIG. 32, during use.

Still referring to FIG. 35, it is noted that in inlet 515 is defined a line of air flow at approximately 515x which is generally directed tangentially to the interior definition of housing body 502, as previously discussed. Thus, line 515x is not directed toward central axis 507 but generally tangentially to an internal definition of the housing central body section 502.

It is noted that the view of previously discussed FIG. 34 is generally directed toward a side of housing central body section 502 approximately opposite inlet 515, as shown at arrow Z, FIG. 35.

In FIG. 35, example dimensions are provided as follows: DA=81.2 mm; and, DB=74 mm.

Attention is now directed to FIG. 36. In FIG. 36, there is a cross-sectional view taken generally along line 36-36, FIG. 35. In FIG. 36, attention is particularly directed to inner surface 502i. Positioned in interior surface 502i, adjacent inner surface 512s of region 512, is a projection member 590 defined between opposite sides 591, 592. Projection member 590 defines an indexing member, for rotational orientation of bottom cover 503 when installed. It is noted that the housing central body section 502 typically includes at least two, spaced, projection members corresponding to projection member 590, each of which is positioned approximately 180° around central axis 507 from the other. Of course alternative indexing members (and numbers of members) are possible. In general terms, projection member 590 comprises a member of a housing body-to-bottom cover rotational indexing arrangement. The rotational indexing arrangement in the particular example shown, has at least one (and in the particular example depicted at least two and indeed two) possible rotational alignment orientations; in the example, the two being 180° apart.

In FIG. 36, some example dimensions are provided as follows: EA=31.8 mm; EB=113.8 mm; and, EC=62.7 mm.

Attention is now directed back to FIG. 35, and in particular to receiver 595. Receiver 595 comprises a gap defined between flange 596 and interior surface portion 511s of upper end 511. The gap 595 has a closed bottom. A portion of receiver 595 is viewable in cross-section, in FIG. 36. Referring back to FIG. 35, receiver 595 is configured to receive portion of cover member or top cover 505 projecting therein, when assembled. Receiver 595 will operate, then, to rotationally index cover 505 in a particular selected rotational orientation. For the particular assembly depicted, as will be seen from discussion below, the cover member 505 is configured so that it can only engage the housing central body section 502 in a single selected rotational orientation. Thus, receiver 595 operates as a member of a top cover-to-housing body rotational indexing arrangement, that has only one rotational indexing position.

In general, receiver 595, FIG. 35, is arcuate in extension between ends 595x, 595y and includes central recess section 595z. In the view of FIG. 35, it is noted that the arcuate extension of receiver 595 extending between ends 595x, 595y, is generally over a portion in an arc around central axis 507 not occupied by ramp surface 585s. typically, an arcuate extension of gap 595 will be at least 160° typically at least 170° and, often about 170°-185°, although alternatives are possible.

Referring now to FIG. 36, flange 551 (which defines cartridge seal surface) is viewable in cross-section, extending downwardly from regions adjacent surface 596 and portion adjacent ramp 585. Surface 551 is a surface against which housing seal arrangement 550, comprising seal member 555, of cartridge 530 seals, when installed. Referring to FIG. 35, it is noted that surface 551 defines a generally elliptical shape 597, the longer axis being indicated generally at 551x and a shorter axis being indicated generally at 551y. It is observed that the surface 551 is nearly circular, but there is a definable elliptical shape. Still referring to FIG. 35, since the shape of surface 551 is an ellipse, shorter axis 551y can be set to bisect longer axis 551x, at a center 551z, which would correspond to central axis 507. It is noted that a longitundal center line for the media will typically be eccentrically positioned, and extends orthogonally, relative to ellipse center 507. Typically, the media center line will intersect larger axis 551x, however.

Attention is now directed to FIGS. 37-41, in which various views of the bottom cover 503 are provided. Attention is first directed to FIG. 37, a side elevational view. Bottom cover 503 can be seen as having sidewall 503s and bottom 573 with bottom drain 528 therein. Also depicted in housing bottom 503 is outlet arrangement 516. Sidewall 503s has an upper end region 598 with an upwardly directed flange arrangement 599 extending upwardly therefrom. Section 598 includes a pair of ring members 600a, 600b which provide for: receipt of o-ring 567 therein, FIG. 29; and, for engagement by locking ring 504. Flange arrangement 599 includes a gap arrangement 601 therein. In general, the flange arrangement 599 is sized to be received within end region 512, FIG. 36, of central housing body section 502; and, the gap arrangement 601 is sized to be received therein projection arrangement 590 in housing central body section 502. In particular, flange arrangement 599 extends circumferentially around a central axis of sidewall 503s, with the only spaces being provided by a gap arrangement 601. The particular housing central body section 503 depicted is configured so that gap arrangement 601 comprises two 180° rotationally spaced gaps 602, each one sized to engage one of projection members 590.

Figure 37:
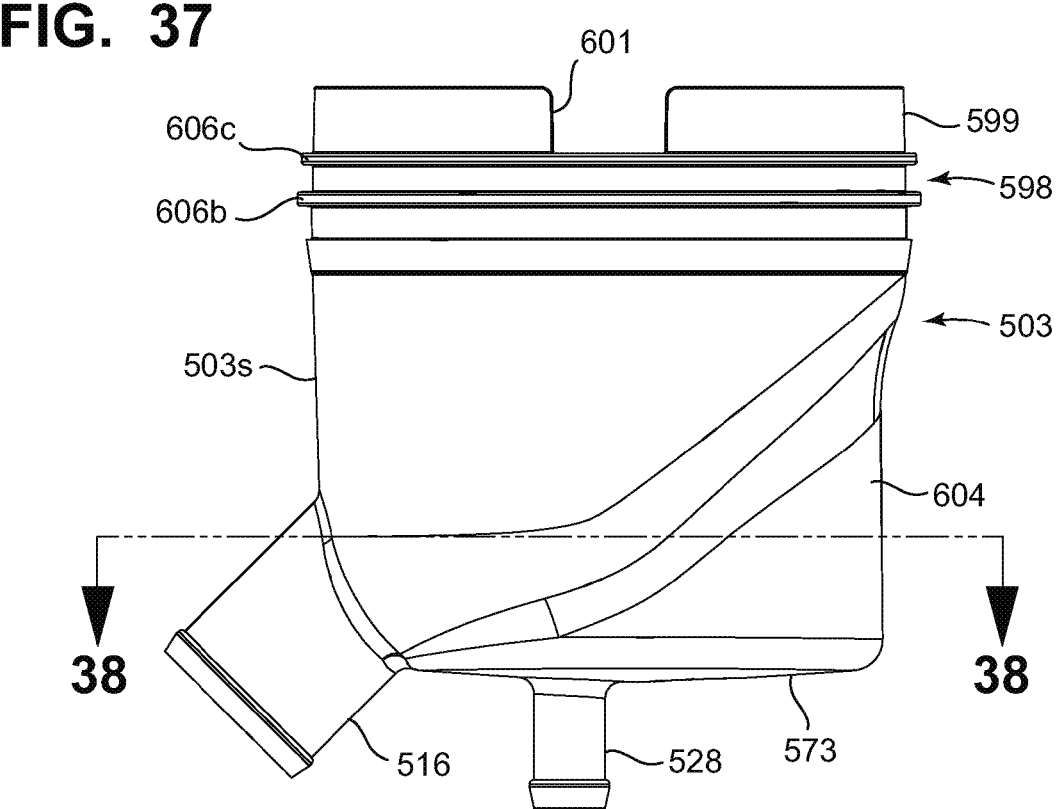
FIG. 37 is a schematic side elevational view of a housing bottom component of the assembly of FIG. 27.

Still referring to FIG. 37, it is noted that housing sidewall 503 includes a radially inwardly directed recess section 604 positioned generally 180° opposite outlet arrangement 516. This allows for ring 504, FIG. 29 to be in positioned around sidewall 503s. In particular, the locking ring 504 has a sufficiently small internal diameter to not be able to clear ring 600b in movement upwardly. Thus, the ring 504 must be positioned around sidewall 503s, by extending over bottom 573. The ring 504 must be moved laterally to clear outlet 516, and recess 604 allows for this.

Figure 38:
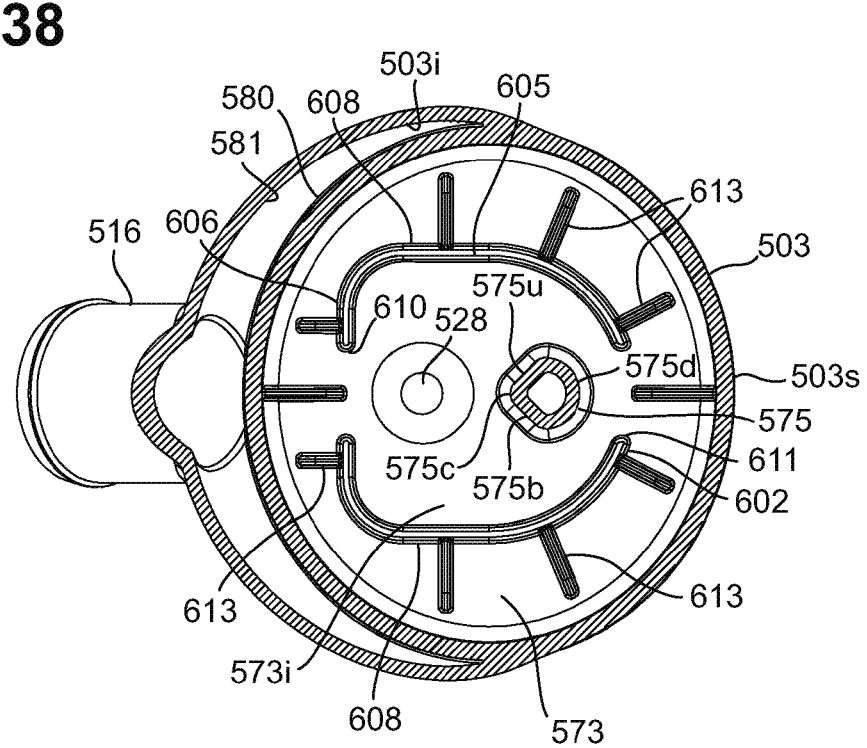
FIG. 38 is a schematic cross-sectional view taken along line 38-38, FIG. 37.

Attention is now directed to FIG. 38, a cross-sectional view taken along line 38-38, FIG. 37. Referring to FIG. 38, a number of features are viewable. First, attention is directed to interior surface 573i, of bottom 573, and in particular to drain outlet 528. Also viewable is flange 580, which extends over a radial arc of approximately 180°, and creates gap 581 extending radially around a portion of an interior 503i; of bottom cover 503, in opposite directions from bottom outlet arrangement 516.

Still referring to FIG. 38, the cross-sectional view is taken through guide member 575. Guide member 575 can be seen to have a non-circular cross-section. The particular cross-section depicted, in the example receiver member 575, is one having a shape approximately analogous to that of a symmetrical baseball field, i.e. a first side comprising first and second relatively straight side sections 535a, 535b extending at approximately right angles to one another, from a vertex 575c; and, a semi-circular opposite side 575d. As will be understood from further descriptions below, generally in extension upwardly from bottom 573, guide member 575 maintains a relatively constant cross-section shape, but tapering downwardly in size; i.e. the shape is a modified cone. An uppermost tip, not viewable in FIG. 38, but shown at 575t, FIG. 39, is truncated.

Still referring to FIG. 38, projecting upwardly form bottom 573i is a flange arrangement 605 defining a generally D-shaped interior perimeter definition, with a straight side 606 on opposite curve side 607 and relatively straight transition sections 608 extending between the straight side 603 and the curve side 607. It is noted that straight side 606 includes a central drain gap 610 therethrough, and the curved side 607 includes a central drain gap 611 therethrough, the gaps 610 and 611 being generally, oppositely positioned in flange arrangement 605. Gaps 610, 611 are drain gaps allowing liquid in a portion of surface of 573 outside of flange arrangement 605, to drain to an interior of flange arrangement 605 to reach lower drain arrangement 528. In general, flange arrangement 605 comprises a member of a filter cartridge-to-housing bottom (or housing bottom-to-filter cartridge) rotational indexing arrangement which allows for only one rotational orientation of the cartridge 530 relative to the bottom cover 503.

In general, ribs 613 are strengthening ribs.

Attention is now directed to FIG. 39, a top perspective view of bottom cover 503. Here, guide member 575 and drain 528 are viewable. Also flange arrangement 605, having a generally D-shape with drain gaps 610, 611 therein can be viewed. In FIG. 39, the opposite gaps 601, which will provide indexing in flange arrangement 599 can be inspected further. Ribs 614 provide for strengthening in flange arrangement 599. It can be seen that flange arrangement 599 comprises first and second, opposite, arcuate members 599x, 599y. Internal flange 580 defining gap 581, previously discussed, is further viewable.

Figure 40:
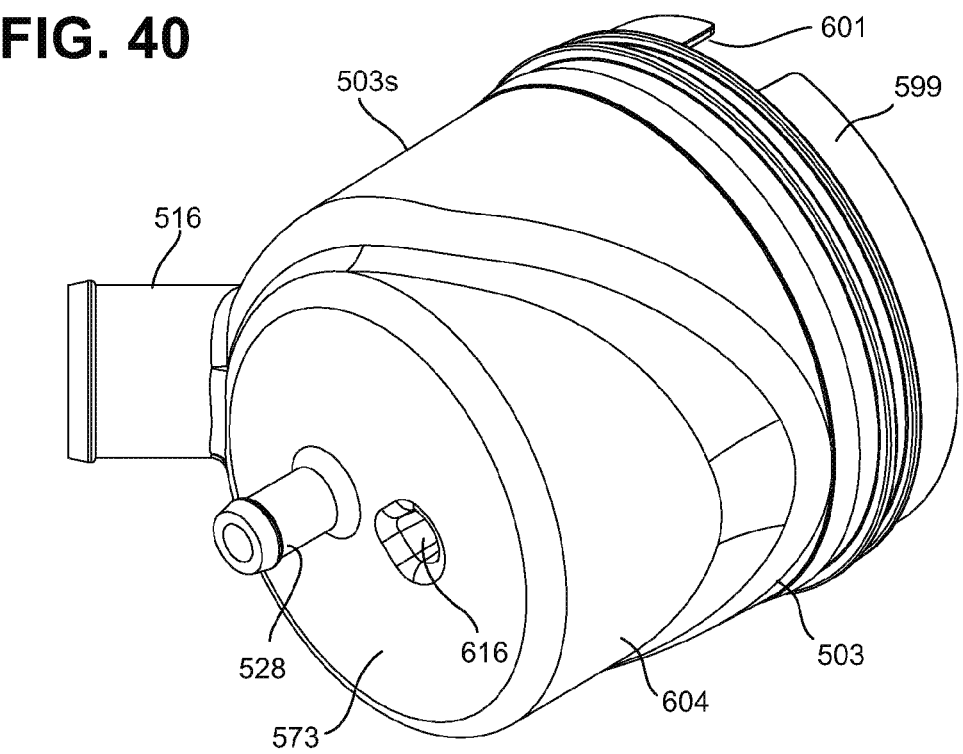
FIG. 40 is a schematic bottom perspective view of the housing body component of FIG. 37.

In FIG. 40, a bottom perspective view of bottom cover member 503 is provided. Recess 604 and sidewall 503s, allowing for clearance (as discussed previously for positing of ring 504 of FIG. 29), is viewable. Referring to FIG. 40, it is noted that at 616, a hollow interior of guide member 575 can be seen, intersecting bottom 573. A hollow interior 616 will be common, since bottom cover 503 will typically be formed from molded plastic.

Figure 41:
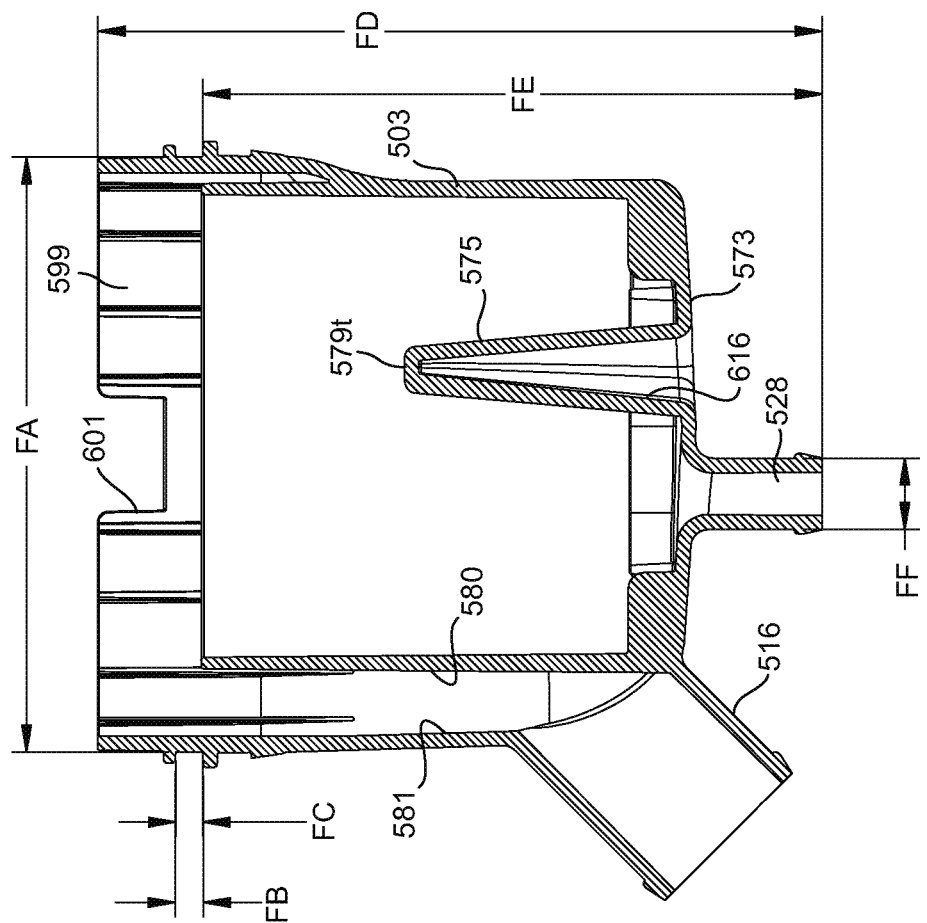
FIG. 41 is a schematic side cross-sectional view of the housing body component of FIG. 37.

Attention is now directed to FIG. 41, a cross-sectional view of bottom cover 503. Features previously described are viewable. In FIG. 41, some example dimensions are provided as follows: FA=105.47 mm; FB=5.01 mm; FC=4.81 mm; FD=128.2 mm; FE=109.7 mm; and, FF=12.7 mm.

It is noted that in FIG. 41, a tapered or slanted, somewhat conical shape to side member 575 can be viewed, in extension from bottom 573 to top 575t. It is noted that in cross-section, a perimeter definition of guide 575 would be as previously discussed; i.e. one arcuate side and an opposite side having a vertex with two straight sections extending outwardly therefrom.

Figure 42:
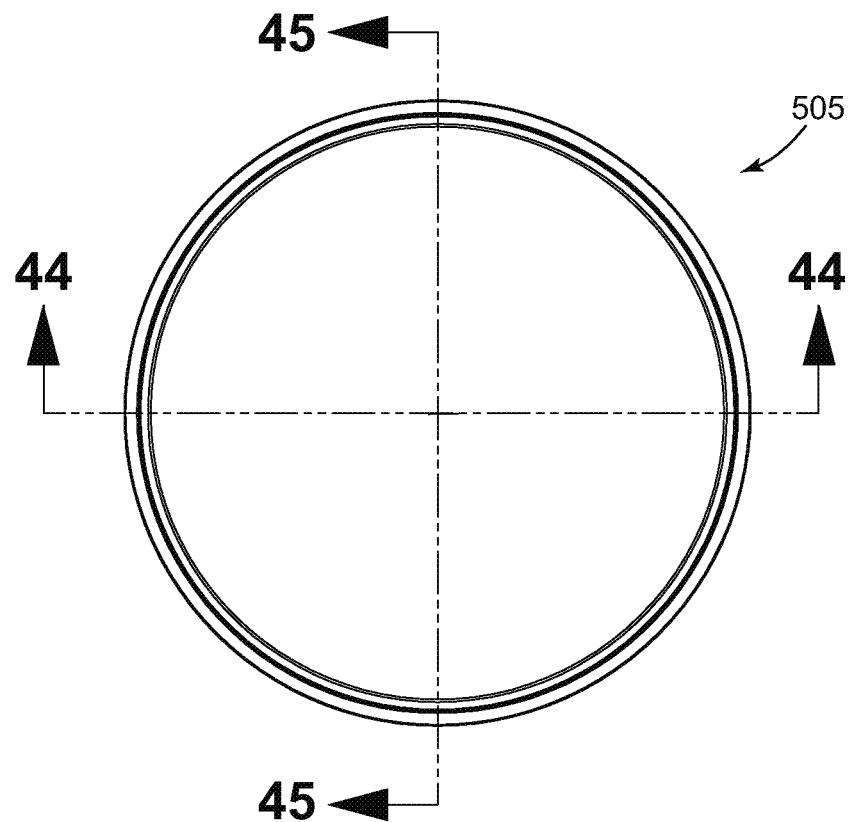
FIG. 42 is a schematic, top plan view of a cap member of the assembly of FIG. 27.
Figure 43:
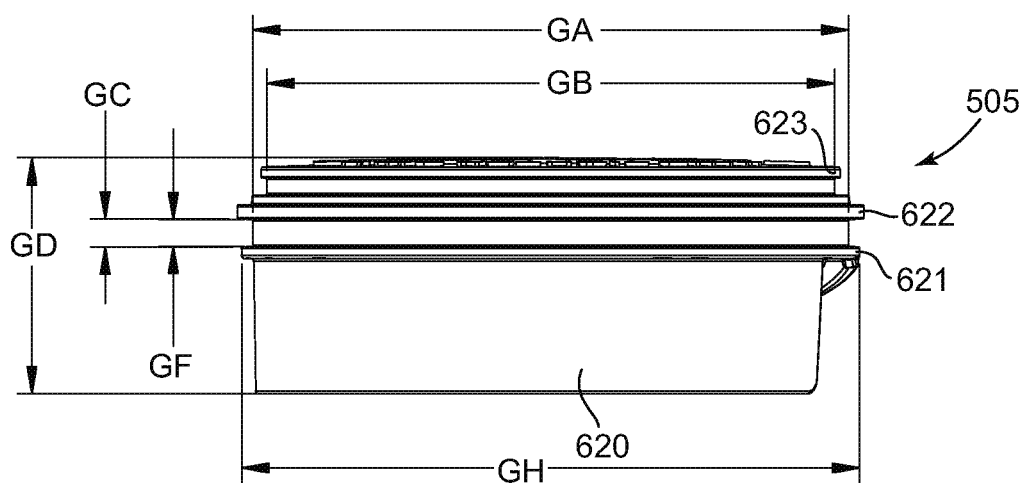
FIG. 43 is a schematic side elevational view of the cap member of FIG. 42.

Attention is now directed to FIGS. 42-51, in which various views of top cover 505 are provided. Attention is first directed to FIG. 42, a top plan view of top cover 505. As can be seen in FIG. 42, top cover 505 is generally circular. In FIG. 43, a side elevational view of top cover 505 is provided. The view of FIG. 43 is directed toward arcuate flange 620. It is noted that arcuate flange 620 does not extend radially, completely around the interior of top cover 505. Rather, flange 620 extends over an arc, in the example shown of approximately 180°.

Referring to FIG. 43, top cover 505 includes three vertically spaced, circumferential, radially outwardly projecting rings 621, 622 and 623 thereon. Rings 621,622 define a groove therebetween, for o-ring 566, FIG. 30. The rings also provide a stop, to passage of locking ring 506 over cover 505.

In FIG. 43, some example dimensions are provided as follows: GA=105.47 mm; GB=100.5 mm; GC=5.01 mm; GD=41.8 mm; GF=4.81 mm; and, GH=109.4 mm.

Figure 44:
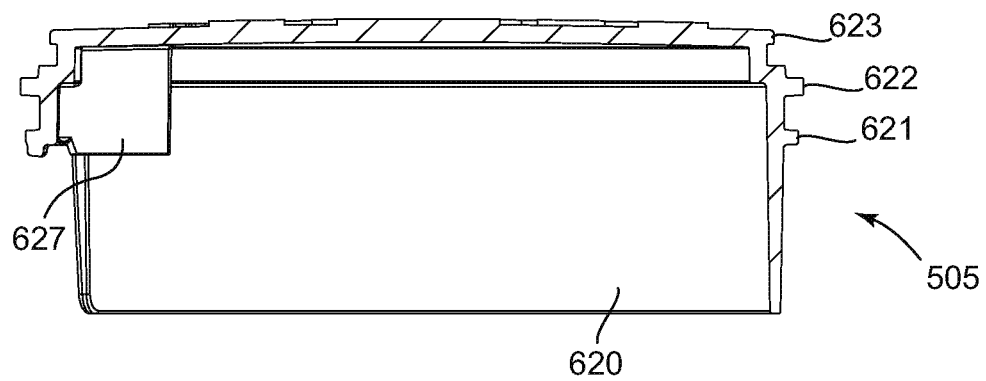
FIG. 44 is a schematic cross-sectional view taken along line 44-44, FIG. 42.

In FIG. 44, a cross-sectional view taken along line 44-44, FIG. 42, is depicted. Here, flange 620 is viewable. Also a portion of flow director 627 is viewable.

Figure 45:
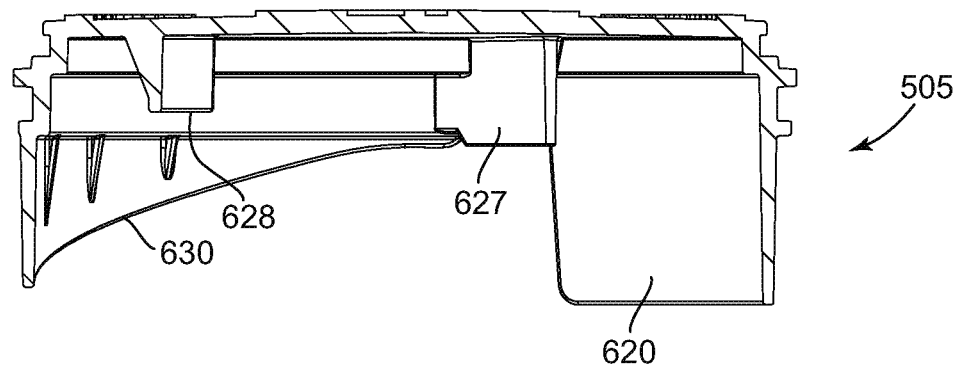
FIG. 45 is a schematic cross-sectional view taken along line 45-45, FIG. 42.

In FIG. 45, a cross-sectional view is taken generally along line 45-45, FIG. 42. Flange 620 is viewable in cross-section. Also viewable is a portion of flow director 627. Further, rotational interlock projection 628, discussed below is viewable. Further, a portion of tapered flange 630 is viewable. Operation of tapered flange 630 and interlock projection 628 are discussed below.

Figure 46:
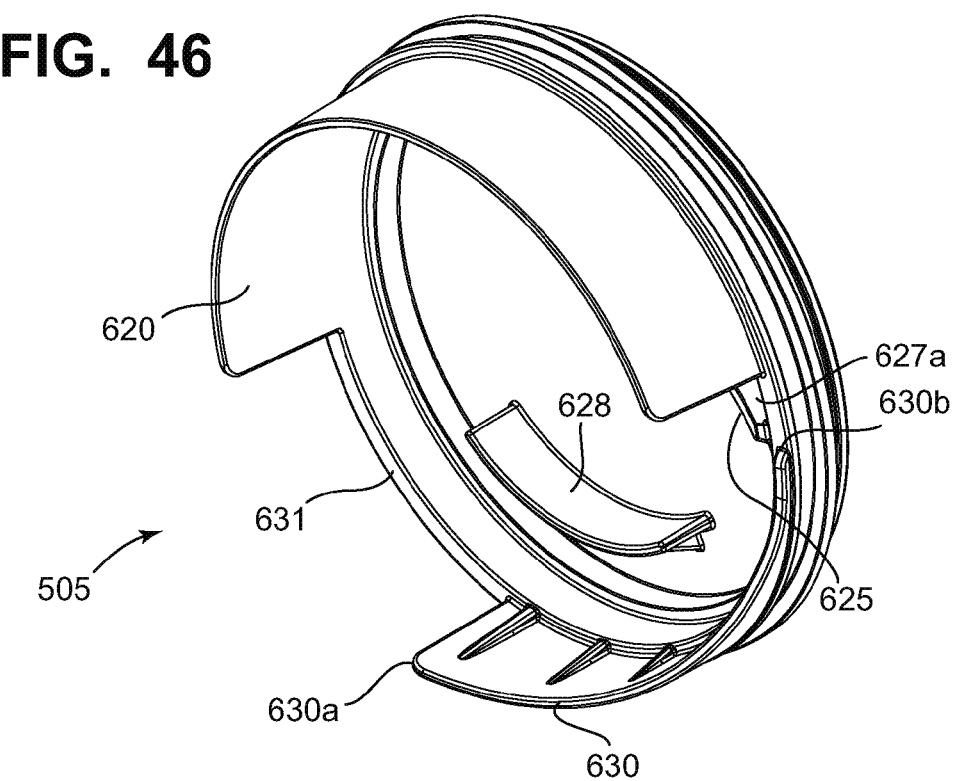
FIG. 46 is a schematic bottom perspective of the cap member of FIG. 42.

In FIG. 46, a bottom perspective view of top cover 505 is viewable. Flange 620, extending over approximately 180° arc is viewable in its entirety. Also, projection 628 is viewable in its entirety, as is tapered flange 630. Only a tapered end 627a, to flow director 627 is viewable. Arcuate gap 631 between flange 620, and a largest, deepest end 630a of tapered flange 630 is viewable. It is noted that in general, flange 630 tapers downwardly in height between end 630a and end 630b.

Figure 47:
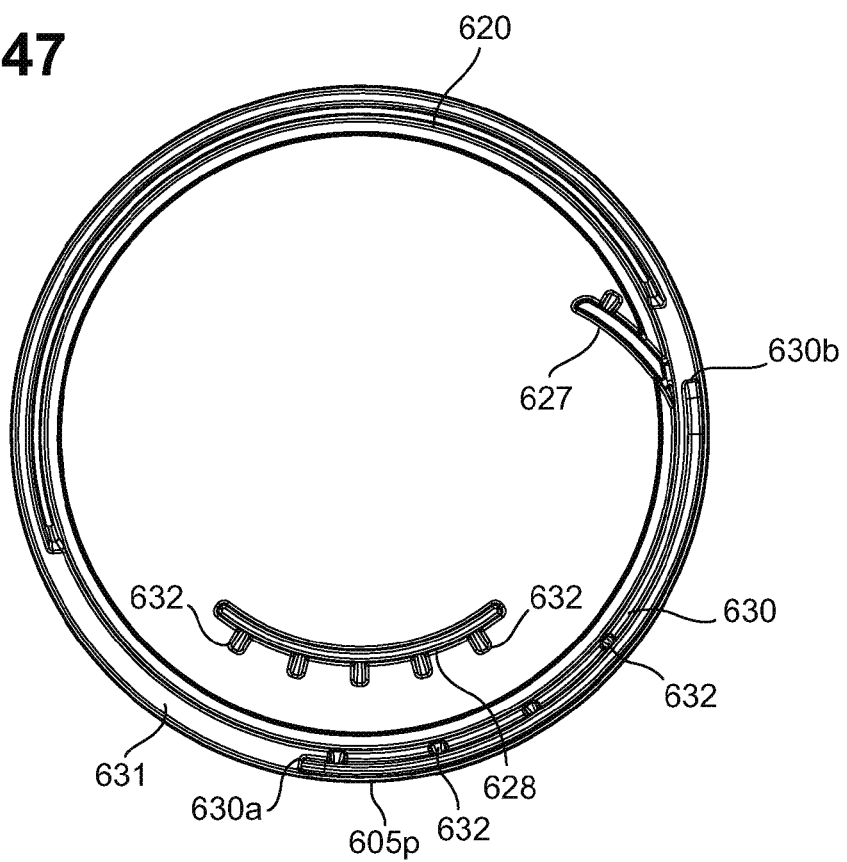
FIG. 47 is a schematic bottom plan view of the cap member of FIG. 42.
Figure 48:
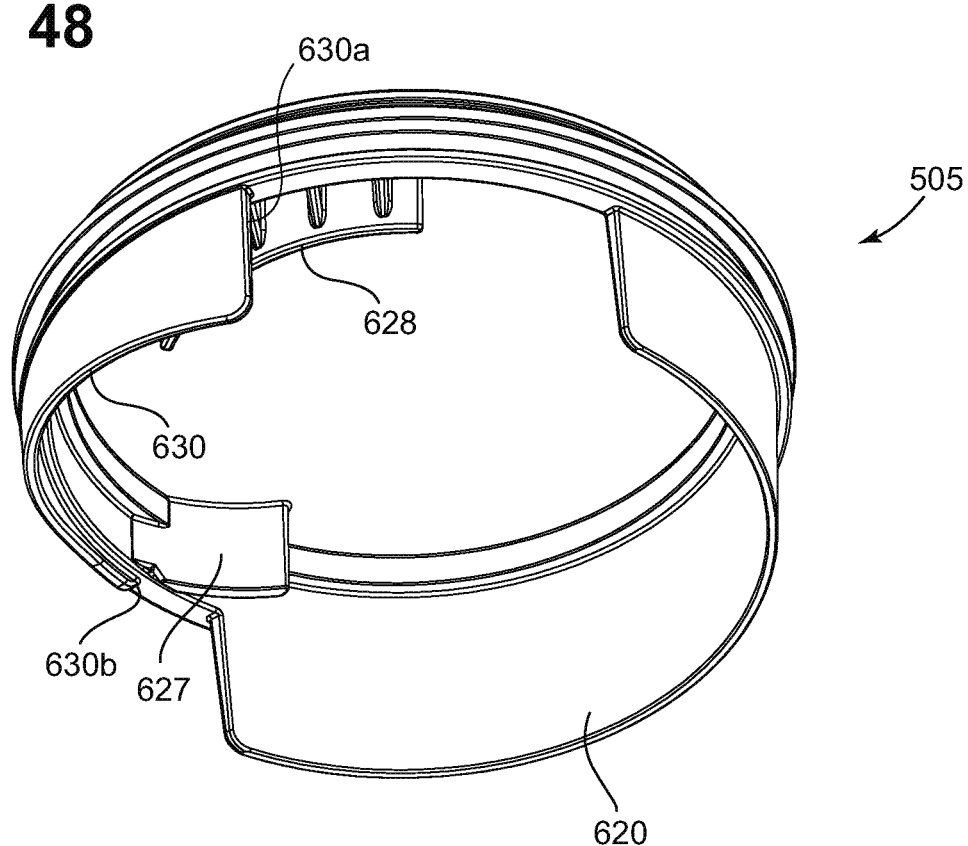
FIG. 48 is a schematic bottom perspective view of the cap member of FIG. 42.
Figure 49:
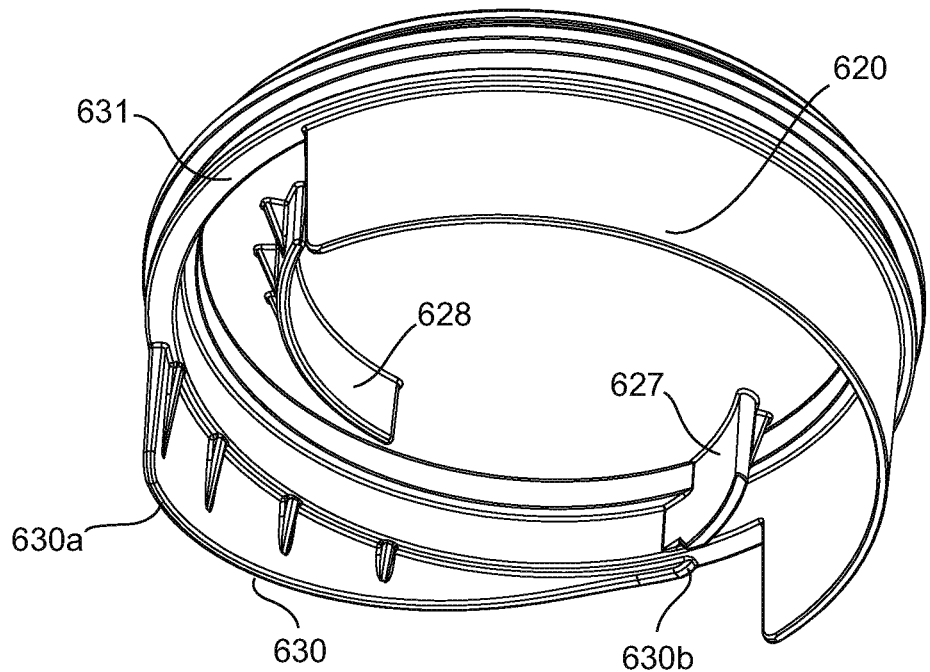
FIG. 49 is a schematic bottom perspective view of the cap member component of FIG. 42.
Figure 50:
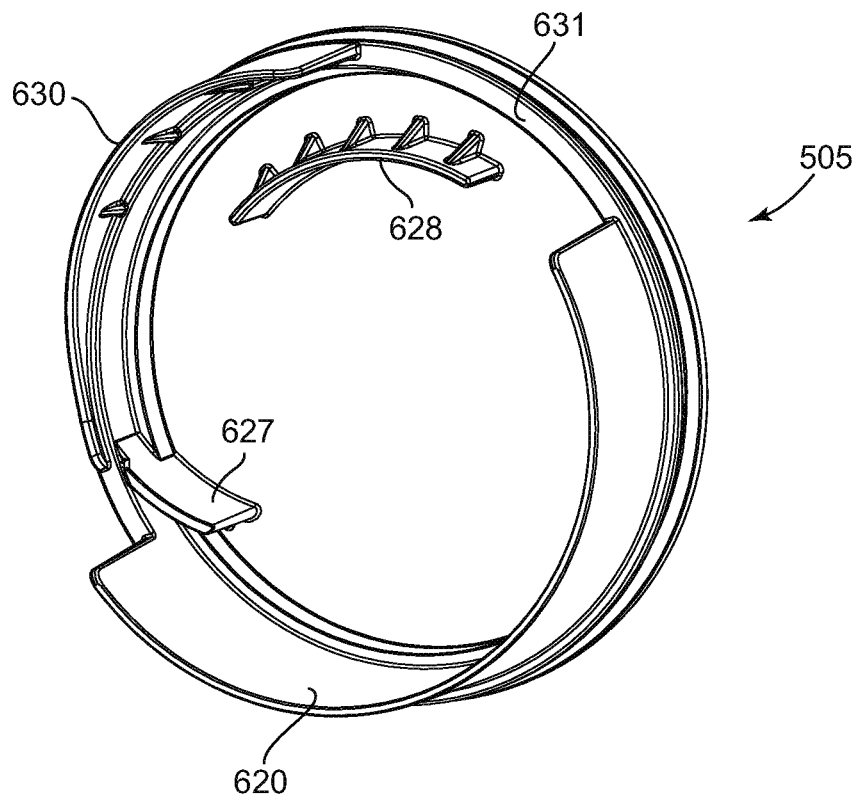
FIG. 50 is a schematic bottom perspective view of the cap member of FIG. 42.
Figure 51:
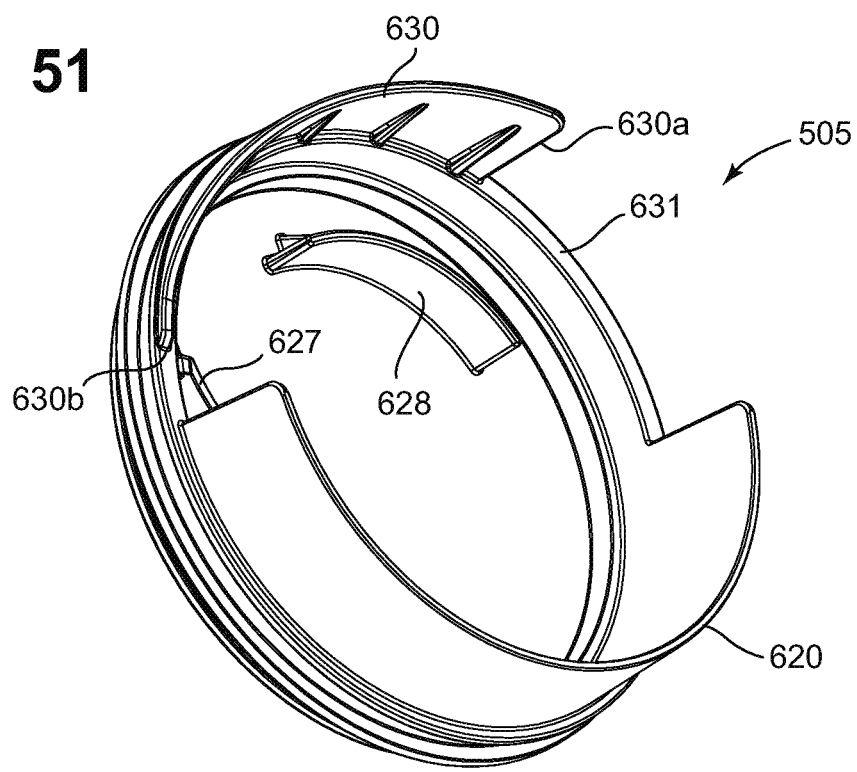
FIG. 51 is a schematic bottom perspective view of the cap member of FIG. 41.

In FIG. 47, a bottom plan view of cover 605 is provided. Again, the arcuate extension of flange 620 is viewable. Complete arcuate extent of flow director 627 is also viewable, as well as the arcuate extent of gap 631 and tapered flange 630. Finally, projection 628 is viewable. It is noted that ribs 632 are strengthening ribs.

Still referring to FIG. 47, it is noted that projection 628 is arcuate, is spaced inwardly from an outer perimeter 605p of cover 605, and has an arcuate curvature with respect to a center point of top cover 605. Further, interlock projection 628 has an arcuate extension over an arc of about 30-80°, inclusive. Finally, at least about 10% and typically 20-40% of an arcuate extent of arc 628, but not more than 50%, is in radial overlap with gap 631. Although alternatives are possible, this will be typical in some applications according to the present disclosure.

In FIGS. 48-51, various bottom perspective views of top cover 505 are provided, for inspection of the defined features.

Attention is now directed back to FIG. 35. When top cover 505 is installed in housing central body section 502, it can only be installed in one rotational orientation, that orientation having arcuate flange 620, FIG. 40, positioned within arcuate receiver 595. Flange 620 is generally made too large to fit above ramp surface 585s. Tapered flange 630 is sized and tapered to be positioned above flange 585, with end 630a adjacent end 586x, FIG. 35, of surface 585s, (the deepest region of surface 585s) and with tip 530b positioned above end 586.

Flow director 627 will be positioned adjacent and above end 586 of ramp 585s to help turn flow from inlet 515 radially inwardly. Thus, flow director 627 is curved inwardly. This will help direct flow generally toward central axis 507 of housing body section 502, i.e. above cartridge 530, FIG. 29, when installed.

Arcuate projection 628 is positioned as in interference projection to allow top cover 505 to be positioned on central housing body section 502, only when cartridge 530 is in a single selected rotational orientation.

Figure 52:
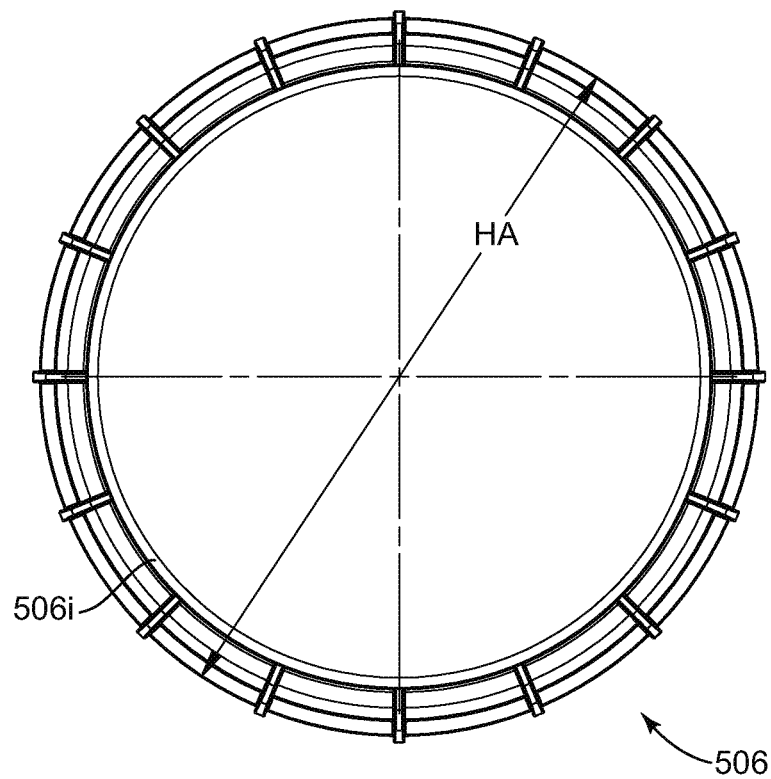
FIG. 52 is a schematic top plan view of a locking ring member for the assembly of FIG. 27.
Figure 53:
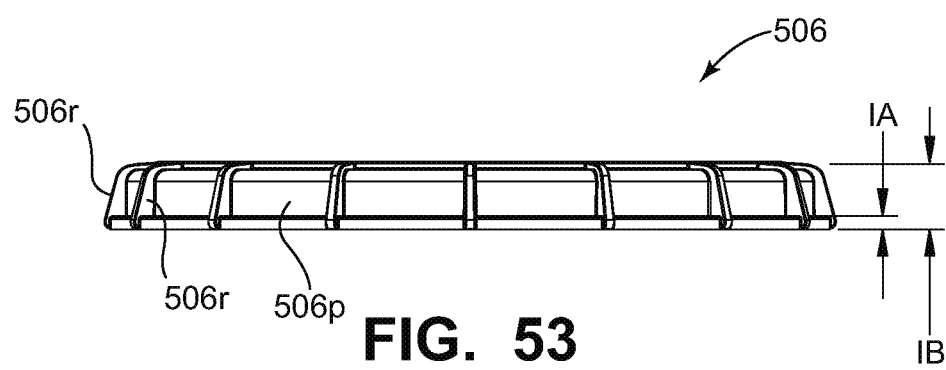
FIG. 53 is a schematic side elevational view of the ring member of FIG. 52.
Figure 54:
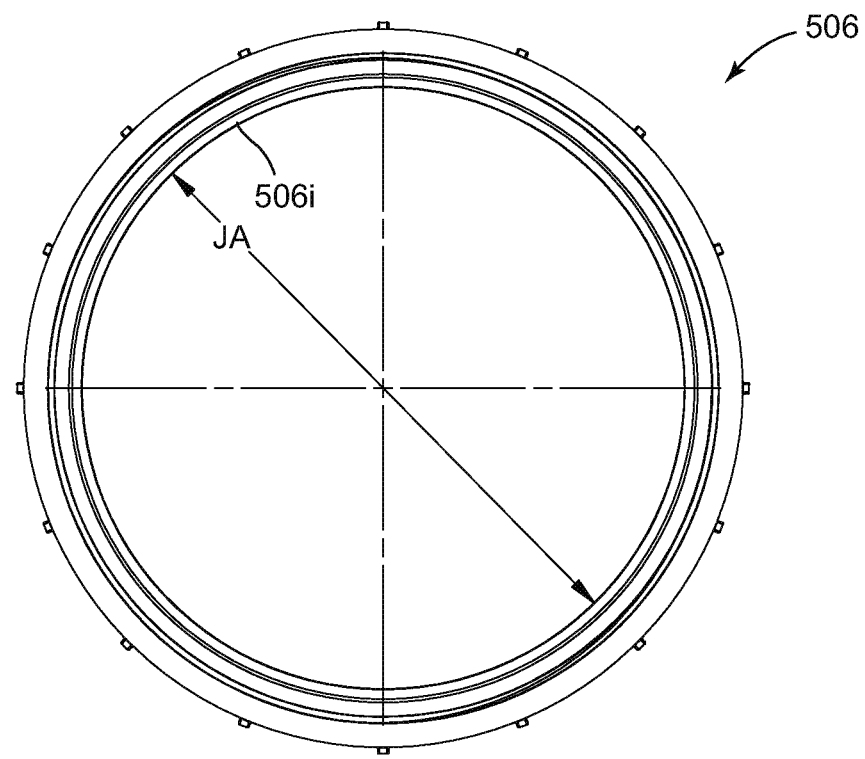
FIG. 54 is a schematic bottom plan view of the ring member of FIG. 52.
Figure 55:
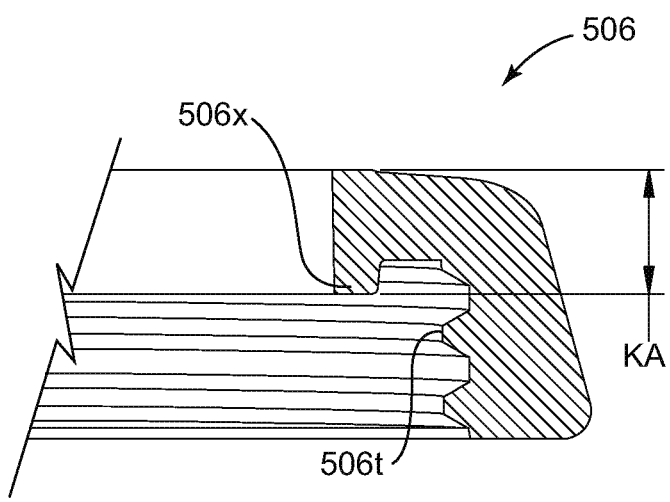
FIG. 55 is an enlarged, schematic, fragmentary cross-sectional view of the ring member of FIG. 52.

Before turning to the cartridge 530 and components thereof, attention is directed to FIGS. 52-54, in which locking ring 506 is depicted. It is noted that locking ring 506 can be identical to locking ring 504.

In FIG. 52, a top plan view of locking ring 506 is viewable. Locking ring 506 defines a central, circular opening 506i. Referring to FIG. 53, a side elevational view, locking ring 506 can be seen to have an outer perimeter 506p with a plurality of spaced ribs 506r thereon, to provide strength and to facilitate gripping.

In FIG. 54, a bottom plan view of locking ring 506 is provided. Finally, in FIG. 55, a fragmentary cross-sectional view is provided. Here threads 506t can be seen, as well as projection 506x. Projection 504x is assisted in providing a lock fit engagement between ring 506 and cover 505

In FIGS. 52-55, some example dimensions are provided as follows: HA=127.3 mm; IA=2.3 mm; IB=11.6 mm; JA=106.6 mm; and, KA=5.5 mm.

Figure 56:
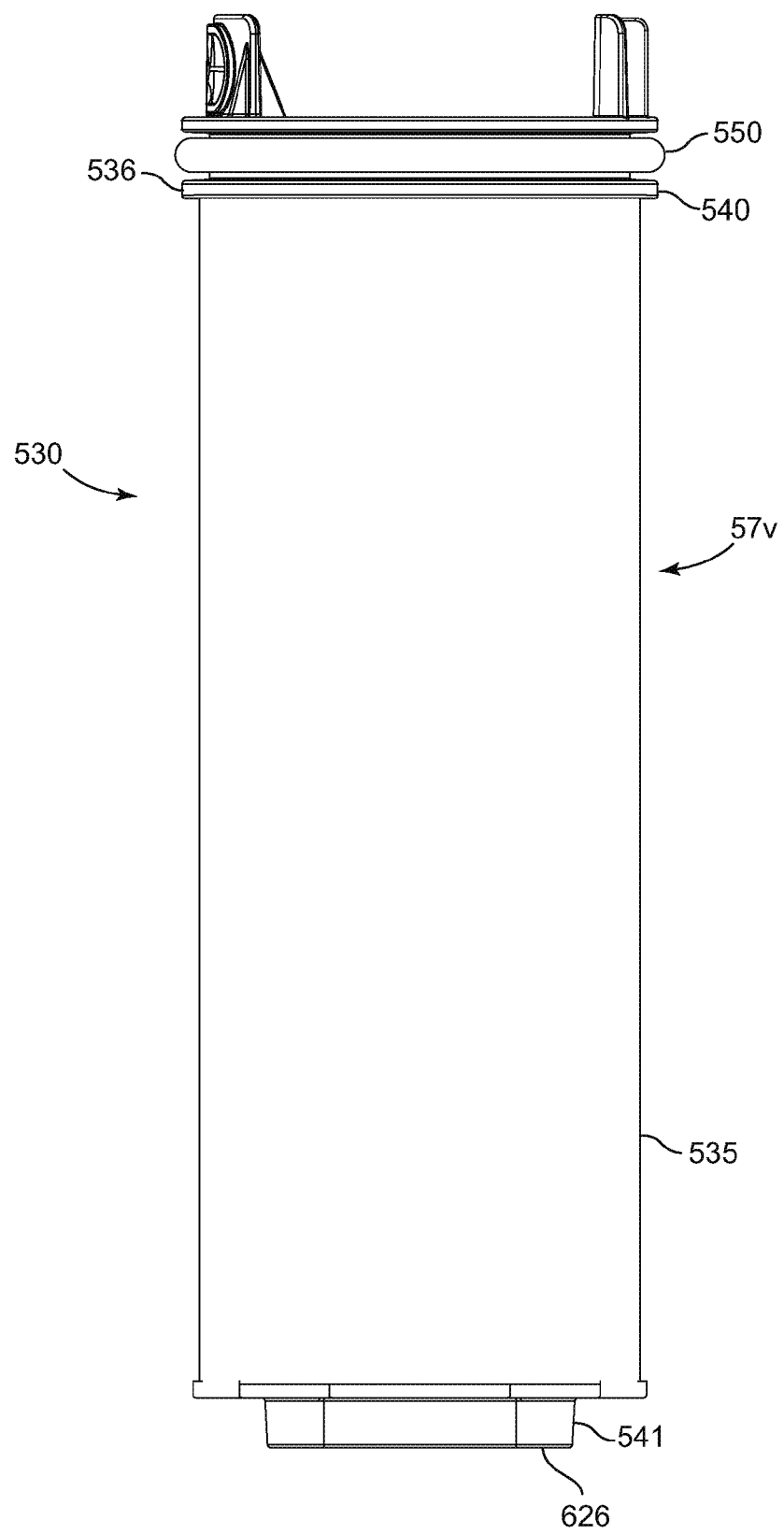
FIG. 56 is a schematic, side elevational view of a filter cartridge member usable as an internal service part for the assembly of FIG. 27.

Attention is now directed to FIGS. 56-60, in which various views of cartridge 530 are provided. Referring first to FIG. 56, cartridge 530 is depicted in a side elevational view. As previously discussed, the cartridge 530 includes a support 536 having a first end piece or member 540 and a second end piece or member 541. Media 535 is mounted on support 536 surrounding core 539, FIG. 29. Mounted on end piece 540, which will be an upper end cap when cartridge 530 is installed, is provided o-ring seal 550.

Figure 60:
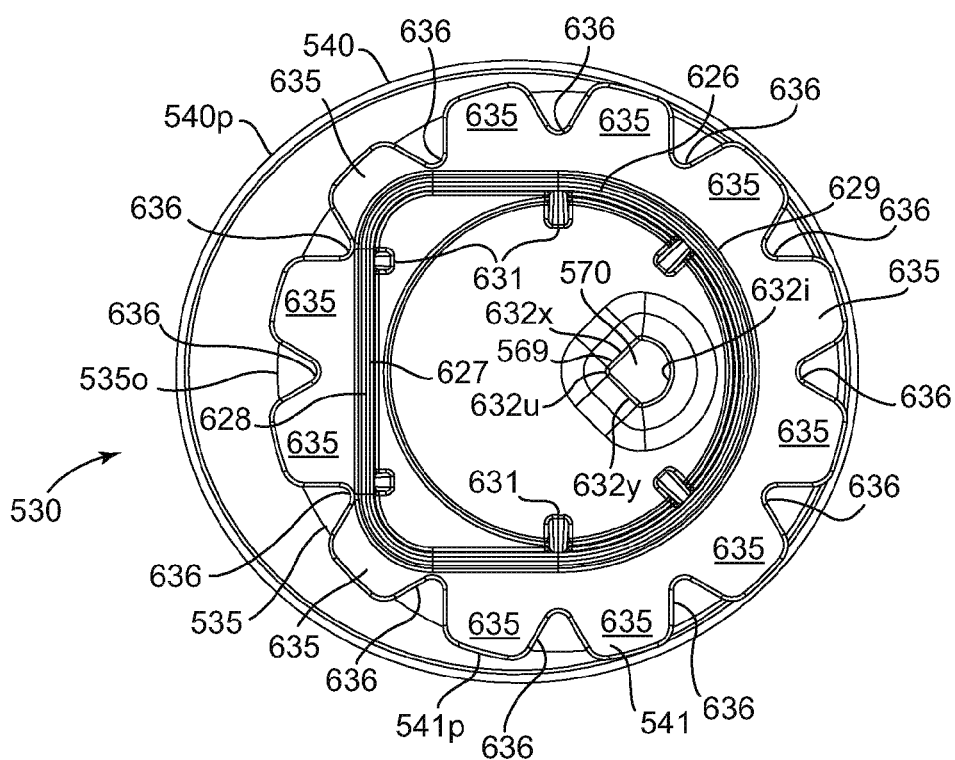
FIG. 60 is a schematic bottom plan view of the cartridge of FIGS. 56 and 57.

Attention is going to first be directed to bottom end piece 541. A bottom plan view of cartridge 530 is depicted in FIG. 60 and attention is directed thereto for understanding of selected features of bottom end piece 541. Referring to FIG. 60, bottom end piece 541 includes a downwardly extending projection 626 thereon. By "downwardly" in this context, it is meant that when the cartridge 530 is ordinary orientation for use, FIG. 56, projection 626 extends downwardly. The particular projection 626 depicted, is continuous and has a non-circular peripheral definition. The particular flange 626 depicted, is generally a D-shaped flange 627 having a straight side 628 and an opposite, arcuate, curved side 629. Typically, flange 626 has continuous, closed perimeter. Flange 626 is sized and shaped to be positionable within receiving space defined by flange 605 in bottom cover 503, FIG. 39, in only a single, radial, orientation; that radial orientation having guide projection 627 received within receiver 605. Typically, the projection 626 has a length selected to not completely block drain gaps 610, 611, FIG. 39. In FIG. 60, ribs 631 are provided for strength.

Still referring to FIG. 60, it is noted that guide receiver 569 has a interior region 570 with an inner or interior cross-sectional shape generally corresponding to the shape of guide projection 575. That is, interior 632 has cross-section generally having one arcuate side 632*i* and an opposite side with a central vertex 632*v* positioned between generally straight side sections 632*x*, 632*y*.

It can be seen that when interior 570 is appropriately sized with respect to guide projection 575, cartridge 530 can only be completely slid over guide projection 575*m* if it is in a selected single rotational orientation, due to the shape of interior of 570 and the exterior shape guide projection 575. This single rotational orientation will generally be selected so that as flange 626 is lowered toward bottom surface 573*i* of bottom cover 503, FIGS. 38 and 39, the cartridge 530 will be rotated into the rotation in which flange 626 can be received within in flange 605.

Still referring to FIG. 60, media 535 can be seen having an outer perimeter 535*o*. Further, end piece 541 can be seen to have an outer perimeter 541*p* defining a plurality of spaced projections 635 having internally directed drain recesses 636 therebetween, the drain recesses being generally directed toward a center of end piece 541. The media 535 is positioned to extend in direct axial overlap with drain recesses 636. Drain recesses 636, in direct overlap with media 535 will provide an axial drain arrangement through end piece 541, generally analogous to those described previously herein.

Still referring to FIG. 60, it is noted that upper end piece 540 has an outer perimeter 540*p*, defining a generally elliptical shape, including an elliptical shape for seal member 550. Further, it is noted that media 535 (and end piece 541, but for recesses 636) generally define an outer circular perimeter; and. that circular perimeter is offset with respect to a center of the ellipse defined by end piece 540. This eccentric positioning between the media 535 (and end cap 541), with respect to a center of elliptical end cap 540, provides for increased flow volume around a portion of cartridge 530.

Figure 59:
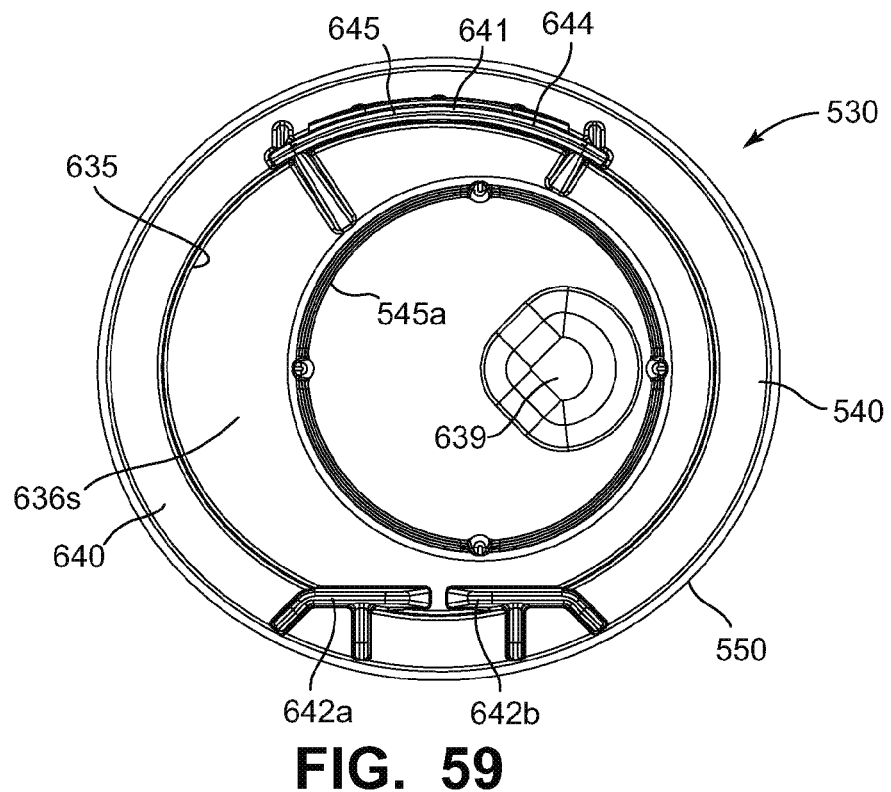
FIG. 59 is a schematic top plan view of the cartridge of FIGS. 56 and 57.

Attention is now directed to FIG. 59, a top plan view of filter cartridge 530. Here, end piece 541 is viewable, with its elliptical outer perimeter 541*p*, and with elliptical seal member 550 positioned thereon. Due to the elliptical shape, perimeter 541*p* (an elliptical seal 550), the cartridge 530 can be only oriented, relative to seal surface 551, FIG. 36 in two possible orientations. Which one of the two orientations, will be governed by the rotational orientation of the bottom cover 503 on the housing body 502.

In FIG. 59, one can view through aperture 545*a* to view a outer surface of receiver projection 639 extending upwardly.

Figure 58:
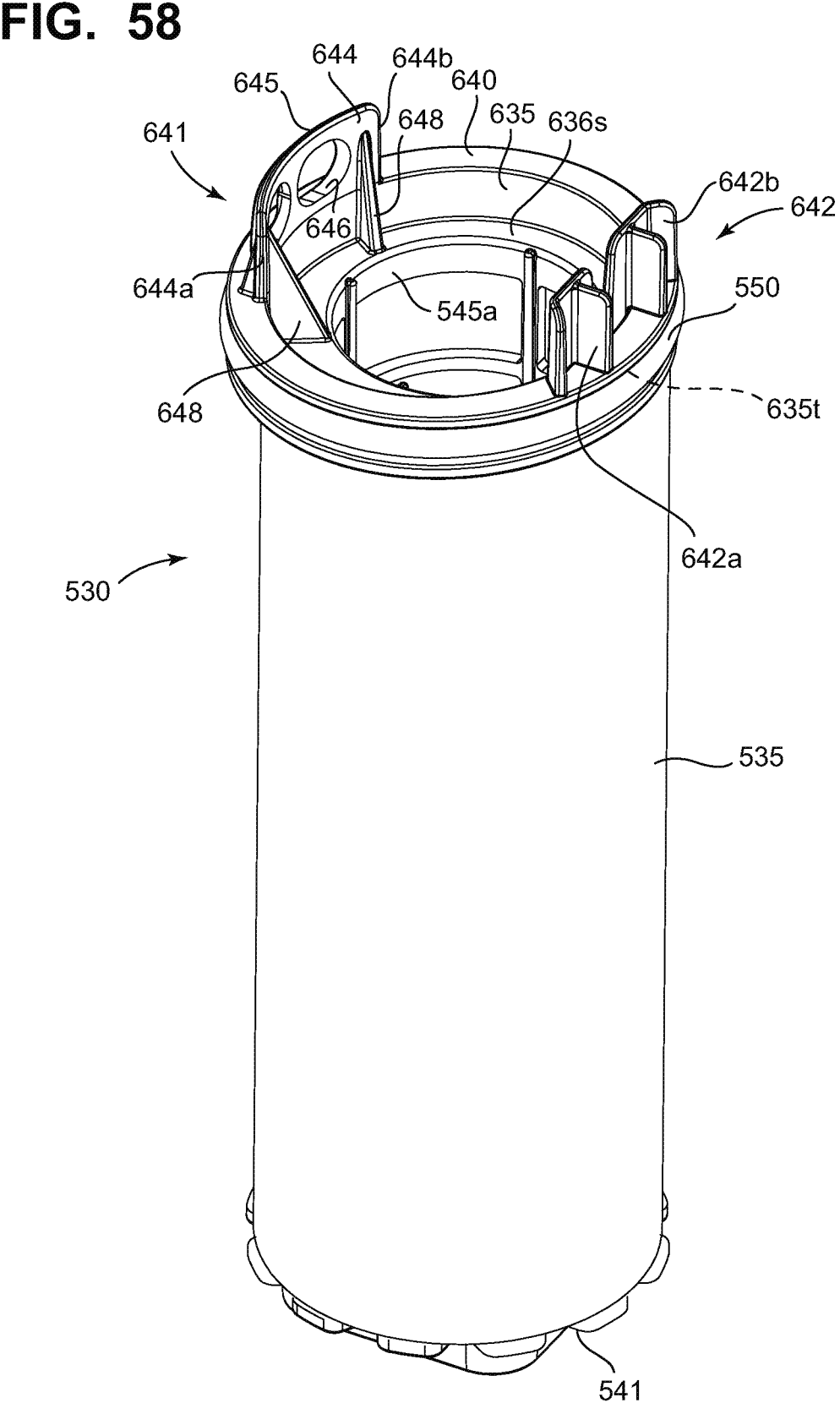
FIG. 58 is a schematic top perspective view of the filter cartridge of FIGS. 56 and 57.

Attention is now directed to FIG. 58, a top perspective view of cartridge 530. Here, upper surface detail of end member 540 can be seen.

Referring to FIG. 58, end piece 540 can be seen to have an upwardly directed elliptical perimeter projection or flange 635 defining a generally elliptical interior shape 635*i*. Flange 635 generally defines, (at an exterior thereof) trough 635*t*, for seal member 550.

Still referring to FIG. 58, flange 635 extends upwardly from inner shelf 636. Aperture 545*a* is defined through shelf 636*s*. Thus, shelf 636*s* provides a surface of end piece 541 which surrounds aperture 545*a*. Flange 635 extends upwardly therefrom, in a direction away from media 535. The flange 635*a* provides a ring around surface 636*s*, for containing liquid thereon. Flange 635 defines an elliptical perimeter, for housing seal member 550.

Above flange 635 is provided upper peripheral end ring or rim 640. Rim 640 includes first projection member 641 extending upwardly therefrom and a second, generally opposite projection arrangement 642 extending upwardly therefrom. That is, projection arrangements 641, 642 each generally extend, on end member 540, in a direction away from media 535 and end member 541; and, end members 641, 642 are positioned radially spaced from one another on opposite sides of aperture 545*a*.

In general, projection arrangement 641 includes: handle member 644 having an upper arcuate rim or extension 645, and an aperture arrangement 646 extending therethrough, under rim 645. Aperture arrangement 646 will typically defined sufficiently large for passage of fingers or a portion of fingers therethrough, to assist in using handle member 644 to manipulate and handle cartridge 530.

Each one side of arcuate handle member 644, indicated generally at 644*a*, 644*b* includes a support flange 648. The particular handle member 644 depicted is oriented to in bisecting overlap with the short axis of the elliptical seal surface.

In general, when cartridge 530 is positioned in housing 501 in a single possible rotational orientation thereto, handle member 644, i.e. the projection 641, will be positioned oriented radially along a central portion of 585*s*, of ramp 585.

Referring again to FIG. 58, positioned radially opposite projection 641 is projection arrangement 642. Projection arrangement 642 generally comprises two spaced upwardly extending projections 642*a*, 642*b*. The projection arrangement 642 is generally sized and positioned to interfere with projection member 628, on cover 505, FIG. 47, unless a proper cover 505 is selected, for engagement with the cartridge 505. That is, when the bottom cover 503 is mounted on the central body 502, in one of two selected orientations, the cartridge 530 can only be installed in a single rotational orientation. A proper cover 505 needs to be selected for that orientation. If the wrong one of two possible covers is selected, an interference will occur between projection 628 and projection arrangement 642.

In general, when the proper cover 505 is selected, arcuate projection 628 will align with handle member 644 radially; generally positioned outwardly radially therefrom.

Figure 57:
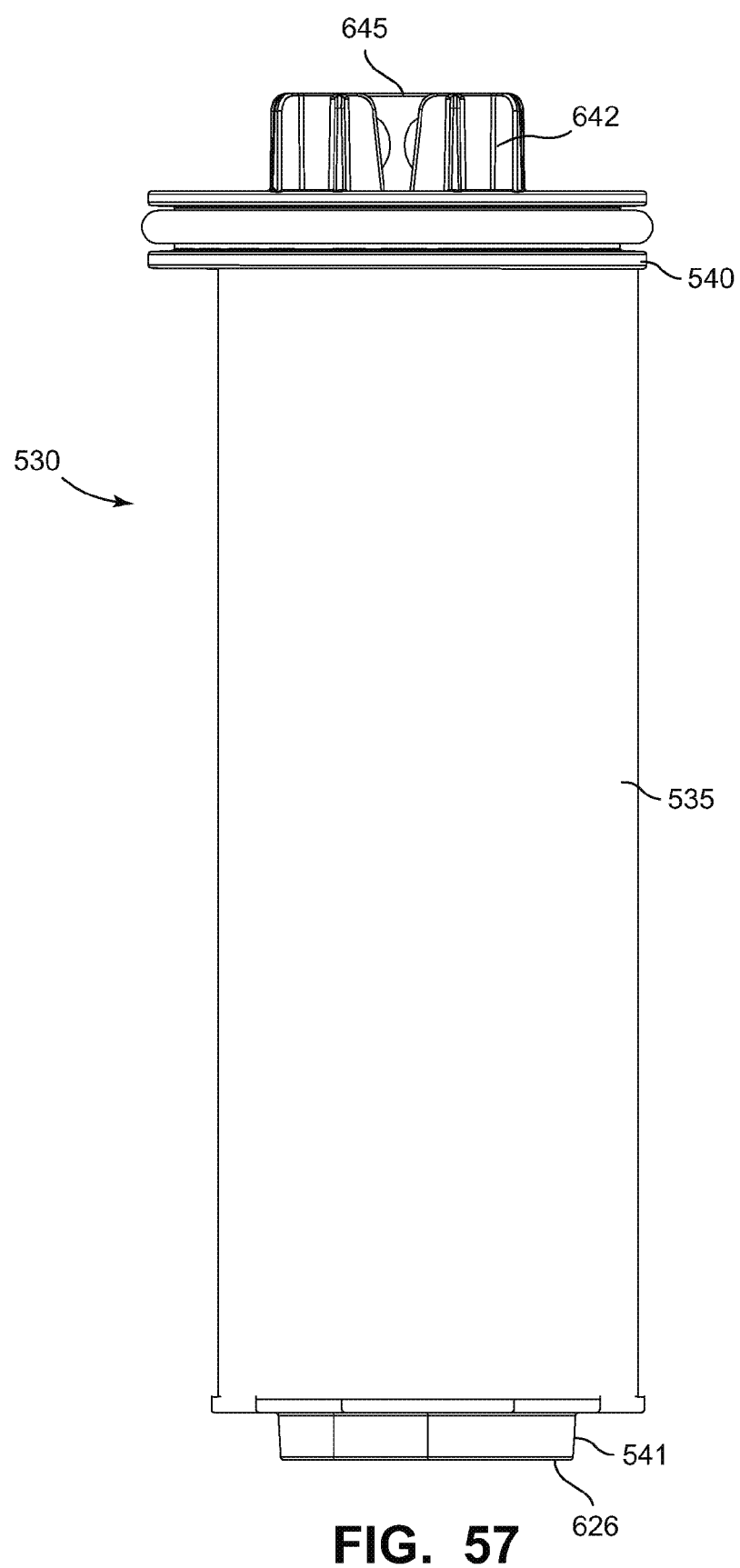
FIG. 57 is a schematic side elevational view taken in a general direction of arrow 57u, FIG. 56.

In FIG. 57, a second side elevational view of cartridge 530 is depicted, generally taken in the direction of arrow 57*u*, FIG. 56. The eccentric alignment between the elliptical perimeter of end piece 540, and the circular perimeter to media 535 is readily viewable.

In FIGS. 61-71, support 536 is viewable in various views, for an understanding of selected detail on end pieces 540, 541, and detail of core 539. Typically support 536 will comprise a single integral piece, for example molded from plastic.

Figure 61:
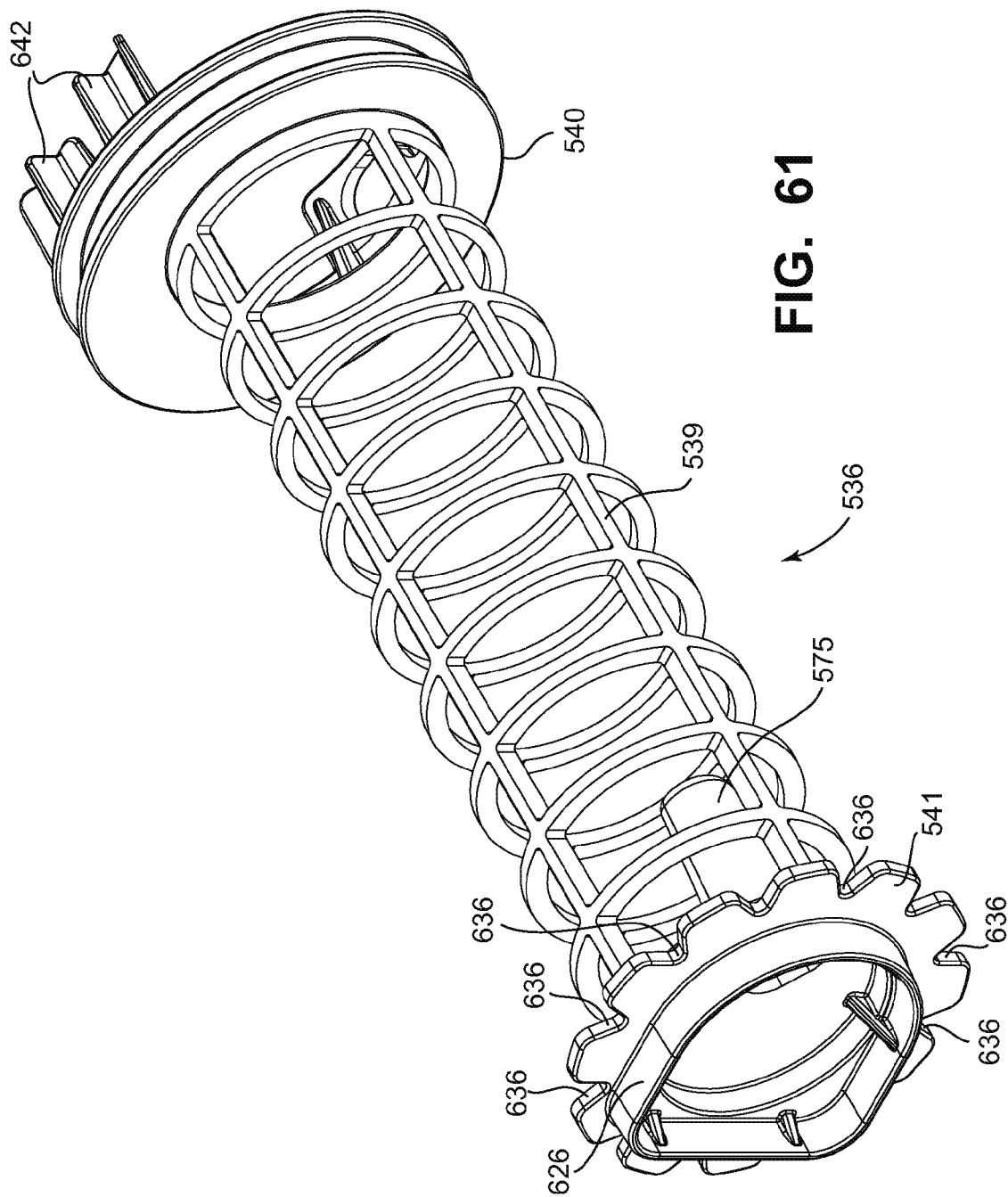
FIG. 61 is a schematic bottom perspective view of a component of the filter cartridge of FIG. 56.

Referring to FIG. 61, a bottom perspective view is provided. Projection 626 is viewable, as well as recesses 636. Core 539 can be seen connecting end member 541 to end member 540.

Figure 62:
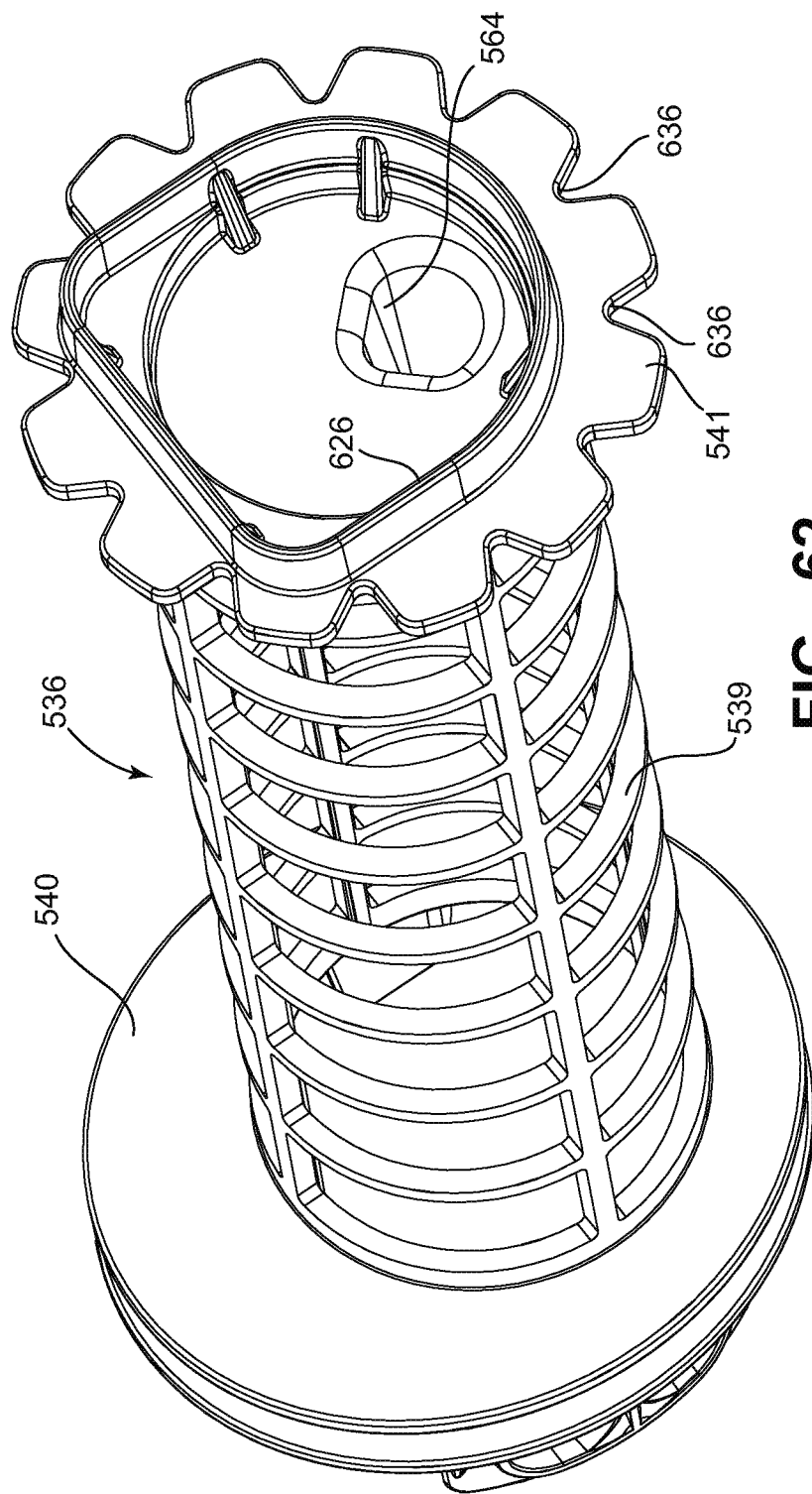
FIG. 62 is a schematic alternate bottom perspective view of the component of FIG. 61.

In FIG. 62, a second bottom perspective view is provided, receiver 564 with its non-circular shaped interior can be seen, surrounded by flange 626.

Figure 63:
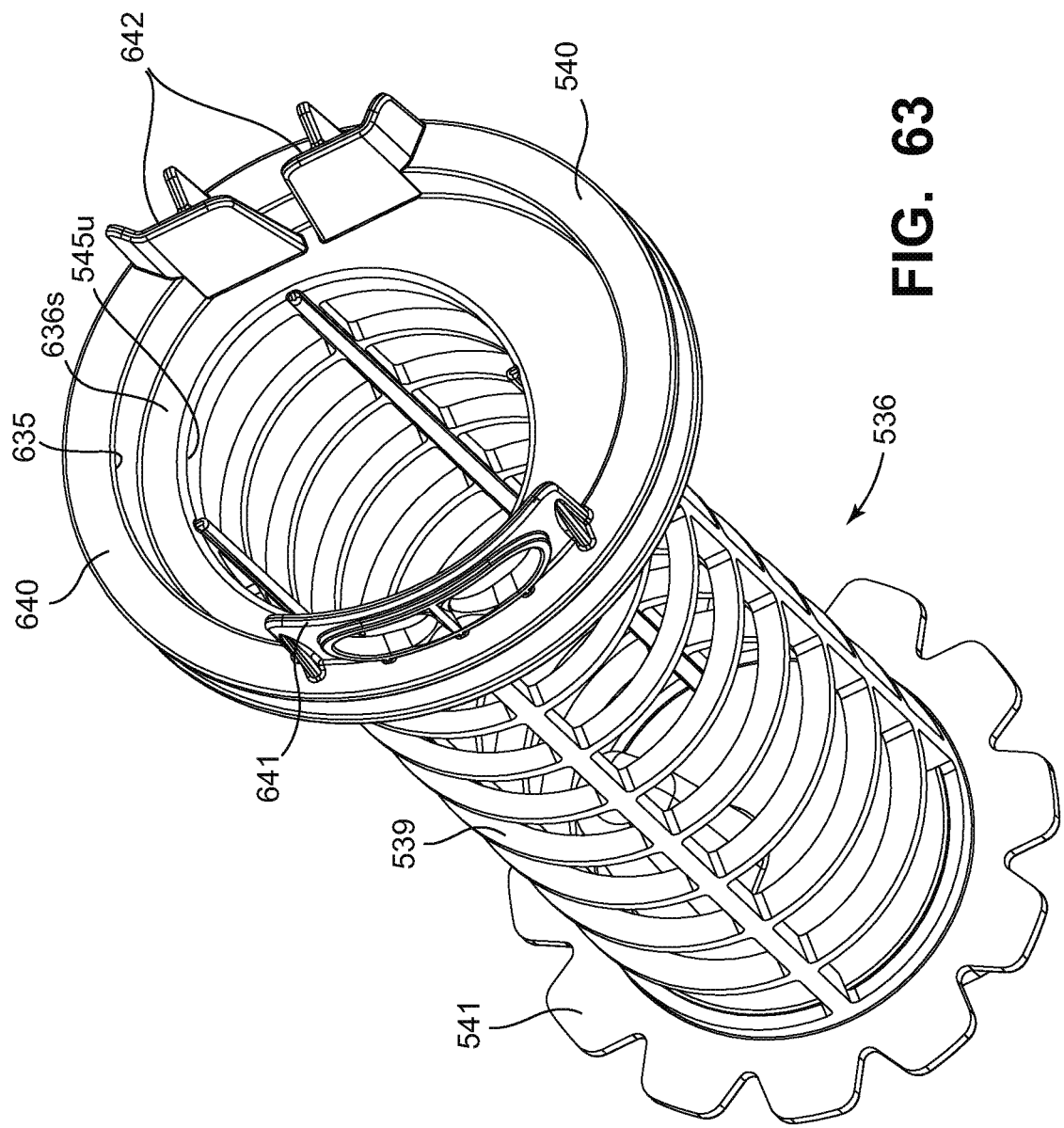
FIG. 63 is a schematic top perspective view of the component of FIG. 61.

In FIG. 63, a top perspective view is provided. End piece 541 can be inspected with projections 641 and 642 thereon. Also, aperture 545*a* extending through surface 636*s*, providing gas flow communication to an interior of core 539 can be viewed.

Figure 64:
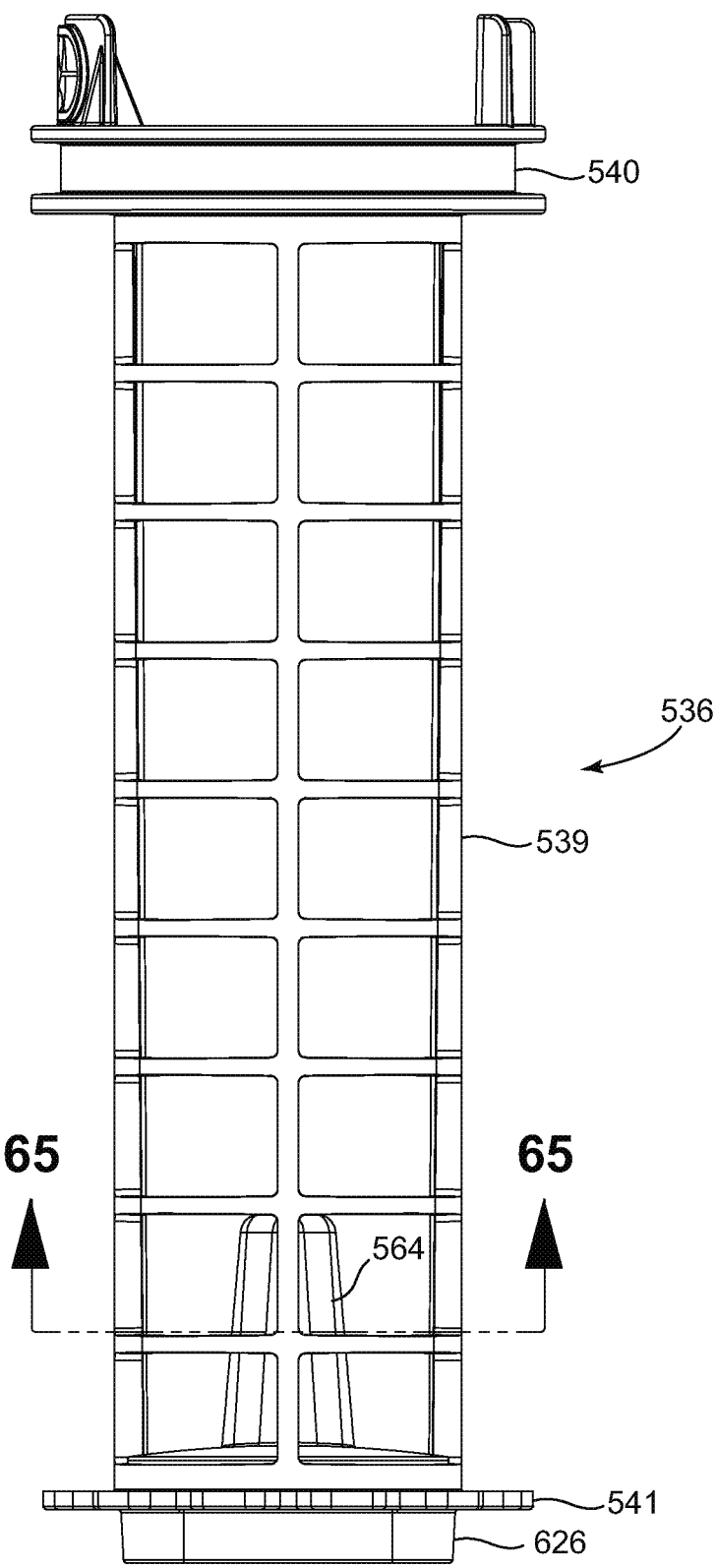
FIG. 64 is a schematic side elevational view of the component of FIG. 61.
Figure 65:
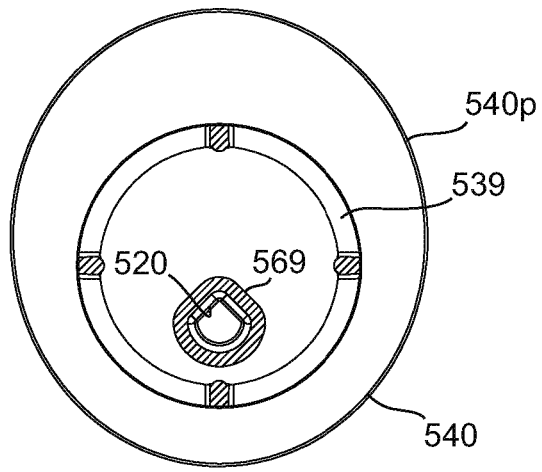
FIG. 65 is a schematic cross-sectional view taken generally along lines 65-65, FIG. 64.

In FIG. 64, a side elevational view of member 536 is provided. In FIG. 65, a cross-sectional view taken along line 65-65, FIG. 64 is viewable. Here, the internal cross-sectional definition to receiver 569 can be viewed. Also the elliptical shape to perimeter 540*p* is readily seen.

Figure 66:
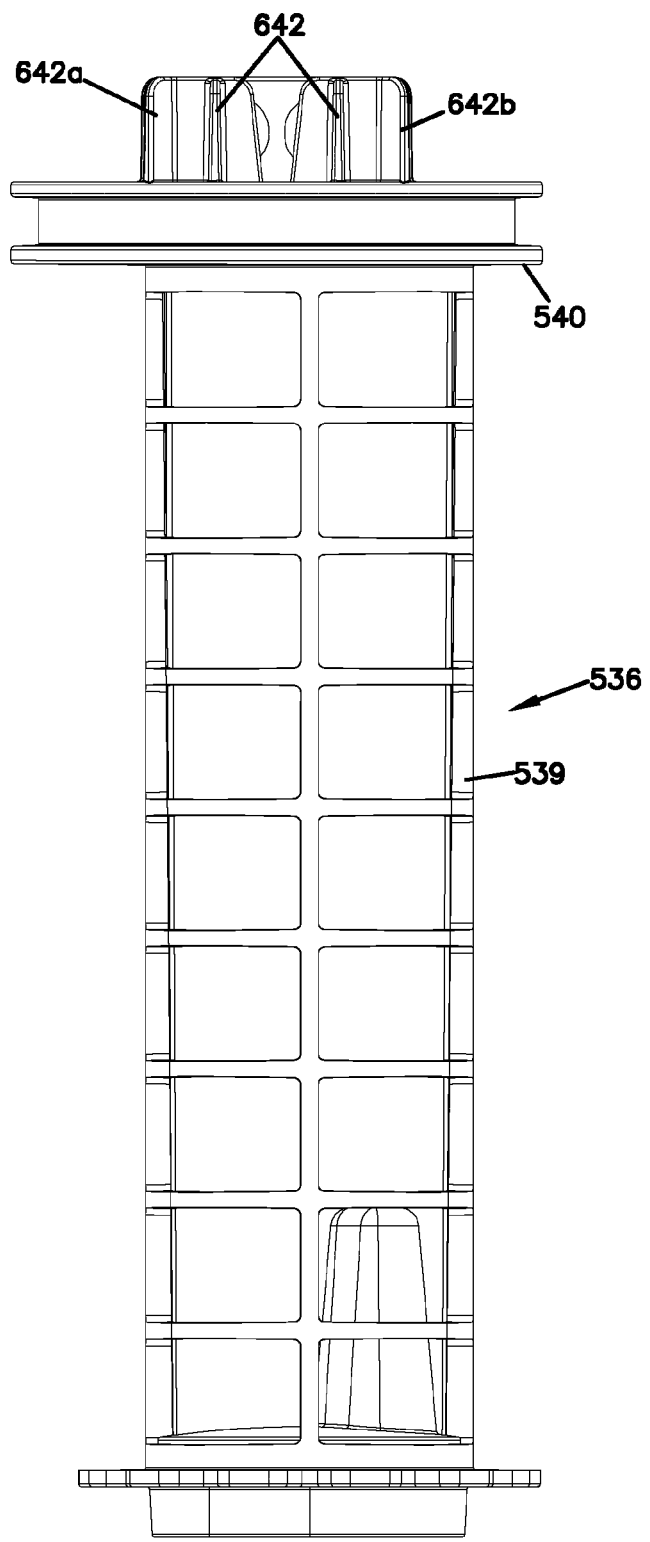
FIG. 66 is a schematic alternate side elevational view of the component of FIG. 61.

In FIG. 66, an alternate side elevational view is shown. Here, the eccentric positioning of core 539 relative to elliptical perimeter of end member 540 can be seen. Also, spaced projections 642*a*, 642*b* can be seen.

Figure 67:
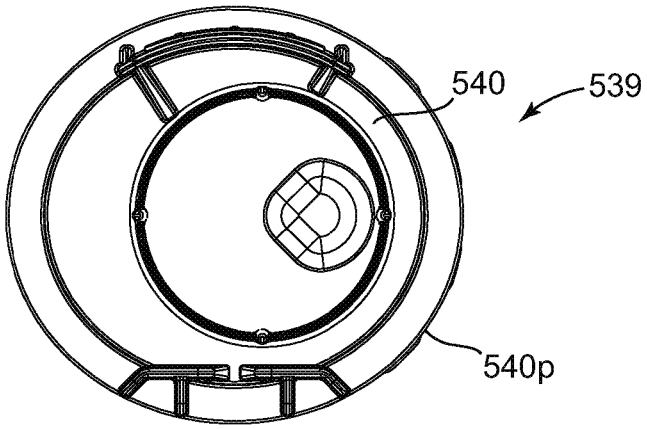
FIG. 67 is a schematic top plan view of the component of FIG. 66.
Figure 68:
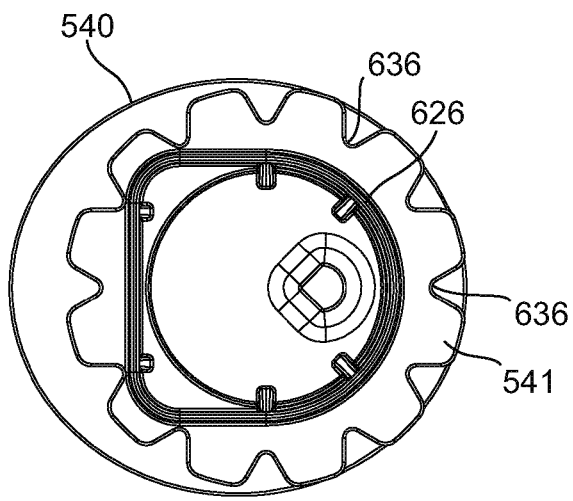
FIG. 68 is a schematic bottom plan view of the component of FIG. 66.

In FIG. 67, a top plan view of core member 539 can be seen. The elliptical perimeter 540*p* is viewable. FIG. 68 is a bottom plan view of core 539. D-shape flange 626 is readily viewable, as well recesses 636 in end piece 541.

Figure 69:
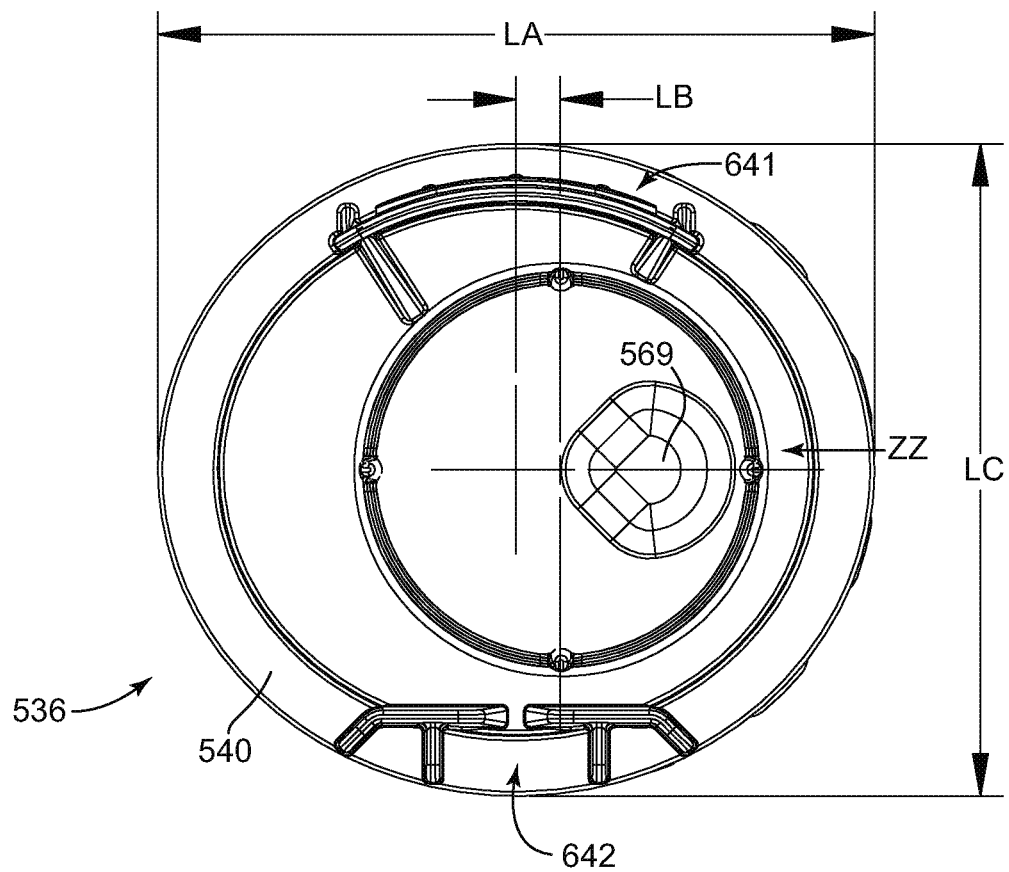
FIG. 69 is the second schematic top plan view of the component of FIG. 66.

In FIG. 69, a top plan view of core 539, with dimensions as indicated is provided. Example dimensions would be as follows: LA=81.2 mm; LB=5 mm; LC=74 mm.

Figure 70:
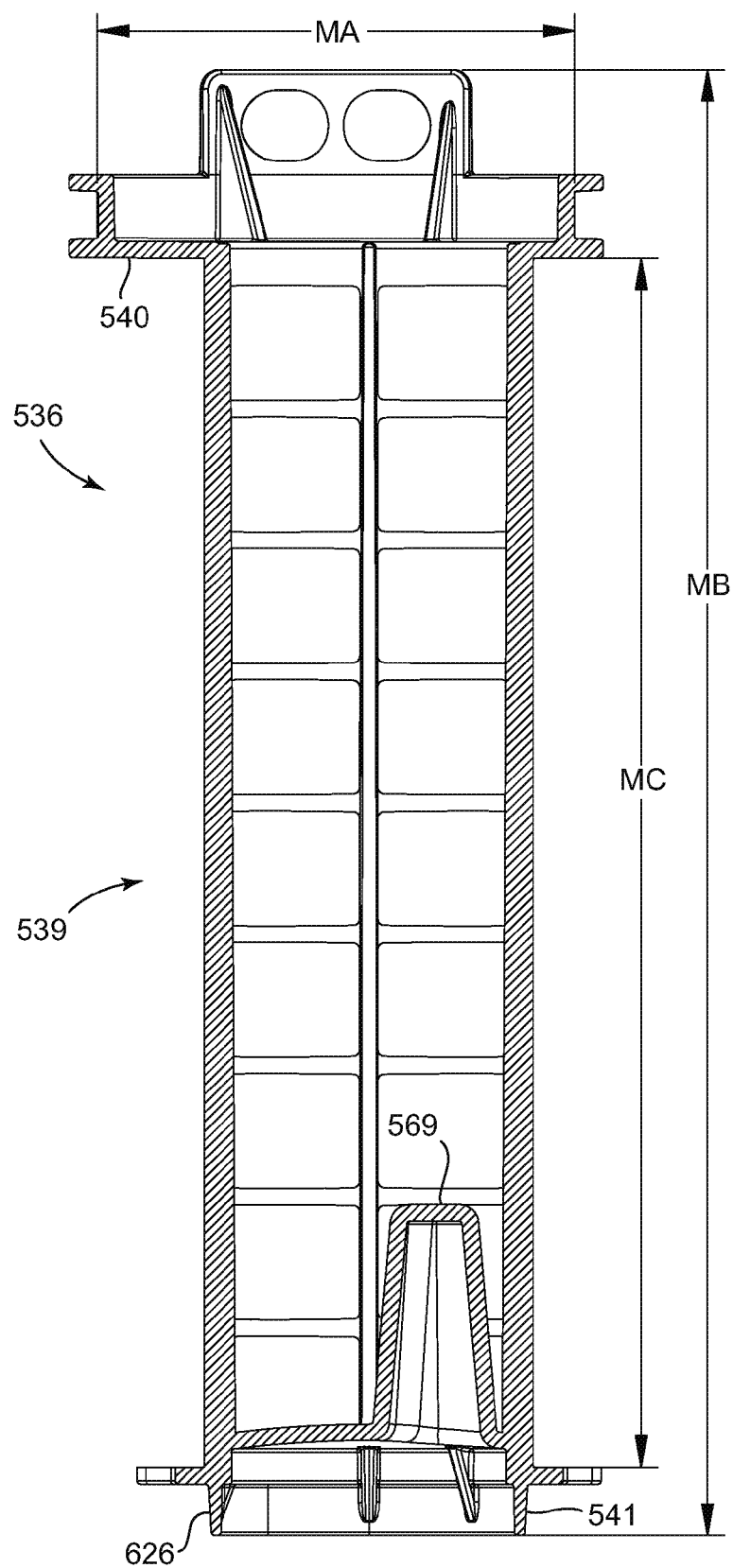
FIG. 70 is a schematic cross-sectional view of the component of FIG. 66.

FIG. 70, a cross-sectional view of support 536 and example dimensions are provided as follows: MA=72.63 mm; MB=223.1 mm; and, MC=184 mm.

Figure 71:
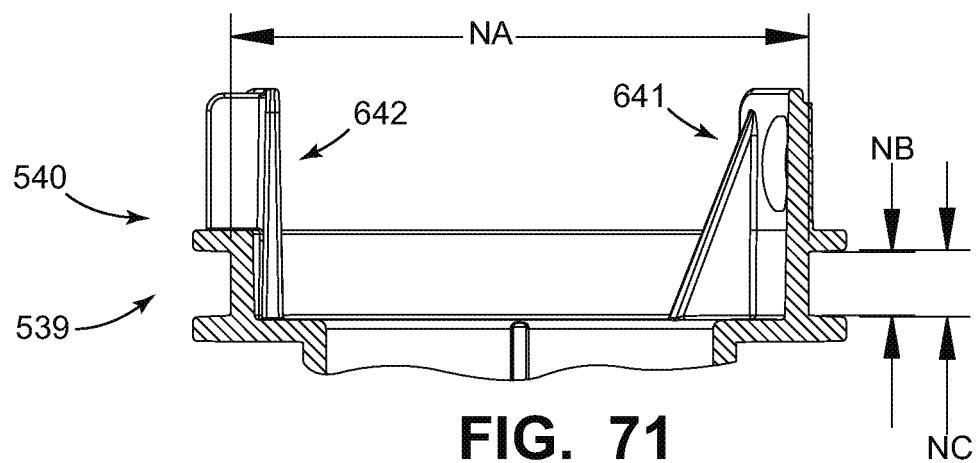
FIG. 71 is a schematic, fragmentary cross-sectional view of a portion of the component of FIG. 66.

In FIG. 71, a fragmentary cross-sectional view taken generally in the direction of arrow of ZZ FIG. 69, is provided. Example dimensions are as follows: NA=65.44 mm; NB=7.2 mm; and, NC=7.57 mm.

Figure 72:
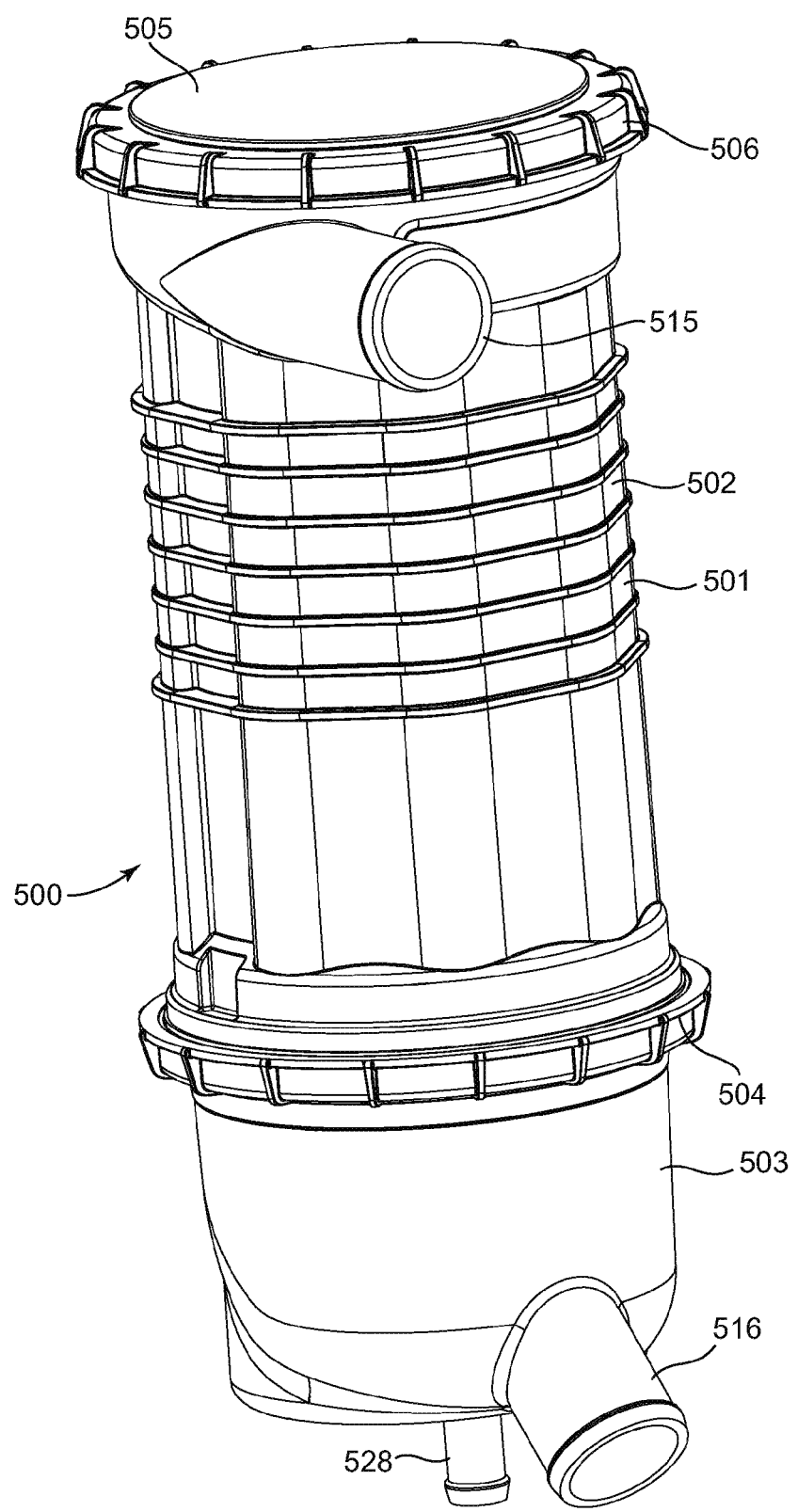
FIG. 72 is a schematic, perspective view of a third alternate embodiment of a crankcase ventilation filter assembly according to the present disclosure.
Figure 73:
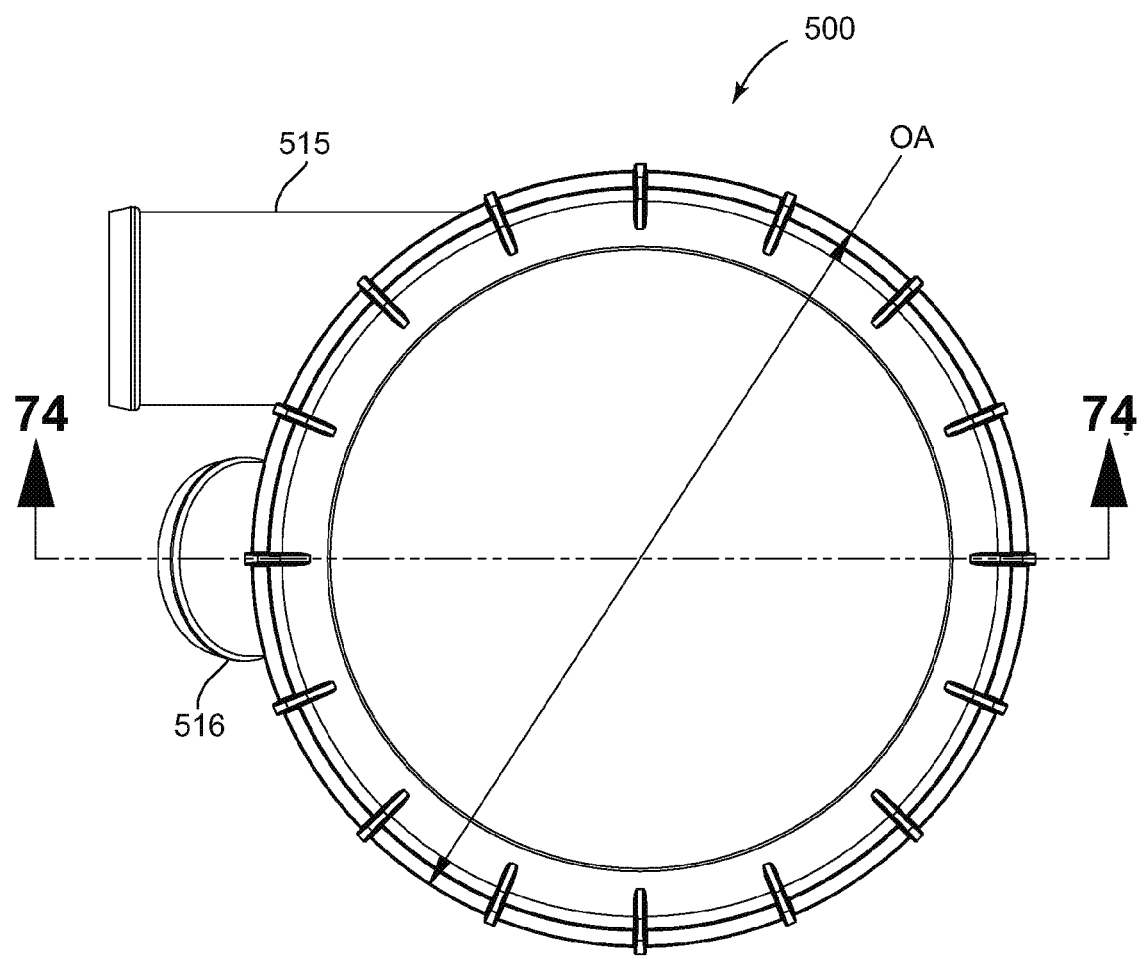
FIG. 73 is a schematic, cross-sectional view of the assembly depicted in FIG. 72.
Figure 74:
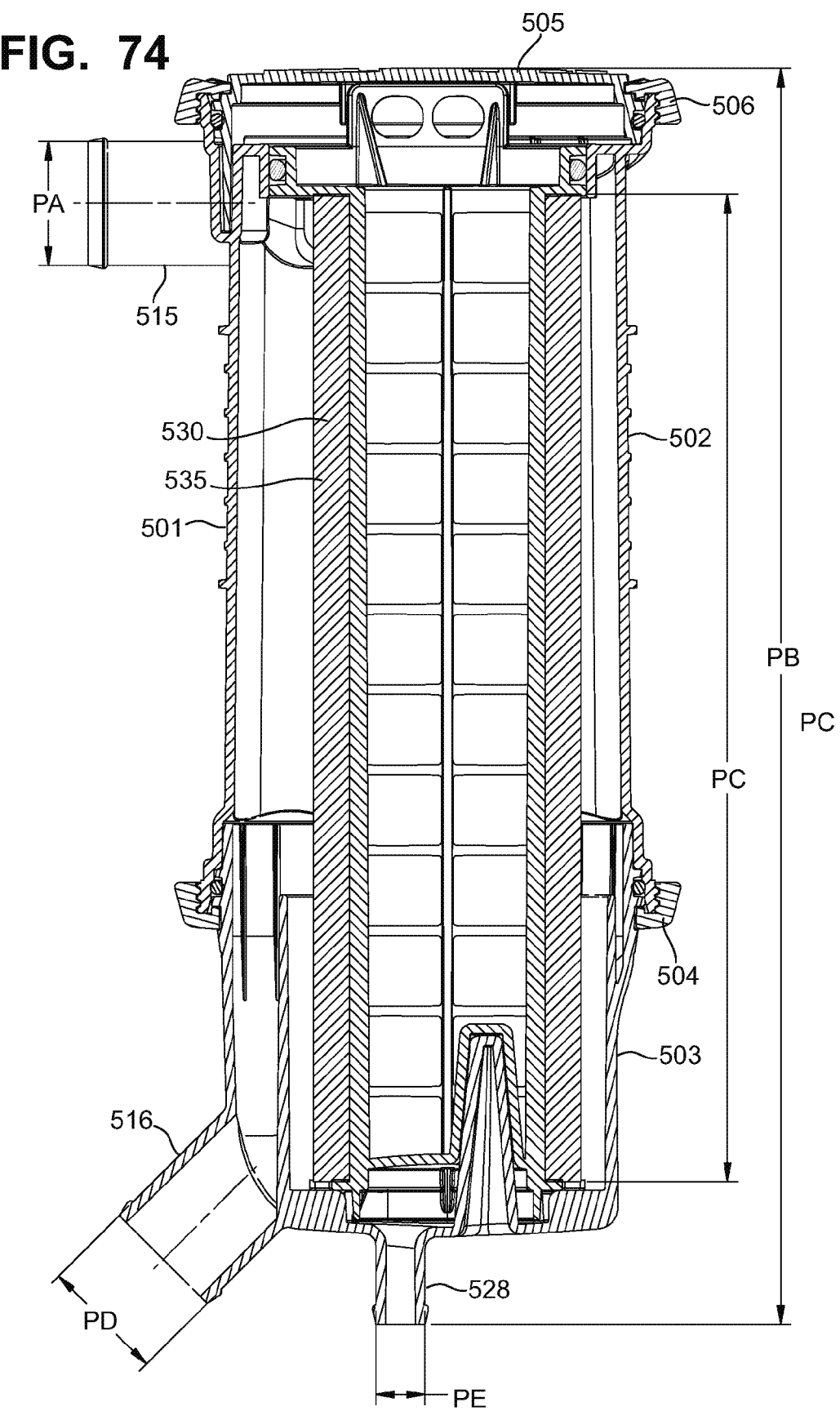
FIG. 74 is a schematic top plan view of the assembly of FIG. 72.

It is noted that the principles described herein can be applied in a variety of sizes of arrangements. It is anticipated that the dimension initially varied will typically be length of the cartridge 530 and thus length of the housing 501 to receive the cartridge. In FIGS. 72-74, an example alternate arrangement modified in this manner is depicted.

In FIG. 72, a side perspective view is provided. As the parts are analogous, similar numerals will be used, thus the assembly 500 includes housing 501 with a central housing body section 502, a bottom cover 503, a top member 505 and locking rings 504, 506. Inlet arrangement 515, outlet arrangement 516 and bottom drain 528 are viewable. The primary difference between the assembly of FIG. 72 and the assembly of FIG. 29, is the length of central housing body 502 (as well as the length of the internally received cartridge).

In FIG. 73, a top plan view is provided. In FIG. 74, a cross-sectional view taken along line 74-74, FIG. 73 is provided. In FIG. 73, example dimensions are provided as follows: OA=127.3 mm. In FIG. 74, a cross-sectional view, example dimensions are provided as follows: PA=31.8 mm; PB=321.8 mm; PC=253 mm; PD=31.8 mm; and, PE=12.7 mm.

Attention is now directed to FIGS. 27-71 with respect to operation and servicing of assembly 500. Referring first to FIG. 27, the assembly 500 will be assembled by positioning bottom cover 503 and top cover 505 on housing central body section 502, with cartridge 530 positioned therein. Once assembled, FIG. 29, crankcase ventilation gases to be filtered would be directed in the direction of arrow 549 into inlet 515. Referring to FIG. 35, these gases will be directed above ramp surface 585*s*, in the upwardly directed helical pattern to surface 585*s* will generally direct the gases above surface 536*s*, of end member 540, FIG. 29. This gas flow will then enter through aperture 545*a* into open interior 545 of media 535. The gases will pass outwardly to annulus 501*a*. The gases will move into gap 581, and exit aperture 516, FIG. 29, in the direction of arrow 550. Moisture collected (condensed) on internal surface 501*i* will generally drain into gap 581, and exit aperture 516 with the gases. Liquid coalesced and drained within the media 535 will move downwardly, into region 565 and then drain outwardly through drain 528.

It is noted that flow director 627, FIG. 47, will help direct the gases over end member 540.

Still referring to FIG. 29, when servicing is desired, one of the other of top cover 505 and bottom cover 503 is removed. Initially let us assume servicing from the top. When this is the case, ring 506 is loosened, allowing cover 505 to be removed. The cartridge 530 can be grasped by the handle arrangement 644 and be pulled upwardly, opening the seal 550. A new cartridge can be installed. As the new cartridge 530 is lowered through opening 521, eventually guide receiver 569 will engage in guide member 575. This will tend to rotate the cartridge 530 in a proper single rotational orientation for further installation. As further installation occurs, projection 626 is received within regions receiver 606; and, elliptical seal member 555 engages elliptical surface 551. Cover 505 is then replaced, by the tightening of ring 506.

When servicing is from the bottom, ring 504 is loosened, allowing cover 503 to be removed. The cartridge 530 will be pulled out the housing 501 and be replaced. The new cartridge, for example can be mounted on cover 503, with engagement between cartridge receiver 569 and guide projection 575. The new cartridge 530 will then be in the proper rotational orientation so that when the cover 503 is pushed upwardly, and gap 601 engage projections 590, seal 550 will be oriented for positioning in the elliptically shaped flange 551. This will also be a proper rotational orientation with respect to projection arrangement 628 and cover 505.

Still referring to FIG. 29, it is noted that elliptical shaped end member 541 provides a region 700 and annulus 501*a*, which is relatively wide, to facilitate air flow. Region 700 includes two sections, region 701 and central body section 502, and region 702 in bottom cover 503

It is noted that when it is desirable to position bottom cover 503, FIG. 29, in an orientation rotated 180°, cartridge 530 will also be rotated, so that gap 700 will be open on an opposite of housing 501, from that shown in FIG. 29. Of course, as discussed above, if bottom cover 503 is rotated 180° from the orientation shown in FIG. 29, then an alternate cover 505*a* would be needed. Typically, the alternate cover would have a mirror image shape, with respect to structure 620, 630, 627 and 628, FIG. 46, when used in an assembly with bottom cover 503 rotated 180° relative to the orientation shown in FIG. 29.

It is noted that many of the features and principles characterized in connection with the embodiment of FIGS. 27-74, can be implemented in association with the features of the previously described embodiments; and, many of the features of the previously described embodiments can be implemented in association with the features of the embodiment of FIGS. 27-74. Further, terminology used in association with various ones of the embodiments can be applied to analogous features in alternatively characterized embodiments.

It is noted that assembly is not required to include all of the specific detailed features characterized herein, in order to obtain some benefit according to the present discloser.

V. Some Concluding Comments

According to the present disclosure, features usable in crankcase ventilation filter arrangements are described. Also described are the resulting crankcase ventilation filter arrangements and components therefor. Methods of use, servicing and assembly are also described. There is no specific requirement that an arrangement include all of the features characterized herein, to obtain some advantage according to the present disclosure.

According to an aspect of the present disclosure, a crankcase ventilation filter cartridges is provided. In one aspect a crankcase ventilation filter cartridge is provided that includes first and second, opposite, end members; and, filter media positioned between the first and second, opposite, end members and surrounding an open filter interior. In examples described herein, the first end member comprises an upper member having an aperture therethrough and a non-circular, typically elliptical, outer perimeter including a seal member therethrough defining a non-circular, typically elliptical, seal perimeter. Further, the second end member has a receiver projection projecting into the open filter interior and toward the first end member. In an example arrangement described, the second end member is a closed end member.

In an example assembly, the crankcase ventilation filter cartridge has media surrounding a media central longitundal axis and an elliptical seal perimeter defined in the seal plane extending orthogonal to media central longitundal axis. In an alternate embodiment described herein, the elliptical seal perimeter is defined in a seal plane extending at an acute angle to the central longitundal axis.

In typical arrangement, the closed receiver projects toward the first member, from the second end member, a distance of at least 5% of a distance between opposite ends of the media, typically at least 10% of this distance, and in typical examples, an amount within the range of 10-30% of this distance.

In an example arrangement described herein, the central receiver is closed and has non-circular, inner, cross-sectional shape. By "closed" it is meant that the receiver does not have an aperture therethrough, in communication with the open interior of the cartridge.

In one example, the closed central receiver has a D-shaped inner cross-sectional shape. In another, the closed central receiver has a cross-sectional shape with an arcuate side and an opposite side with a central vertex in two straight side sections.

In an example arrangement described herein, the first end member includes an arcuate handle member thereon, having an arcuate upper edge extending over an arcuate extension of at least 30° and not more than 80°. The upper edge may conform to a circular shape, or may be somewhat elliptical. Typically, the handle member has at least one handle aperture therethrough, under the upper edge. In typical arrangements, the upper arcuate edge of the handle member extends upwardly to a location of at least 20 mm above the media, when the cartridge is positioned vertically for use.

In typical arrangements described herein, the crankcase ventilation filter cartridge is configured such that the first end member includes: an upper end surface surrounding the central aperture; and, an elliptical perimeter flange or projection extending above the upper end surface in continuous extension surrounding the central aperture.

Also in typical assemblies, a permeable tubular filter support extends between the first and second end members, when the filter media is positioned around the permeable tubular filter support. In typical arrangements, the first end member, the second end member and the tubular filter support comprise portions of a single molded support.

In typical arrangements, the second end member includes an outer perimeter comprising a plurality spaced peripherally projecting projections with drain recesses therein, the drain recesses including a portion overlapped by bottom end of the media. This allows for direct axial drain downwardly from the media, in use.

In typical arrangements, the second end member includes a non-circular projection extending in a direction away from the media and the first end member. The non-circular projection in several embodiments is depicted as a D-shaped member; i.e. a member having a D-shaped perimeter. Typically, the non-circular projection has a continuous closed outer perimeter, i.e. does not include apertures therethrough.

In some example arrangements according to the present disclosure, the first end member has an elliptical perimeter shape defining a longer central axis and a short axis that bisects the longest central axis at right angles thereto, to define an ellipse center at the intersection. Further, the filter media surrounds an open filter interior to define a longitundal media central axis orthogonal to the longest central axis and the short axis in the elliptical perimeter of the first end member. In a typical arrangement, the filter media is positioned such that the longitundal axis of the filter media is eccentrically positioned relative to the ellipse center of the first end member. Typically, the filter media is positioned such that the longitundal central axis of the media intersects the longest central axis of the ellipse.

In typical arrangements, the cartridge includes a handle member having an upper arcuate edge centered in bisecting overlap with a short axis of the ellipse defined by the elliptical perimeter of the first end member.

In an example arrangement described herein, a projection arrangement is positioned on the first end member projecting away from the media and positioned opposite the handle member.

In an example arrangement described, the housing seal member is positioned around the first member at a location entirely above the filter media; and, the media defines an outer perimeter with a cross-sectional perimeter definition that is not the same as the outer perimeter of the first end member. In an example depicted, a generally circular cross-sectional perimeter to the media is provided.

In an aspect of the present disclosure, a crankcase ventilation filter cartridge is provided that comprises first and second, opposite, end members and filter media positioned between the first and second, opposite, end members and surrounding an open interior. In this example, the first end member comprises and upper member on the cartridge having an aperture therethrough and including a seal member therearound. Further, the second member is closed and includes a D-shaped projection thereon projecting in a direction away from the media in the first end member. This crankcase ventilation filter cartridge can include features such as those previously characterized above.

Also according to an aspect of the present disclosure, a crankcase ventilation filter cartridge is provided which includes: first and second, opposite, end members; filter media positioned between the first and second, opposite, end members and surrounding the open filter interior; the first end member comprising an upper member having an aperture therethrough and a seal member therearound; and, the second member being closed and including a closed receiver projection therein projecting toward the first end member at least 5% of a distance between opposite ends of the media, the receiver projection having a non-circular, inner cross-sectional shape. Such a crankcase ventilation filter cartridge can include other features as characterized herein above.

According to yet another aspect of the present disclosure, a crankcase ventilation filter cartridge is provided comprising a media support including first and second end members with a permeable support tube extending therebetween; the end members of the support tube comprising a single integral molded piece. In this arrangement, filter media is positioned around the support tube in extension between the first and second end members; and, a housing seal member is positioned around the first end member at a location entirely above the filter media, when the cartridge is positioned within the first end member directed upwardly. This crankcase ventilation filter cartridge can include features as generally characterized herein above.

Also according to the present disclosure, a crankcase ventilation filter assembly is provided including a housing having a gas flow inlet, a gas flow outlet and a lower drain; and, a filter cartridge in accord with one or more of the previous characterizations is operably and removably positioned within the filter interior. The housing can be configured to be openable from both the top and bottom, to allow for servicing from either the top or the bottom, as selected from the assembly. Further indexing arrangements can be included within the assembly, as generally characterized herein.

In another aspect of the present disclosure, a crankcase ventilation filter assembly is provided that includes a housing having a housing central body section, a housing top and a housing bottom cover. The housing includes a gas flow inlet arrangement and a gas flow outlet arrangement.

In this example assembly, the gas flow inlet arrangement and gas flow outlet arrangement are in the housing central body section. In an alternate embodiment, the gas flow inlet is in a housing central body section, and the gas flow outlet arrangement is in the housing bottom cover.

The housing central body section includes a side wall defining an interior and first and second opposite, open, ends. The housing central body section defines a filter cartridge sealing surface at an interior thereof.

The housing top is removably secured over the first open end of the housing body; and, the housing bottom cover is removably secured over the second open end of the housing body. The housing bottom cover includes a liquid drain therein.

A filter cartridge is removably (operably) positioned within the housing. The filter cartridge includes a housing seal thereon removably sealed to the filter cartridge sealing surface in the housing central body section. The filter cartridge is sized to be removable from a remainder of the housing, when the housing top is separated from the housing body, by passage of the filter cartridge through the first open end of the housing body. Further, the filter cartridge is also sized to be removable from a remainder of the housing when the housing bottom (cover) is separated from the housing body, by passage of the filter cartridge through the second open end of the housing body.

In an example crankcase ventilation filter assembly in accord with the present disclosure, the housing top includes a (first) member of a housing top-to-housing body rotational indexing arrangement thereon; and, the housing central body section includes a (second) member of a housing top-to-housing body rotational indexing arrangement thereon. The housing top-to-housing body rotational indexing arrangement resulting from these members is configured such that the housing top can only be operably installed on the housing body in a single, selected, rotational orientation between the two. In an example described, the first member of the housing top-to-housing body rotational indexing arrangement comprises an arcuate, depending, flange on the top cover; and, the second member of the housing top-to-housing body rotational indexing arrangement comprises a projection arrangement defining a receiver space on the housing central body section defined to receive the arcuate depending flange in only one rotational orientation.

In an example arrangement as described herein, the housing bottom includes a (first) member of housing bottom-to-housing body rotational indexing arrangement thereon; and, the housing central body section includes a (second) member of a housing bottom-to-housing body rotational indexing arrangement thereon. The housing bottom-to-housing body rotational indexing arrangement, resulting from these members, is configured such that the housing bottom can only be operably installed on the housing central body section in defined orientation(s) between the two.

In an example embodiment described herein, the housing bottom-to-housing body rotational indexing arrangement is configured to allow only one selected or defined orientation between the housing bottom and the housing central body section. In an alternate embodiment described herein, the housing bottom-to-housing body rotational indexing arrangement is configured to allow the housing bottom to be installed in the housing central body section either one of two selected rotational orientations, the particular example having these orientations positioned 180° (rotationally) apart.

In an example described, the first member of the housing bottom-to-housing body rotational indexing arrangement comprises at least one arcuate flange mounted on the housing bottom and projecting into an interior of the housing central body section; and, the second member of the housing bottom-to-housing body rotational indexing arrangement comprises at least one receiving space in the housing central body section oriented to only receive the first member in one rotational orientation.

In an alternate embodiment described herein, the member of the housing bottom-to-housing body rotational indexing arrangement on the housing central body section comprises a pair of 180° spaced projections projecting radially inwardly from the housing body (housing central body section); and, a member positioned on the housing bottom comprises a pair of flanges spaced by receiver spaces each of which is sized to receive one of the projections on the housing central body section.

In an example arrangement described herein, the housing top includes a depending projection thereon defining: a first gas flow channel and a central gas receiving space. The first gas flow channel is configured and positioned to direct gas flow, i.e., to conduit gas flow, from the gas flow inlet arrangement to the central gas-receiving space. The first gas flow channel is configured with a channel cross-sectional area X. In the example described, the gas flow channel cross-sectional shape comprises three sides of a square or rectangle.

In an example described, a housing inlet arrangement defines an inlet cross-sectional area of $X_i$; and, the ratio of $X_c/X_i$ is at least 1.0 and not more than 1.5, typically within the range of 1.1-1.4, inclusive. In an example arrangement described, the housing inlet arrangement defines an inlet cross-sectional shape that is circular.

In an example arrangement described herein, the central gas-receiving space in the housing top is generally circular, with a cross-sectional dimension or diameter $D_1$; the circular perimeter having a gap therein at an intersection with the first gas flow channel.

In an example described herein, the filter cartridge has an upper end member with an aperture in a center thereof having the largest cross-sectional dimension $D_2$; typically the aperture being circular and the dimension $D_2$ being a diameter.

In an example arrangement described, filter cartridge is positioned in the housing, with the aperture through the upper end member, oriented underneath and aligned with the gas-receiving space. The term "aligned with" it this context meaning that the aperture in the filter cartridge is oriented to receive gas flow from the gas-receiving space, during use. Ordinarily, the aperture through the upper end member is centered underneath the gas-receiving space. In a typical arrangement the ratio $D_1/D_2$ is at least 1.0 and usually not greater than 1.4

In example arrangements described herein, the housing bottom is secured to the housing central body section by a first, separable, mounting ring. The first, separable, mounting ring can be removably attached to the housing central body section, by a threaded engagement. The housing bottom typically includes a peripheral flange (or ring) thereon, which is engaged by the mounting ring, during mounting.

In examples described herein, the housing top is secured to the housing central body section by a second, separable, mounting ring. In an examples depicted, the second, separable, mounting ring is removably secured to the housing central body section, by a threaded engagement; and, the housing top includes a peripheral flange (or ring) thereon, engaged by the mounting ring.

In example arrangements described herein, the filter cartridge comprises media oriented around a central open interior having a longitudinal axis X extending therethrough. In one example assembly, a housing seal on the filter cartridge is defined by a plane extending at an acute angle of at least 60° and not more than 86°, relative to the longitudinal axis X. The term "defined by a plane" in this context, is meant to refer to the housing seal defining a plane extending therethrough, in accord with the definition.

In an alternate example described herein, the seal that of filter cartridge is defined by a plane extending orthogonal (i.e. perpendicular) to the axis X. In several examples described herein, a housing seal and the filter cartridge define a elliptical perimeter shape.

In a typical arrangement, the housing seal comprises a seal member extending around a portion of the filter cartridge, and the seal to the housing is formed around the seal member. An example seal member is an o-ring.

In example arrangements herein, the housing body includes a gas flow inlet arrangement therein, aligned with an upwardly directed, curved, ramp. This ramp can provide for gas flow upwardly from the inlet arrangement, to a location above the cartridge, in desirable flow.

Cartridge features for the crankcase ventilation filter assembly, can generally in accord with those described previously herein.

According to another aspect of the present disclosure, a crankcase ventilation filter assembly is provided which includes a housing having a housing central body section, a housing bottom (cover) and a housing top (cover); the housing central body section including a side wall defining an interior and having a first open end. The housing central body section further defines a cartridge sealing surface. In this example arrangement, the housing bottom includes a liquid drain therein. The housing includes a gas flow inlet arrangement and a gas flow outlet arrangement.

In this example arrangement described, the housing top is removably secured over the first open end of the housing body. The housing top includes depending projection thereon defining a first gas flow channel and a second central gas-receiving space. The first gas flow channel includes an inlet end aligned with a gas flow inlet arrangement to receive gas flow therefrom. Typically the first gas flow channel extends perpendicularly to a central axis extending through the housing body. The first gas flow channel is configured to direct gases, i.e., to conduit a gas, from the inlet arrangement to the second, central, gas flow space. The first gas flow channel defines a channel cross-sectional area of $X_c$. Typically the cross-sectional definition of the gas flow channel is three sides of a square or rectangle.

The housing inlet arrangement defines an inlet cross-sectional area of $X_i$. The ratio of $X_c/X_i$ is generally as previously discussed. Indeed, the crank case ventilation filter assembly may include additional features previously discussed.

In another aspect of the present disclosure, a crankcase ventilation filter assembly is provided that includes a housing having a housing central body section, a housing top and a housing bottom. The housing body includes a side wall defining an interior with first and second opposite ends. The housing includes a gas flow inlet arrangement; and, a gas flow outlet arrangement through the side wall. The housing central body section further defines an interior surface having a filter cartridge sealing surface thereon.

In this example arrangement, a filter cartridge is operably and removably positioned within the housing. The filter cartridge includes a housing seal member thereon removably sealed to the filter cartridge sealing surface of the housing central body section. The filter cartridge further includes a first member of a filter cartridge-to-housing bottom rotational indexing arrangement thereon; and, the filter cartridge includes a first member of a filter cartridge-to-housing bottom rotational indexing arrangement thereon.

In an example arrangement, the housing top includes a second member of a filter cartridge-to-housing top rotational indexing arrangement thereon. The filter cartridge-to-housing top rotational indexing arrangement, comprising the first and second members, is generally configured so that the filter cartridge can only be positioned in a single, selected, operable rotational orientation relative to the housing bottom.

In an example arrangement, the housing bottom includes a second member of a filter cartridge-to-housing bottom rotational indexing arrangement thereon; and, a filter cartridge-to-housing bottom rotational indexing arrangement resulting from the first and second members is such that the cartridge can only be positioned, relative to the housing bottom, in a single, selected, operable rotational orientation (a relative rotational alignment).

In the example depicted, the second member of the filter cartridge-to-housing bottom rotational indexing arrangement comprises a non-circular receiver in the housing bottom with a side drain gap arrangement therein; and, the first member of the filter cartridge-to-housing bottom rotational indexing arrangement comprises a projection of the filter cartridge sized and shaped to project into the non-circular receiver in the housing body in only one rotational alignment and without closing the side drain gap to liquid flow therethrough. In an example depicted, the non-circular receiver in the housing body defines a D-shaped perimeter having a straight side and an opposite curved side, and with a drain gap in the straight side. Further, the projection on the filter cartridge which is received by this receiver in the housing bottom, in an example depicted, is a D-shaped projection; the example depicted having a continuous outer wall with no apertures therethrough.

In another aspect of the present disclosure, a crankcase ventilation filter assembly is provided including a housing having a housing central body section, a housing top and a housing bottom. The housing central body section has an interior and defines a filter cartridge sealing surface. The housing bottom includes a liquid drain aperture therethrough. The housing bottom further includes a filter cartridge guide projection thereon, projecting toward the housing top.

The guide projection typically defines a non-circular outer perimeter cross-sectional periphery. A first example non-circular outer perimeter cross-sectional periphery is depicted as a D-shaped periphery. In a second example, the outer perimeter cross-sectional periphery of the guide projection has a shape with one side having a generally arcuate (semi-circular) shape and a side opposite comprising two relatively straight side section extending at right angles or approximately right angles outwardly from a central vertex.

In an example arrangement, the filter cartridge is operably received within the housing. The filter cartridge includes a lower end member with a central receiver therein, projecting into a filter cartridge interior. The filter cartridge is positioned with a guide projection extending into the central receiver and the filter cartridge includes a seal member thereon removably sealed to the filter cartridge sealing surface.

In an example depicted, the filter cartridge lower end member is closed and the central receiver has a non-circular inner shape, which is formed in a surface of the lower second end member opposite the central receiver, from the media. Also the central receiver non-circular inner shape is configured to receive the guide projection therein, in only one relative rotational orientation between the filter cartridge and the housing bottom.

In an example shown, a D-shaped projection on the cartridge lower end member surrounds, and is spaced from, an entrance to a D-shaped receiver. In a second example, the projection on the cartridge lower end member has a cross-sectional shape with one circular side, the second side opposite the circular comprising two straight sections extending outwardly from a central vertex, for example at approximately right angles.

Methods of assembly and use are also described. A method of assembly of a crankcase ventilation filter assembly (or servicing) generally comprises a step of providing a housing including: a gas flow inlet arrangement and an gas flow outlet arrangement; a housing central body section; a removable housing top rotationally indexed to housing body in only a single possible rotational orientation; and, a removable housing bottom rotationally indexed to housing body in no more than two possible rotational orientations, and in one example, only one possible rotational orientation. The housing bottom includes a liquid drain aperture therethrough.

The method of includes a step of removing a selected one of the housing top and housing bottom from the housing body; and, inserting a crankcase ventilation filter cartridge into the housing body. Then, a selected one of the housing top and the housing bottom are placed on the housing body.

In a typical assembly or service process, the stop of inserting comprises rotationally indexing the filter cartridge to the housing in only one possible rotational orientation. Equipment features to facilitate this process, are described.

Again, there is no specific requirement that an arrangement include all of the features characterized herein, in order to obtain some benefit according to the present disclosure.

What is claimed is:

1. A crankcase ventilation filter cartridge comprising:
(a) first and second, opposite, end members; and,
(b) filter media positioned between the first and second, opposite, end members and surrounding an open filter;
(c) the first end member comprising a member having an aperture therethrough and including a seal member theraround; and,
(d) the second, opposite, end member being closed and including a closed receiver projection thereon projecting toward the first end member at least 10% of a distance between opposite ends of the media;
  (i) the receiver projection being offset from a central longitudinal axis of the filter media; and,
(e) the second end member being configured to allow at least some liquid drainage directly downwardly from the media.

2. A filter cartridge comprising:
(a) first and second, opposite, end members; and,
(b) filter media positioned between the first and second, opposite, end members and surrounding an open filter interior;
(c) the first end member comprising a member having an aperture therethrough and including a seal member thereon;
  (i) the seal member defining a non-circular seal perimeter; and,
(d) the second; opposite, end member being closed and including a closed receiver projection thereon projecting toward the first end member at least 10% of a distance between opposite ends of the media;
  (i) the receiver projection projecting toward the first end member to an end of the receiver projection, that is offset from a center of the first end member.

3. A filter cartridge according to claim 2 wherein:
(a) the closed receiver projection has a non-circular, inner, cross-sectional shape.

4. A filter cartridge according to claim 3 wherein:
(a) the seal member defining a non-circular seal perimeter, is configured to define a non-circular, radially outwardly directed, seal perimeter.

5. A filter cartridge according to claim 4 wherein:
(a) the first end member has an elliptical outer perimeter shape.

6. A filter cartridge according to claim 2 wherein:
(a) the first end member has an elliptical outer perimeter shape.

7. A crankcase ventilation filter cartridge according to claim 1 wherein:
(a) the seal member defines a non-circular radially outwardly directed seal.

8. A crankcase ventilation filter cartridge according to claim 7 wherein:
(a) the closed receiver projection has a non-circular, inner, cross-sectional shape.

9. A crankcase ventilation filter cartridge according to claim 8 wherein:
(a) the seal member defines a seal perimeter in a seal planar extending orthogonal to the media central longitudinal axis.

10. A crankcase ventilation filter cartridge according to claim 8 wherein:
   (a) the seal member defines a perimeter angled non-orthogonally to a media central longitudinal axis.

11. A crankcase ventilation filter cartridge according to claim 8 wherein:
   (a) the first end member includes a handle member thereon, extending in a direction away from the media.

12. A crankcase ventilation filter cartridge according to claim 1 wherein:
   (a) a seal member is positioned on a seal mount at a location entirely above the media.

13. A crankcase ventilation filter cartridge according to claim 1 wherein:
   (a) the seal comprises an o-ring.

* * * * *